(12) United States Patent
Zhang et al.

(10) Patent No.: US 10,598,893 B2
(45) Date of Patent: Mar. 24, 2020

(54) OPTICAL IMAGING LENS

(71) Applicant: GENIUS ELECTRONIC OPTICAL (XIAMEN) CO., LTD., Xiamen (CN)

(72) Inventors: Jiayuan Zhang, Xiamen (CN); Qingzhi Zhu, Xiamen (CN); Fensha Cai, Xiamen (CN)

(73) Assignee: Genius Electronic Optical (Xiamen) Co., Ltd., Xiamen, Fujian (CN)

( * ) Notice: Subject to any disclaimer, the term of this patent is extended or adjusted under 35 U.S.C. 154(b) by 0 days.

(21) Appl. No.: 15/872,072

(22) Filed: Jan. 16, 2018

(65) Prior Publication Data

US 2019/0154973 A1 May 23, 2019

(30) Foreign Application Priority Data

Nov. 17, 2017 (CN) .......................... 2017 1 1144495

(51) Int. Cl.
  *G02B 9/64* (2006.01)
  *G02B 13/00* (2006.01)
  *G02B 27/00* (2006.01)
(52) U.S. Cl.
  CPC .......... *G02B 9/64* (2013.01); *G02B 13/0045* (2013.01)

(58) Field of Classification Search
  CPC ... G02B 13/0045; G02B 9/64; G02B 27/0025
  See application file for complete search history.

(56) References Cited

U.S. PATENT DOCUMENTS 9,423,595 B2    8/2016  Shinohara et al.

FOREIGN PATENT DOCUMENTS

| CN | 104570280 A | 4/2015 |
| JP | 2016-85431 A | 5/2016 |
| JP | 2017-49347 A | 3/2017 |
| TW | I629535 B | 7/2018 |

OTHER PUBLICATIONS

Office Action for Taiwanese Application No. 106141089 dated Jul. 19, 2018; 9 pages.

*Primary Examiner* — Jack Dinh
(74) *Attorney, Agent, or Firm* — James W. Huffman

(57) ABSTRACT

The present disclosure provides for various embodiments of optical imaging lenses. An optical imaging lens may comprise at least seven lens elements positioned in an order from an object side to an image side. By controlling the convex or concave shape of the surfaces of the lens elements and designing parameters satisfying at least an inequality, the optical imaging lens may exhibit better optical characteristics, the total length of the optical imaging lens may be shortened, and the view angle and f-number may also be improved.

20 Claims, 46 Drawing Sheets

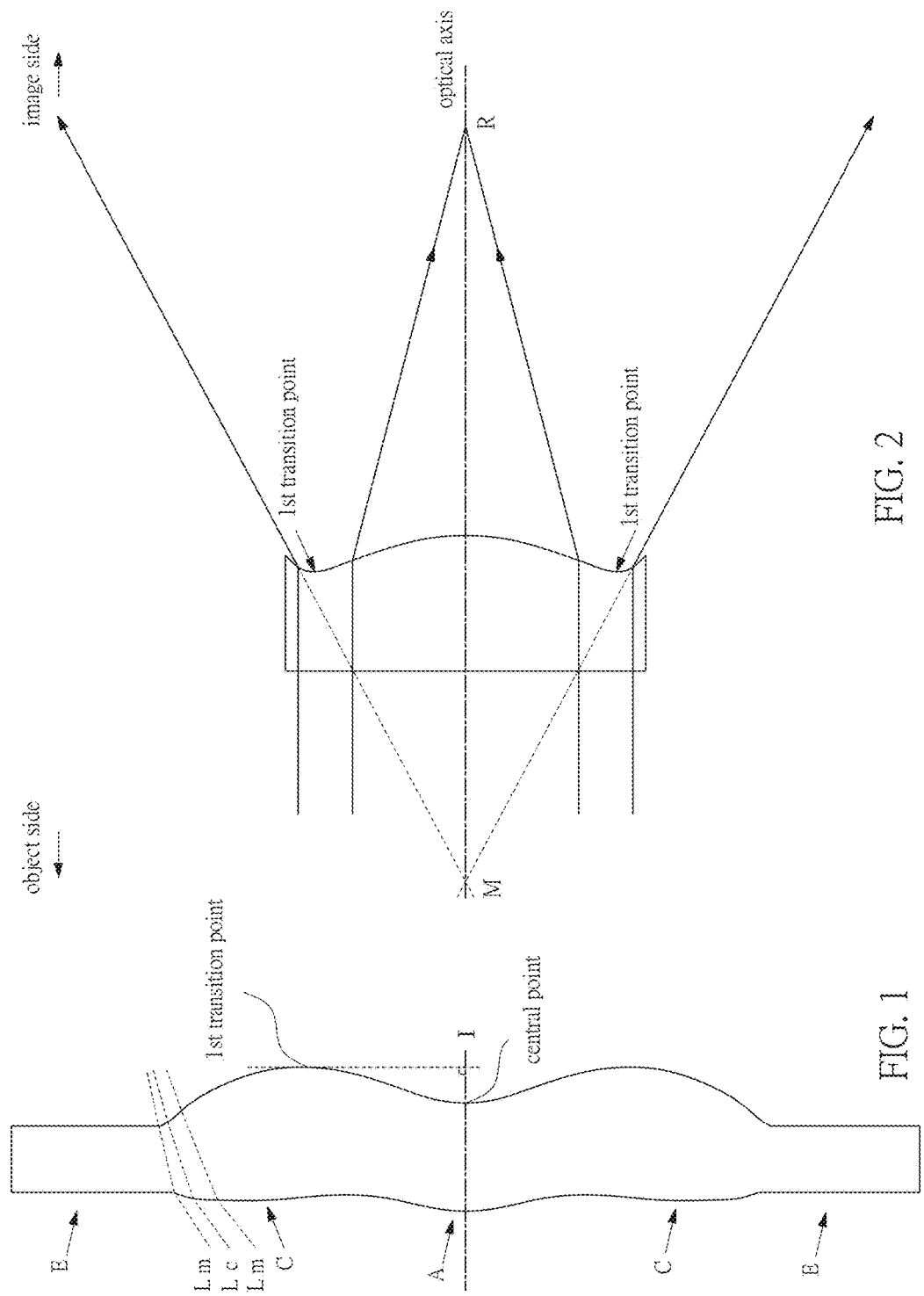

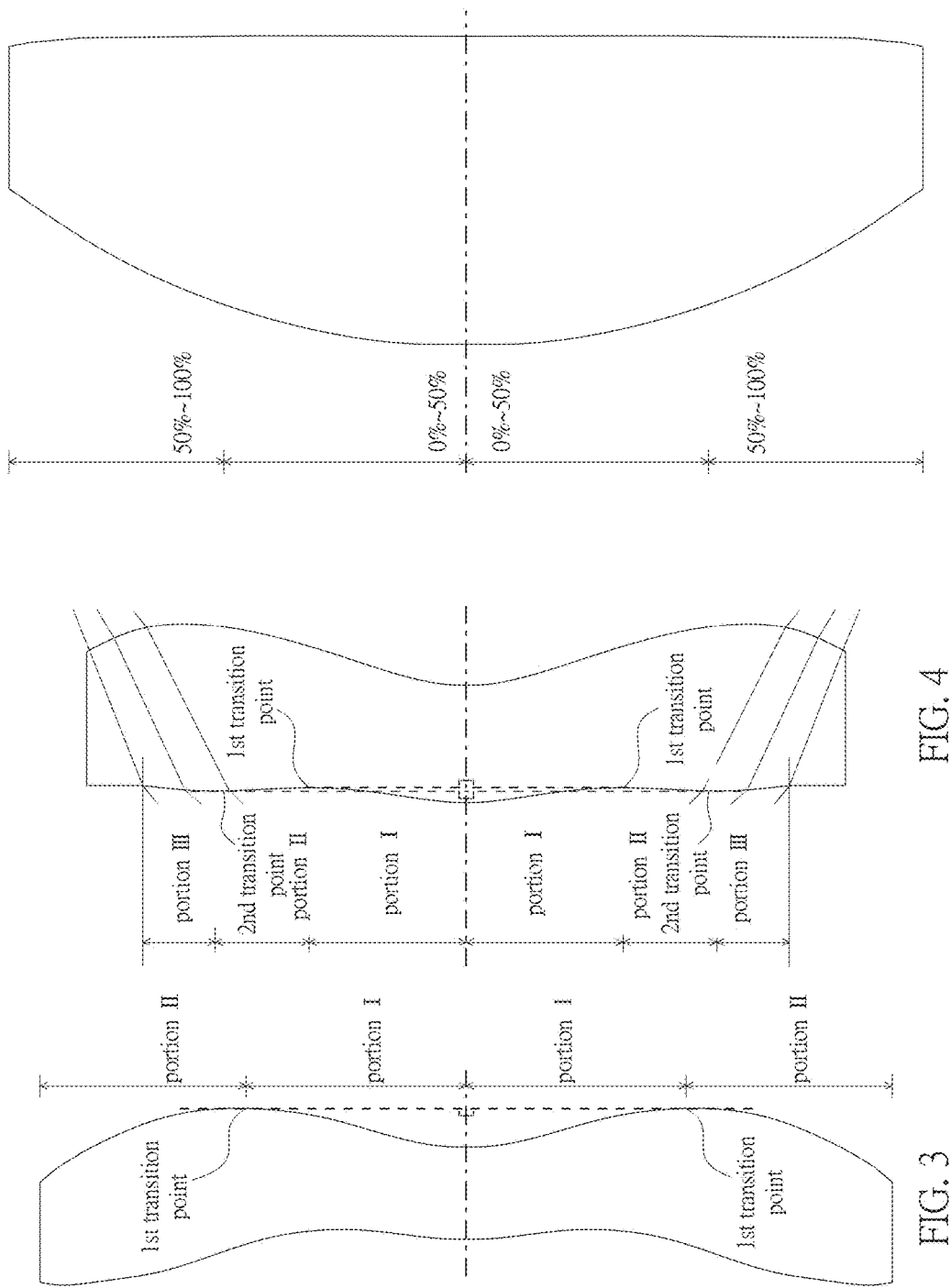

| Effective focal length (EFL) = 4.288 mm, HFOV (Half field of view) = 39.500deg., TTL = 5.908 mm, Image height= 3.535 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 100 | Aperture stop | INFINITY | -0.412 | | | | |
| 111 | 1st lens element | 2.126 | 0.660 | 1.545 | 55.987 | 5.320 | Plastic |
| 112 | | 7.051 | 0.210 | | | | |
| 121 | 2nd lens element | 3.692 | 0.211 | 1.661 | 20.373 | -15.891 | Plastic |
| 122 | | 3.067 | 0.343 | | | | |
| 131 | 3rd lens element | -183.852 | 0.646 | 1.545 | 55.987 | 6.933 | Plastic |
| 132 | | -3.466 | 0.072 | | | | |
| 141 | 4th lens element | 13.582 | 0.325 | 1.661 | 20.373 | -17.039 | Plastic |
| 142 | | 6.129 | 0.403 | | | | |
| 151 | 5th lens element | -3.213 | 0.763 | 1.545 | 55.987 | 4.962 | Plastic |
| 152 | | -1.594 | 0.003 | | | | |
| 161 | 6th lens element | 3.334 | 0.424 | 1.545 | 55.987 | -50.907 | Plastic |
| 162 | | 2.844 | 0.483 | | | | |
| 171 | 7th lens element | -5.901 | 0.350 | 1.545 | 55.987 | -3.861 | Plastic |
| 172 | | 3.351 | 0.280 | | | | |
| 181 | IR cut filter | INFINITY | 0.509 | | | | |
| 182 | | INFINITY | 0.226 | | | | |
| 190 | Image plane | INFINITY | | | | | |

FIG.8

| Aspherical parameters | | | | | |
|---|---|---|---|---|---|
| Surface # | K | $a_2$ | $a_4$ | $a_6$ | $a_8$ | $a_{10}$ |
| 111 | 9.541088E-02 | 0.000000E+00 | 7.513261E-04 | 7.203290E-03 | -9.617611E-03 | 9.616718E-03 |
| 112 | 2.261059E-04 | 0.000000E+00 | -2.024166E-02 | 4.013201E-03 | 2.581163E-03 | -1.239502E-04 |
| 121 | 3.970451E-02 | 1.861382E-02 | -1.116720E-01 | 8.061759E-03 | 1.514546E-03 | 3.433449E-02 |
| 122 | -7.706297E-02 | 4.354787E-02 | -7.926589E-02 | -1.643052E-02 | 2.698977E-02 | 8.400910E-03 |
| 131 | -1.800848E-04 | 6.200703E-03 | 2.235092E-02 | -2.806696E-02 | 5.856256E-03 | -2.849807E-02 |
| 132 | 6.418493E-02 | 1.550471E-02 | 9.246928E-02 | -1.415881E-01 | 8.530015E-02 | -2.033617E-02 |
| 141 | -7.361880E-03 | 0.000000E+00 | 7.531907E-03 | -9.379716E-02 | 4.320329E-03 | 5.662709E-02 |
| 142 | 2.156778E-01 | 0.000000E+00 | -4.142011E-02 | 7.833187E-05 | -4.040004E-02 | 4.673452E-02 |
| 151 | 5.531820E-03 | 0.000000E+00 | 3.283912E-02 | -1.729089E-02 | 8.221894E-03 | -8.069937E-03 |
| 152 | -5.600281E-01 | 0.000000E+00 | 4.221956E-02 | -3.549758E-02 | 3.411246E-02 | -2.000766E-02 |
| 161 | -1.157586E-01 | 0.000000E+00 | -6.961144E-02 | -8.831204E-03 | 6.300251E-03 | -3.384216E-03 |
| 162 | -9.028227E-02 | 0.000000E+00 | -6.300297E-02 | 5.298317E-03 | -2.373327E-03 | 7.488172E-04 |
| 171 | 2.192655E-01 | 0.000000E+00 | -1.615966E-02 | -3.670989E-03 | 7.795105E-03 | -3.429579E-03 |
| 172 | -6.628368E-02 | 0.000000E+00 | -5.440236E-02 | 7.338358E-03 | 1.804547E-04 | -2.621948E-04 |
| Surface # | $a_{12}$ | $a_{14}$ | $a_{16}$ | $a_{18}$ | $a_{20}$ | $R_N$ |
| 111 | -5.973530E-03 | 2.385117E-03 | -4.801532E-04 | | | |
| 112 | -2.831732E-03 | 1.768503E-03 | -4.166811E-04 | | | |
| 121 | -3.735305E-02 | 1.584437E-02 | -2.412787E-03 | | | |
| 122 | -1.804974E-02 | 6.799288E-03 | -4.943449E-05 | | | |
| 131 | 3.837292E-02 | -2.349348E-02 | 5.725657E-03 | | | |
| 132 | -1.081132E-02 | 8.434659E-03 | -1.565835E-03 | | | |
| 141 | -5.171685E-02 | 2.058755E-02 | -3.064997E-03 | | | |
| 142 | -2.606203E-02 | 7.324699E-03 | -4.455680E-04 | -2.280515E-04 | 3.916829E-05 | 9.990000E-01 |
| 151 | 5.533612E-03 | -1.407947E-03 | 7.795306E-05 | 1.113248E-05 | -6.571449E-07 | 9.990000E-01 |
| 152 | 6.849571E-03 | -6.403373E-04 | -2.035064E-04 | 4.811459E-05 | -2.574327E-06 | 9.990000E-01 |
| 161 | 1.113699E-03 | -1.761500E-04 | 6.646378E-06 | 1.579091E-06 | -1.344570E-07 | 9.990000E-01 |
| 162 | -1.071071E-04 | 3.695129E-06 | 9.269527E-07 | -1.128588E-07 | 3.604851E-09 | 9.990000E-01 |
| 171 | 7.695317E-04 | -9.921308E-05 | 7.449209E-06 | -3.029914E-07 | 5.097731E-09 | 9.990000E-01 |
| 172 | 4.535741E-05 | -4.450554E-06 | 2.704528E-07 | -8.972759E-09 | 1.113529E-10 | 9.990000E-01 |

FIG.9

| Effective focal length (EFL) = 4.278 mm, HFOV (Half field of view) = 39.500deg., TTL = 5.885 mm, Image height= 3.526 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 200 | Aperture stop | INFINITY | -0.308 | | | | |
| 211 | 1st lens element | 2.313 | 0.678 | 1.545 | 55.987 | 5.773 | Plastic |
| 212 | | 7.783 | 0.087 | | | | |
| 221 | 2nd lens element | 3.633 | 0.287 | 1.661 | 20.373 | -30.973 | Plastic |
| 222 | | 2.992 | 0.339 | | | | |
| 231 | 3rd lens element | -59.868 | 0.461 | 1.545 | 55.987 | 8.110 | Plastic |
| 232 | | -4.136 | 0.050 | | | | |
| 241 | 4th lens element | 15.996 | 0.292 | 1.661 | 20.373 | -12.148 | Plastic |
| 242 | | 5.340 | 0.498 | | | | |
| 251 | 5th lens element | -2.766 | 0.598 | 1.545 | 55.987 | 5.175 | Plastic |
| 252 | | -1.505 | 0.050 | | | | |
| 261 | 6th lens element | 2.214 | 0.409 | 1.545 | 55.987 | -20.013 | Plastic |
| 262 | | 1.721 | 0.614 | | | | |
| 271 | 7th lens element | -11.292 | 0.639 | 1.545 | 55.987 | -5.284 | Plastic |
| 272 | | 3.956 | 0.179 | | | | |
| 281 | IR cut filter | INFINITY | 0.510 | | | | |
| 282 | | INFINITY | 0.193 | | | | |
| 290 | Image plane | INFINITY | | | | | |

FIG.12

| Aspherical parameters | | | | | |
|---|---|---|---|---|---|
| Surface # | K | $a_2$ | $a_4$ | $a_6$ | $a_8$ | $a_{10}$ |
| 211 | -3.622087E-01 | 0.000000E+00 | 3.352801E-04 | 1.401228E-03 | -9.572555E-03 | 8.891536E-03 |
| 212 | -2.422037E+01 | 0.000000E+00 | -5.969480E-02 | 1.365301E-02 | 2.188987E-03 | -2.003336E-03 |
| 221 | 1.654026E+00 | 0.000000E+00 | -9.304799E-02 | 9.215902E-03 | 1.140389E-03 | 3.564420E-02 |
| 222 | 5.623006E-01 | 0.000000E+00 | -2.830859E-02 | -3.391292E-02 | 2.599642E-02 | 9.963408E-03 |
| 231 | 2.129478E+03 | 0.000000E+00 | 4.999891E-02 | -3.085010E-02 | -7.484016E-04 | -2.717605E-02 |
| 232 | -4.724085E+00 | 0.000000E+00 | 1.302031E-01 | -1.587649E-01 | 8.628975E-02 | -2.039216E-02 |
| 241 | -2.862687E+02 | 0.000000E+00 | -1.988024E-03 | -8.941020E-02 | 3.309185E-03 | 5.595070E-02 |
| 242 | -5.970184E+01 | 0.000000E+00 | -3.162679E-02 | -2.189037E-03 | -4.003882E-02 | 4.707804E-02 |
| 251 | -7.827119E-01 | 0.000000E+00 | 4.588675E-02 | -1.589035E-02 | 4.992254E-03 | -8.566224E-03 |
| 252 | -2.142958E+00 | 0.000000E+00 | 1.233252E-02 | -3.493761E-02 | 3.369055E-02 | -2.007323E-02 |
| 261 | -7.002807E+00 | 0.000000E+00 | -1.907886E-02 | -1.225973E-02 | 6.541813E-03 | -3.415196E-03 |
| 262 | -5.459085E+00 | 0.000000E+00 | -2.933001E-02 | 3.564900E-03 | -2.679511E-03 | 7.562038E-04 |
| 271 | 9.326358E-01 | 0.000000E+00 | -3.555703E-02 | -1.600431E-03 | 7.889276E-03 | -3.437519E-03 |
| 272 | -1.122694E+01 | 0.000000E+00 | -2.711431E-02 | 3.073838E-03 | 6.168600E-04 | -2.565506E-04 |
| Surface # | $a_{12}$ | $a_{14}$ | $a_{16}$ | $a_{18}$ | $a_{20}$ | $R_N$ |
| 211 | -6.691376E-03 | 1.983953E-03 | -2.709600E-04 | | | |
| 212 | -3.110764E-03 | 2.140347E-03 | -4.109927E-04 | | | |
| 221 | -3.636356E-02 | 1.511715E-02 | -2.325442E-03 | | | |
| 222 | -1.683722E-02 | 6.675599E-03 | -8.027091E-04 | | | |
| 231 | 3.998202E-02 | -2.297305E-02 | 4.734378E-03 | | | |
| 232 | -1.176875E-02 | 7.930507E-03 | -1.415707E-03 | | | |
| 241 | -5.124162E-02 | 2.022124E-02 | -3.076432E-03 | | | |
| 242 | -2.591392E-02 | 7.367631E-03 | -4.567265E-04 | -2.356117E-04 | 4.043250E-05 | 1.000000E+00 |
| 251 | 5.694269E-03 | -1.312853E-03 | 9.285700E-05 | -1.847299E-06 | 4.531270E-07 | 1.000000E+00 |
| 252 | 6.844742E-03 | -6.457192E-04 | -2.038188E-04 | 4.880093E-05 | -2.458102E-06 | 1.000000E+00 |
| 261 | 1.096133E-03 | -1.813241E-04 | 5.424819E-06 | 1.566637E-06 | -2.085929E-07 | 1.000000E+00 |
| 262 | -1.089017E-04 | 2.760771E-06 | 8.085671E-07 | -1.112286E-07 | 5.324631E-09 | 1.000000E+00 |
| 271 | 7.689162E-04 | -9.946334E-05 | 7.450868E-06 | -3.018066E-07 | 5.252487E-09 | 1.000000E+00 |
| 272 | 4.404071E-05 | -4.521092E-06 | 2.715165E-07 | -8.550490E-09 | 1.032062E-10 | 1.000000E+00 |

FIG.13

| Effective focal length (EFL) = 4.664 mm, HFOV (Half field of view) = 39.500deg., TTL = 6.307 mm, Image height= 3.845 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 300 | Aperture stop | INFINITY | -0.378 | | | | |
| 311 | 1st lens element | 2.404 | 0.669 | 1.545 | 55.987 | 6.543 | Plastic |
| 312 | | 6.622 | 0.158 | | | | |
| 321 | 2nd lens element | 3.906 | 0.298 | 1.661 | 20.373 | -62.533 | Plastic |
| 322 | | 3.274 | 0.348 | | | | |
| 331 | 3rd lens element | -50.669 | 0.539 | 1.545 | 55.987 | 10.907 | Plastic |
| 332 | | -5.257 | 0.081 | | | | |
| 341 | 4th lens element | 13.164 | 0.538 | 1.661 | 20.373 | -16.172 | Plastic |
| 342 | | 4.882 | 0.428 | | | | |
| 351 | 5th lens element | -3.546 | 0.688 | 1.545 | 55.987 | 4.753 | Plastic |
| 352 | | -1.686 | 0.150 | | | | |
| 361 | 6th lens element | 3.380 | 0.427 | 1.545 | 55.987 | -15.421 | Plastic |
| 362 | | 2.304 | 0.679 | | | | |
| 371 | 7th lens element | -8.217 | 0.246 | 1.545 | 55.987 | -4.957 | Plastic |
| 372 | | 4.082 | 0.400 | | | | |
| 381 | IR cut filter | INFINITY | 0.510 | | | | |
| 382 | | INFINITY | 0.147 | | | | |
| 390 | Image plane | INFINITY | | | | | |

FIG.16

| Aspherical parameters | | | | | | |
|---|---|---|---|---|---|---|
| Surface # | K | $a_2$ | $a_4$ | $a_6$ | $a_8$ | $a_{10}$ |
| 311 | -3.716032E-01 | 0.000000E+00 | -1.528844E-03 | 3.098873E-03 | -8.363011E-03 | 9.376695E-03 |
| 312 | -8.029729E+00 | 0.000000E+00 | -5.757610E-02 | 1.427817E-02 | 3.222984E-03 | -1.646036E-03 |
| 321 | 1.056346E+00 | 2.004704E-03 | -9.607328E-02 | 7.857110E-03 | 4.474287E-04 | 3.533679E-02 |
| 322 | 2.551040E-01 | -6.177277E-03 | -3.090131E-02 | -3.306294E-02 | 2.548150E-02 | 9.486404E-03 |
| 331 | -4.906325E-03 | 5.529357E-02 | -3.085348E-02 | -7.258314E-04 | -2.675649E-02 | 4.020404E-02 |
| 332 | -6.390955E+00 | -3.021616E-03 | 1.291592E-01 | -1.594725E-01 | 8.625585E-02 | -2.010618E-02 |
| 341 | 4.761325E+01 | -1.277410E-02 | 1.525226E-02 | -8.296113E-02 | 3.237326E-03 | 5.509007E-02 |
| 342 | -1.891676E+01 | -3.341395E-02 | -2.016916E-02 | -1.357354E-03 | -4.036049E-02 | 4.683020E-02 |
| 351 | -3.025302E-01 | 2.088653E-02 | 4.277159E-02 | -1.738284E-02 | 4.682382E-03 | -8.577177E-03 |
| 352 | -2.414077E+00 | 0.000000E+00 | 1.511988E-02 | -3.468747E-02 | 3.380200E-02 | -2.005564E-02 |
| 361 | -9.436703E+00 | 0.000000E+00 | -2.488195E-02 | -9.317051E-03 | 6.570888E-03 | -3.410994E-03 |
| 362 | -6.706729E+00 | 0.000000E+00 | -3.041015E-02 | 5.133258E-03 | -2.540697E-03 | 7.374021E-04 |
| 371 | -7.724185E-01 | 0.000000E+00 | -3.449634E-02 | -2.213155E-03 | 7.849778E-03 | -3.434554E-03 |
| 372 | -1.109357E+01 | 0.000000E+00 | -2.626678E-02 | 2.497209E-03 | 5.939087E-04 | -2.551618E-04 |
| Surface # | $a_{12}$ | $a_{14}$ | $a_{16}$ | $a_{18}$ | $a_{20}$ | $R_N$ |
| 311 | -6.502619E-03 | 2.065486E-03 | -2.924324E-04 | | | |
| 312 | -3.148297E-03 | 2.090731E-03 | -3.944839E-04 | | | |
| 321 | -3.657764E-02 | 1.500188E-02 | -2.255552E-03 | | | |
| 322 | -1.696216E-02 | 6.692505E-03 | -7.979678E-04 | | | |
| 331 | -2.302010E-02 | 4.593849E-03 | | | | |
| 332 | -1.157786E-02 | 8.047136E-03 | -1.345226E-03 | | | |
| 341 | -5.152073E-02 | 2.026247E-02 | -2.954539E-03 | | | |
| 342 | -2.599262E-02 | 7.363012E-03 | -4.504528E-04 | -2.357128E-04 | 3.922407E-05 | 1.054034E+00 |
| 351 | 5.699121E-03 | -1.312472E-03 | 9.220625E-05 | -7.392019E-07 | 2.838006E-07 | 1.037588E+00 |
| 352 | 6.843091E-03 | -6.473138E-04 | -2.043609E-04 | 4.887198E-05 | -2.563403E-06 | 1.062366E+00 |
| 361 | 1.102399E-03 | -1.784955E-04 | 6.421970E-06 | 1.567106E-06 | -1.356676E-07 | 9.579880E-01 |
| 362 | -1.077911E-04 | 3.691267E-06 | 9.357865E-07 | -1.108476E-07 | 3.686618E-09 | 9.973690E-01 |
| 371 | 7.696700E-04 | -9.939479E-05 | 7.453422E-06 | -3.018051E-07 | 5.104337E-09 | 9.966978E-01 |
| 372 | 4.470729E-05 | -4.526029E-06 | 2.688536E-07 | -8.559937E-09 | 1.098773E-10 | 9.445004E-01 |

FIG.17

| Effective focal length (EFL) = 4.283 mm, HFOV (Half field of view) = 39.500deg., TTL = 5.913 mm, Image height= 3.531 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 400 | Aperture stop | INFINITY | -0.361 | | | | |
| 411 | 1st lens element | 2.326 | 0.705 | 1.545 | 55.987 | 6.172 | Plastic |
| 412 | | 6.702 | 0.123 | | | | |
| 421 | 2nd lens element | 3.483 | 0.382 | 1.661 | 20.373 | -32.919 | Plastic |
| 422 | | 2.874 | 0.385 | | | | |
| 431 | 3rd lens element | -33.577 | 0.472 | 1.545 | 55.987 | 7.194 | Plastic |
| 432 | | -3.535 | 0.050 | | | | |
| 441 | 4th lens element | 11.068 | 0.316 | 1.661 | 20.373 | -10.174 | Plastic |
| 442 | | 4.159 | 0.356 | | | | |
| 451 | 5th lens element | -2.920 | 0.722 | 1.545 | 55.987 | 4.561 | Plastic |
| 452 | | -1.462 | 0.050 | | | | |
| 461 | 6th lens element | 2.141 | 0.411 | 1.545 | 55.987 | -15.703 | Plastic |
| 462 | | 1.597 | 0.727 | | | | |
| 471 | 7th lens element | -14.674 | 0.240 | 1.545 | 55.987 | -5.946 | Plastic |
| 472 | | 4.196 | 0.272 | | | | |
| 481 | IR cut filter | INFINITY | 0.510 | | | | |
| 482 | | INFINITY | 0.193 | | | | |
| 490 | Image plane | INFINITY | | | | | |

FIG.20

| Aspherical parameters | | | | | | |
|---|---|---|---|---|---|---|
| Surface # | K | $a_2$ | $a_4$ | $a_6$ | $a_8$ | $a_{10}$ |
| 411 | -3.871264E-01 | 0.000000E+00 | -1.020711E-05 | 1.483945E-03 | -9.100687E-03 | 9.130904E-03 |
| 412 | -2.933407E+01 | 0.000000E+00 | -6.045507E-02 | 1.362480E-02 | 2.975853E-03 | -1.722873E-03 |
| 421 | 1.411748E+00 | 0.000000E+00 | -9.459584E-02 | 8.360554E-03 | 8.596108E-04 | 3.539143E-02 |
| 422 | 7.656673E-01 | 0.000000E+00 | -2.699203E-02 | -3.147545E-02 | 2.542543E-02 | 9.627964E-03 |
| 431 | -6.564679E+02 | 0.000000E+00 | 5.663305E-02 | -3.455843E-02 | -2.285548E-03 | -2.716653E-02 |
| 432 | -1.874340E+01 | 0.000000E+00 | 1.360136E-01 | -1.619534E-01 | 8.474811E-02 | -2.049391E-02 |
| 441 | -2.435953E+01 | 0.000000E+00 | 7.237982E-03 | -8.343128E-02 | 3.829562E-03 | 5.531385E-02 |
| 442 | -5.438768E+01 | 0.000000E+00 | -1.937272E-02 | -1.761644E-03 | -4.054534E-02 | 4.680476E-02 |
| 451 | -9.233421E-01 | 0.000000E+00 | 4.612000E-02 | -1.677766E-02 | 4.788649E-03 | -8.518145E-03 |
| 452 | -2.214107E+00 | 0.000000E+00 | 7.871193E-03 | -3.523748E-02 | 3.388998E-02 | -2.003980E-02 |
| 461 | -6.831554E+00 | 0.000000E+00 | -2.607916E-02 | -9.222187E-03 | 6.633144E-03 | -3.402856E-03 |
| 462 | -5.373492E+00 | 0.000000E+00 | -2.840977E-02 | 5.084940E-03 | -2.557752E-03 | 7.358815E-04 |
| 471 | -1.372306E+01 | 0.000000E+00 | -3.426829E-02 | -2.209968E-03 | 7.850117E-03 | -3.434634E-03 |
| 472 | -1.574543E+01 | 0.000000E+00 | -2.760301E-02 | 2.704255E-03 | 5.962702E-04 | -2.559486E-04 |
| Surface # | $a_{12}$ | $a_{14}$ | $a_{16}$ | $a_{18}$ | $a_{20}$ | $R_N$ |
| 411 | -6.518054E-03 | 2.074711E-03 | -3.236480E-04 | | | |
| 412 | -3.199560E-03 | 2.038074E-03 | -3.851895E-04 | | | |
| 421 | -3.663254E-02 | 1.497601E-02 | -2.244289E-03 | | | |
| 422 | -1.675071E-02 | 6.796590E-03 | -8.320955E-04 | | | |
| 431 | 4.013984E-02 | -2.296829E-02 | 4.709448E-03 | | | |
| 432 | -1.158444E-02 | 8.078655E-03 | -1.338719E-03 | | | |
| 441 | -5.150086E-02 | 2.026232E-02 | -2.944060E-03 | | | |
| 442 | -2.598665E-02 | 7.367442E-03 | -4.480943E-04 | -2.356117E-04 | 3.958591E-05 | 1.000000E+00 |
| 451 | 5.725042E-03 | -1.307367E-03 | 9.155467E-05 | -1.847299E-06 | -2.165920E-07 | 1.000000E+00 |
| 452 | 6.843871E-03 | -6.475952E-04 | -2.046901E-04 | 4.880093E-05 | -2.643908E-06 | 1.000000E+00 |
| 461 | 1.102855E-03 | -1.784997E-04 | 6.416234E-06 | 1.566637E-06 | -1.361674E-07 | 1.000000E+00 |
| 462 | -1.079588E-04 | 3.677110E-06 | 9.360545E-07 | -1.112286E-07 | 3.841432E-09 | 1.000000E+00 |
| 471 | 7.696465E-04 | -9.939699E-05 | 7.453343E-06 | -3.018066E-07 | 5.107113E-09 | 1.000000E+00 |
| 472 | 4.462843E-05 | -4.530453E-06 | 2.688775E-07 | -8.550490E-09 | 1.144101E-10 | 1.000000E+00 |

FIG.21

| Surface # | | Radius (mm) | Thickness / air gap (mm) | Refractive index | Abbe number | Focal length (mm) | Material |
|---|---|---|---|---|---|---|---|
| | Effective focal length (EFL) = 4.249 mm, HFOV (Half field of view) = 39.500deg., TTL = 5.831 mm, Image height = 3.503 mm, Fno = 1.7 | | | | | | |
| - | Object | INFINITY | INFINITY | | | | |
| 500 | Aperture stop | INFINITY | -0.360 | | | | |
| 511 | 1st lens element | 2.153 | 0.619 | 1.545 | 55.987 | 5.828 | Plastic |
| 512 | | 5.972 | 0.099 | | | | |
| 521 | 2nd lens element | 3.175 | 0.250 | 1.661 | 20.373 | -72.209 | Plastic |
| 522 | | 2.885 | 0.441 | | | | |
| 531 | 3rd lens element | -19.566 | 0.494 | 1.545 | 55.987 | 9.247 | Plastic |
| 532 | | -4.051 | 0.050 | | | | |
| 541 | 4th lens element | 52.680 | 0.426 | 1.661 | 20.373 | -11.863 | Plastic |
| 542 | | 6.858 | 0.374 | | | | |
| 551 | 5th lens element | -3.040 | 0.668 | 1.545 | 55.987 | 5.231 | Plastic |
| 552 | | -1.588 | 0.050 | | | | |
| 561 | 6th lens element | 3.966 | 0.617 | 1.545 | 55.987 | 69.839 | Plastic |
| 562 | | 4.182 | 0.483 | | | | |
| 571 | 7th lens element | -6.601 | 0.250 | 1.545 | 55.987 | -3.940 | Plastic |
| 572 | | 3.237 | 0.306 | | | | |
| 581 | IR cut filter | INFINITY | 0.510 | | | | |
| 582 | | INFINITY | 0.193 | | | | |
| 590 | Image plane | INFINITY | | | | | |

FIG.24

| Aspherical parameters | | | | | |
|---|---|---|---|---|---|
| Surface # | K | $a_2$ | $a_4$ | $a_6$ | $a_8$ | $a_{10}$ |
| 511 | -2.828218E-01 | 0.000000E+00 | 2.172715E-03 | 2.769063E-03 | -9.251255E-03 | 9.014154E-03 |
| 512 | -1.722525E+01 | 0.000000E+00 | -5.537459E-02 | 1.415461E-02 | 1.267826E-03 | -2.363708E-03 |
| 521 | 1.071257E+00 | 0.000000E+00 | -9.659132E-02 | 6.411226E-03 | 1.204033E-03 | 3.589698E-02 |
| 522 | 3.872722E-01 | 0.000000E+00 | -3.217466E-02 | -3.035891E-02 | 2.706997E-02 | 9.785505E-03 |
| 531 | 2.311065E+02 | 0.000000E+00 | 3.926788E-02 | -2.927227E-02 | 2.154509E-03 | -2.734440E-02 |
| 532 | 1.562710E+00 | 0.000000E+00 | 1.198386E-01 | -1.594934E-01 | 8.538059E-02 | -2.023708E-02 |
| 541 | -4.936803E+02 | 0.000000E+00 | -7.379727E-03 | -9.196808E-02 | 3.442516E-03 | 5.618561E-02 |
| 542 | -9.757766E+01 | 0.000000E+00 | -2.399704E-02 | -1.183232E-03 | -4.047392E-02 | 4.672313E-02 |
| 551 | -1.039674E+00 | 0.000000E+00 | 4.788241E-02 | -1.579473E-02 | 4.932801E-03 | -8.550301E-03 |
| 552 | -1.731512E+00 | 0.000000E+00 | 1.312025E-02 | -3.319066E-02 | 3.388693E-02 | -2.008014E-02 |
| 561 | -4.837888E+00 | 0.000000E+00 | -3.016138E-02 | -9.715620E-03 | 6.506349E-03 | -3.423898E-03 |
| 562 | -3.605402E+00 | 0.000000E+00 | -2.848501E-02 | 3.759990E-03 | -2.561515E-03 | 7.502907E-04 |
| 571 | -2.102544E+01 | 0.000000E+00 | -3.221782E-02 | -2.166558E-03 | 7.850626E-03 | -3.434498E-03 |
| 572 | -1.049741E+01 | 0.000000E+00 | -2.634001E-02 | 3.272112E-03 | 5.432214E-04 | -2.599081E-04 |
| Surface # | $a_{12}$ | $a_{14}$ | $a_{16}$ | $a_{18}$ | $a_{20}$ | $R_N$ |
| 511 | -6.709368E-03 | 1.919110E-03 | -3.643059E-04 | | | |
| 512 | -3.040541E-03 | 2.255332E-03 | -4.764103E-04 | | | |
| 521 | -3.622631E-02 | 1.525807E-02 | -2.256559E-03 | | | |
| 522 | -1.718350E-02 | 6.532821E-03 | -4.769777E-04 | | | |
| 531 | 3.865511E-03 | -2.357380E-02 | 5.109214E-03 | | | |
| 532 | -1.127152E-02 | 8.107130E-03 | -1.583061E-03 | | | |
| 541 | -5.124702E-02 | 2.018602E-02 | -3.079083E-03 | | | |
| 542 | -2.605393E-02 | 7.339418E-03 | -4.518828E-04 | -2.356117E-04 | 4.268349E-05 | 1.000000E+00 |
| 551 | 5.691991E-03 | -1.321434E-03 | 9.064938E-05 | -1.847299E-06 | 8.668475E-07 | 1.000000E+00 |
| 552 | 6.837428E-03 | -6.469549E-04 | -2.041695E-04 | 4.880093E-05 | -2.589505E-06 | 1.000000E+00 |
| 561 | 1.104081E-03 | -1.774473E-04 | 6.672868E-06 | 1.566637E-06 | -1.365615E-07 | 1.000000E+00 |
| 562 | -1.063040E-04 | 3.720356E-06 | 9.221488E-07 | -1.112286E-07 | 3.916045E-09 | 1.000000E+00 |
| 571 | 7.696717E-04 | -9.939687E-05 | 7.452905E-06 | -3.018066E-07 | 5.089373E-09 | 1.000000E+00 |
| 572 | 4.474196E-05 | -4.506889E-06 | 2.703584E-07 | -8.550490E-09 | 9.896397E-11 | 1.000000E+00 |

FIG.25

| Effective focal length (EFL) = 4.229 mm, HFOV (Half field of view) = 39.500deg., TTL = 5.922 mm, Image height = 3.486 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 600 | Aperture stop | INFINITY | -0.293 | | | | |
| 611 | 1st lens element | 2.332 | 0.672 | 1.545 | 55.987 | 6.098 | Plastic |
| 612 | | 6.979 | 0.113 | | | | |
| 621 | 2nd lens element | 3.465 | 0.319 | 1.661 | 20.373 | -31.906 | Plastic |
| 622 | | 2.870 | 0.344 | | | | |
| 631 | 3rd lens element | -79.850 | 0.481 | 1.545 | 55.987 | 7.680 | Plastic |
| 632 | | -3.994 | 0.040 | | | | |
| 641 | 4th lens element | 25.247 | 0.500 | 1.661 | 20.373 | -11.610 | Plastic |
| 642 | | 5.880 | 0.465 | | | | |
| 651 | 5th lens element | -2.833 | 0.628 | 1.545 | 55.987 | 4.707 | Plastic |
| 652 | | -1.454 | 0.040 | | | | |
| 661 | 6th lens element | 2.717 | 0.532 | 1.545 | 55.987 | -16.799 | Plastic |
| 662 | | 1.951 | 0.635 | | | | |
| 671 | 7th lens element | -12.649 | 0.240 | 1.545 | 55.987 | -5.434 | Plastic |
| 672 | | 3.904 | 0.212 | | | | |
| 681 | IR cut filter | INFINITY | 0.510 | | | | |
| 682 | | INFINITY | 0.193 | | | | |
| 690 | Image plane | INFINITY | | | | | |

FIG.28

| Aspherical parameters | | | | | |
|---|---|---|---|---|---|
| Surface # | K | $a_2$ | $a_4$ | $a_6$ | $a_8$ | $a_{10}$ |
| 611 | -4.503818E-01 | 0.000000E+00 | -7.802058E-04 | 1.160523E-03 | -9.641247E-03 | 8.773965E-03 |
| 612 | -2.004534E+01 | 0.000000E+00 | -6.050949E-02 | 1.245412E-02 | 2.283695E-03 | -1.947621E-03 |
| 621 | 1.643061E+00 | 0.000000E+00 | -9.373455E-02 | 9.353074E-03 | 1.103213E-03 | 3.541978E-02 |
| 622 | 6.653890E-01 | 0.000000E+00 | -2.780708E-02 | -3.201101E-02 | 2.520351E-02 | 9.500831E-03 |
| 631 | 0.000000E+00 | 6.039340E-02 | -3.264460E-02 | -1.690655E-03 | -2.713193E-02 | 4.005660E-02 |
| 632 | -9.010213E+00 | 0.000000E+00 | 1.303693E-01 | -1.610130E-01 | 8.579219E-02 | -2.024079E-02 |
| 641 | -3.247221E+00 | 0.000000E+00 | 5.216118E-03 | -8.518288E-02 | 3.384464E-03 | 5.539785E-02 |
| 642 | -9.366223E+01 | 0.000000E+00 | -1.548384E-02 | -3.153114E-04 | -4.073409E-02 | 4.661989E-02 |
| 651 | -1.338772E+00 | 0.000000E+00 | 4.808444E-02 | -1.690836E-02 | 4.696391E-03 | -8.563904E-03 |
| 652 | -2.226734E+00 | 0.000000E+00 | 1.353289E-02 | -3.460625E-02 | 3.375500E-02 | -2.007143E-02 |
| 661 | -8.096609E+00 | 0.000000E+00 | -2.673201E-02 | -8.565802E-03 | 6.681273E-03 | -3.428785E-03 |
| 662 | -7.188667E+00 | 0.000000E+00 | -2.567871E-02 | 5.102723E-03 | -2.620611E-03 | 7.338754E-04 |
| 671 | -2.002439E+01 | 0.000000E+00 | -3.349931E-02 | -2.231454E-03 | 7.845586E-03 | -3.434667E-03 |
| 672 | -1.394154E+01 | 0.000000E+00 | -2.448383E-02 | 2.611235E-03 | 6.096901E-04 | -2.578129E-04 |
| Surface # | $a_{12}$ | $a_{14}$ | $a_{16}$ | $a_{18}$ | $a_{20}$ | $R_N$ |
| 611 | -6.670059E-03 | 2.044543E-03 | -2.906005E-04 | | | |
| 612 | -3.208637E-03 | 2.080193E-03 | -3.563968E-04 | | | |
| 621 | -3.658653E-02 | 1.504031E-02 | -2.207636E-03 | | | |
| 622 | -1.679314E-02 | 6.822015E-03 | -7.729449E-04 | | | |
| 631 | -2.301929E-02 | 4.693495E-03 | | | | |
| 632 | -1.158943E-02 | 8.044872E-03 | -1.352470E-03 | | | |
| 641 | -5.143194E-02 | 2.025880E-02 | -2.979492E-03 | | | |
| 642 | -2.604822E-02 | 7.354149E-03 | -4.491824E-04 | -2.356117E-04 | 4.030591E-05 | 1.000000E+00 |
| 651 | 5.710133E-03 | -1.310072E-03 | 9.187777E-05 | -1.847299E-06 | 1.673696E-07 | 1.000000E+00 |
| 652 | 6.841478E-03 | -6.472496E-04 | -2.044570E-04 | 4.880093E-05 | -2.607893E-06 | 1.000000E+00 |
| 661 | 1.096569E-03 | -1.791673E-04 | 6.426870E-06 | 1.566637E-06 | -1.292885E-07 | 1.000000E+00 |
| 662 | -1.075439E-04 | 3.728007E-06 | 9.366053E-07 | -1.112286E-07 | 3.684255E-09 | 1.000000E+00 |
| 671 | 7.696724E-04 | -9.939383E-05 | 7.453484E-06 | -3.018066E-07 | 5.099501E-09 | 1.000000E+00 |
| 672 | 4.464237E-05 | -4.524188E-06 | 2.691934E-07 | -8.550490E-09 | 1.087552E-10 | 1.000000E+00 |

FIG.29

| Effective focal length (EFL) = 4.278 mm, HFOV (Half field of view) = 39.500deg., TTL = 5.964 mm, Image height = 3.526 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 700 | Aperture stop | INFINITY | -0.293 | | | | |
| 711 | 1st lens element | 2.354 | 0.656 | 1.545 | 55.987 | 6.146 | Plastic |
| 712 | | 7.103 | 0.074 | | | | |
| 721 | 2nd lens element | 3.465 | 0.266 | 1.661 | 20.373 | -30.185 | Plastic |
| 722 | | 2.866 | 0.342 | | | | |
| 731 | 3rd lens element | -70.385 | 0.461 | 1.545 | 55.987 | 7.763 | Plastic |
| 732 | | -4.009 | 0.050 | | | | |
| 741 | 4th lens element | 23.475 | 0.400 | 1.661 | 20.373 | -11.377 | Plastic |
| 742 | | 5.696 | 0.486 | | | | |
| 751 | 5th lens element | -2.924 | 0.586 | 1.545 | 55.987 | 4.857 | Plastic |
| 752 | | -1.489 | 0.050 | | | | |
| 761 | 6th lens element | 2.828 | 0.555 | 1.545 | 55.987 | -15.467 | Plastic |
| 762 | | 1.972 | 0.651 | | | | |
| 771 | 7th lens element | -11.808 | 0.486 | 1.545 | 55.987 | -5.705 | Plastic |
| 772 | | 4.295 | 0.197 | | | | |
| 781 | IR cut filter | INFINITY | 0.510 | | | | |
| 782 | | INFINITY | 0.193 | | | | |
| 790 | Image plane | INFINITY | | | | | |

FIG.32

| Aspherical parameters | | | | | |
|---|---|---|---|---|---|
| Surface # | K | $a_2$ | $a_4$ | $a_6$ | $a_8$ | $a_{10}$ |
| 711 | -4.139050E-01 | 0.000000E+00 | -2.463411E-04 | 1.161765E-03 | -9.808813E-03 | 8.635731E-03 |
| 712 | -1.757566E+01 | 0.000000E+00 | -5.999000E-02 | 1.259166E-02 | 2.171206E-03 | -2.068580E-03 |
| 721 | 1.698668E+00 | 0.000000E+00 | -9.325478E-02 | 9.589819E-03 | 1.205500E-03 | 3.546043E-02 |
| 722 | 6.452843E-01 | 0.000000E+00 | -2.782027E-02 | -3.231316E-02 | 2.505345E-02 | 9.447749E-03 |
| 731 | 2.613046E+02 | 0.000000E+00 | 6.009379E-02 | -3.252191E-02 | -1.559693E-03 | -2.705394E-02 |
| 732 | -1.088576E+01 | 0.000000E+00 | 1.321923E-01 | -1.600387E-01 | 8.611359E-02 | -2.024860E-02 |
| 741 | -1.138535E+02 | 0.000000E+00 | 4.259471E-03 | -8.635450E-02 | 3.186435E-03 | 5.551923E-02 |
| 742 | -7.484092E+01 | 0.000000E+00 | -2.262559E-02 | -1.299690E-03 | -4.043947E-02 | 4.678932E-02 |
| 751 | -1.423385E+00 | 0.000000E+00 | 4.826510E-02 | -1.681226E-02 | 4.656913E-03 | -8.586505E-03 |
| 752 | -2.327145E+00 | 0.000000E+00 | 1.350175E-02 | -3.463914E-02 | 3.379037E-02 | -2.005542E-02 |
| 761 | -9.268920E+00 | 0.000000E+00 | -2.223559E-02 | -8.727074E-03 | 6.763091E-03 | -3.427427E-03 |
| 762 | -7.688468E+00 | 0.000000E+00 | -2.741875E-02 | 5.076188E-03 | -2.647516E-03 | 7.291831E-04 |
| 771 | 8.099461E+00 | 0.000000E+00 | -3.583444E-02 | -2.155644E-03 | 7.856210E-03 | -3.434216E-03 |
| 772 | -1.037955E+01 | 0.000000E+00 | -2.684435E-02 | 3.101176E-03 | 5.871778E-04 | -2.596779E-04 |
| Surface # | $a_{12}$ | $a_{14}$ | $a_{16}$ | $a_{18}$ | $a_{20}$ | $R_N$ |
| 711 | -6.753856E-03 | 2.009571E-03 | -2.668856E-04 | | | |
| 712 | -3.269293E-03 | 2.071391E-03 | -3.377272E-04 | | | |
| 721 | -3.656929E-02 | 1.504311E-02 | -2.216718E-03 | | | |
| 722 | -1.680530E-02 | 6.823367E-03 | -7.668244E-04 | | | |
| 731 | 4.010166E-02 | -2.299564E-02 | 4.703874E-03 | | | |
| 732 | -1.165278E-02 | 8.006764E-03 | -1.363185E-03 | | | |
| 741 | -5.133526E-02 | 2.028838E-02 | -2.984304E-03 | | | |
| 742 | -2.600459E-02 | 7.358828E-03 | -4.499408E-04 | -2.356117E-04 | 4.125937E-05 | 1.000000E+00 |
| 751 | 5.706128E-03 | -1.309055E-03 | 9.302476E-05 | -1.847299E-06 | 3.612358E-07 | 1.000000E+00 |
| 752 | 6.846179E-03 | -6.460693E-04 | -2.041479E-04 | 4.880093E-05 | -2.571177E-06 | 1.000000E+00 |
| 761 | 1.093277E-03 | -1.800009E-04 | 6.360249E-06 | 1.566637E-06 | -1.214886E-07 | 1.000000E+00 |
| 762 | -1.078017E-04 | 3.676885E-06 | 9.194260E-07 | -1.112286E-07 | 3.178850E-09 | 1.000000E+00 |
| 771 | 7.697273E-04 | -9.939499E-05 | 7.453611E-06 | -3.018066E-07 | 5.062475E-09 | 1.000000E+00 |
| 772 | 4.473840E-05 | -4.510168E-06 | 2.701214E-07 | -8.550490E-09 | 9.626382E-11 | 1.000000E+00 |

FIG.33

| Effective focal length (EFL) = 4.307 mm, HFOV (Half field of view) = 39.500deg., TTL = 5.918 mm, Image height = 3.551 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 800 | Aperture stop | INFINITY | -0.322 | | | | |
| 811 | 1st lens element | 2.329 | 0.745 | 1.545 | 55.987 | 6.193 | Plastic |
| 812 | | 6.635 | 0.112 | | | | |
| 821 | 2nd lens element | 3.530 | 0.372 | 1.661 | 20.373 | -32.229 | Plastic |
| 822 | | 2.904 | 0.372 | | | | |
| 831 | 3rd lens element | -46.951 | 0.461 | 1.545 | 55.987 | 7.048 | Plastic |
| 832 | | -3.571 | 0.040 | | | | |
| 841 | 4th lens element | 10.033 | 0.302 | 1.661 | 20.373 | -10.133 | Plastic |
| 842 | | 3.990 | 0.404 | | | | |
| 851 | 5th lens element | -2.845 | 0.700 | 1.545 | 55.987 | 4.646 | Plastic |
| 852 | | -1.458 | 0.041 | | | | |
| 861 | 6th lens element | 2.162 | 0.420 | 1.545 | 55.987 | -14.547 | Plastic |
| 862 | | 1.583 | 0.781 | | | | |
| 871 | 7th lens element | -13.067 | 0.240 | 1.545 | 55.987 | -6.090 | Plastic |
| 872 | | 4.492 | 0.223 | | | | |
| 881 | IR cut filter | INFINITY | 0.510 | | | | |
| 882 | | INFINITY | 0.193 | | | | |
| 890 | Image plane | INFINITY | | | | | |

FIG.36

| Aspherical parameters | | | | | |
|---|---|---|---|---|---|
| Surface # | K | $a_2$ | $a_4$ | $a_6$ | $a_8$ | $a_{10}$ |
| 811 | -3.521909E-01 | 0.000000E+00 | 4.127972E-04 | 1.641714E-03 | -8.920537E-03 | 9.223967E-03 |
| 812 | -2.821958E+01 | 0.000000E+00 | -5.975685E-02 | 1.405520E-02 | 3.054771E-03 | -1.718734E-03 |
| 821 | 1.488390E+00 | 0.000000E+00 | -9.415438E-02 | 8.569611E-03 | 8.921176E-04 | 3.535347E-02 |
| 822 | 7.535771E-01 | 0.000000E+00 | -2.713106E-02 | -3.161142E-02 | 2.545621E-02 | 9.675313E-03 |
| 831 | -8.378125E+02 | 0.000000E+00 | 5.704932E-02 | -3.477986E-02 | -2.496446E-03 | -2.717439E-02 |
| 832 | -2.065263E+01 | 0.000000E+00 | 1.370270E-01 | -1.618725E-01 | 8.481936E-02 | -2.044672E-02 |
| 841 | -1.436938E+01 | 0.000000E+00 | 8.038209E-03 | -8.320764E-02 | 3.869977E-03 | 5.531272E-02 |
| 842 | -4.951064E+01 | 0.000000E+00 | -1.962838E-02 | -1.658273E-03 | -4.047795E-02 | 4.682616E-02 |
| 851 | -8.911119E-01 | 0.000000E+00 | 4.589112E-02 | -1.655722E-02 | 4.804762E-03 | -8.531693E-03 |
| 852 | -2.286472E+00 | 0.000000E+00 | 8.160222E-03 | -3.542832E-02 | 3.382801E-02 | -2.004541E-02 |
| 861 | -7.067454E+00 | 0.000000E+00 | -2.495489E-02 | -9.098006E-03 | 6.628892E-03 | -3.405619E-03 |
| 862 | -5.441110E+00 | 0.000000E+00 | -2.751083E-02 | 5.165671E-03 | -2.552823E-03 | 7.367486E-04 |
| 871 | -3.975162E+00 | 0.000000E+00 | -3.456635E-02 | -2.220613E-03 | 7.851649E-03 | -3.434370E-03 |
| 872 | -1.805923E+01 | 0.000000E+00 | -2.786715E-02 | 2.654087E-03 | 5.955864E-04 | -2.557373E-04 |
| Surface # | $a_{12}$ | $a_{14}$ | $a_{16}$ | $a_{18}$ | $a_{20}$ | $R_N$ |
| 811 | -6.485556E-03 | 2.085129E-03 | -3.173065E-04 | | | |
| 812 | -3.192745E-03 | 2.059418E-03 | -3.890008E-04 | | | |
| 821 | -3.668281E-02 | 1.495283E-02 | -2.233849E-03 | | | |
| 822 | -1.672696E-02 | 6.803217E-03 | -8.341309E-04 | | | |
| 831 | 4.020301E-02 | -2.291410E-02 | 4.739725E-03 | | | |
| 832 | -1.156751E-02 | 8.090945E-03 | -1.327919E-03 | | | |
| 841 | -5.149602E-02 | 2.026437E-02 | -2.943858E-03 | | | |
| 842 | -2.598123E-02 | 7.368524E-03 | -4.480036E-04 | -2.356117E-04 | 3.953767E-05 | 1.000000E+00 |
| 851 | 5.719535E-03 | -1.308201E-03 | 9.185456E-05 | -1.847299E-06 | -1.331615E-07 | 1.000000E+00 |
| 852 | 6.844319E-03 | -6.473222E-04 | -2.045947E-04 | 4.880093E-05 | -2.622946E-06 | 1.000000E+00 |
| 861 | 1.102395E-03 | -1.785468E-04 | 6.414748E-06 | 1.566637E-06 | -1.359145E-07 | 1.000000E+00 |
| 862 | -1.078074E-04 | 3.682984E-06 | 9.341420E-07 | -1.112286E-07 | 3.731493E-09 | 1.000000E+00 |
| 871 | 7.696712E-04 | -9.939548E-05 | 7.453350E-06 | -3.018066E-07 | 5.103628E-09 | 1.000000E+00 |
| 872 | 4.465273E-05 | -4.529216E-06 | 2.688698E-07 | -8.550490E-09 | 1.137411E-10 | 1.000000E+00 |

FIG.37

| Effective focal length (EFL) = 4.622 mm, HFOV (Half field of view) = 39.500deg., TTL = 6.374 mm, Image height= 3.810 mm, Fno = 1.7 |||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 900 | Aperture stop | INFINITY | -0.332 | | | | |
| 911 | 1st lens element | 2.368 | 0.616 | 1.545 | 55.987 | 7.387 | Plastic |
| 912 | | 5.206 | 0.099 | | | | |
| 921 | 2nd lens element | 2.999 | 0.240 | 1.661 | 20.373 | -30.136 | Plastic |
| 922 | | 2.526 | 0.403 | | | | |
| 931 | 3rd lens element | -47.534 | 0.401 | 1.545 | 55.987 | 12.164 | Plastic |
| 932 | | -5.847 | 0.050 | | | | |
| 941 | 4th lens element | 5.287 | 0.240 | 1.661 | 20.373 | -18.339 | Plastic |
| 942 | | 3.625 | 0.585 | | | | |
| 951 | 5th lens element | -2.913 | 0.652 | 1.545 | 55.987 | 3.956 | Plastic |
| 952 | | -1.339 | 0.050 | | | | |
| 961 | 6th lens element | 1.757 | 0.240 | 1.545 | 55.987 | -26.203 | Plastic |
| 962 | | 1.489 | 0.326 | | | | |
| 971 | 7th lens element | 2.662 | 0.240 | 1.545 | 55.987 | -6.895 | Plastic |
| 972 | | 1.510 | 1.531 | | | | |
| 981 | IR cut filter | INFINITY | 0.510 | | | | |
| 982 | | INFINITY | 0.193 | | | | |
| 990 | Image plane | INFINITY | | | | | |

FIG.40

| Aspherical parameters | | | | | |
|---|---|---|---|---|---|
| Surface # | K | $a_2$ | $a_4$ | $a_6$ | $a_8$ | $a_{10}$ |
| 911 | -4.371399E-01 | 0.000000E+00 | -1.307791E-03 | 2.601682E-03 | -9.676659E-03 | 9.046399E-03 |
| 912 | -9.587037E+00 | 0.000000E+00 | -5.919255E-02 | 1.184883E-02 | 1.985601E-03 | -1.783641E-03 |
| 921 | 1.024955E+00 | 0.000000E+00 | -9.773780E-02 | 6.555355E-03 | 4.737218E-04 | 3.566938E-02 |
| 922 | 5.347971E-01 | 0.000000E+00 | -3.373406E-02 | -3.202402E-02 | 2.591275E-02 | 9.525995E-03 |
| 931 | -9.762189E+01 | 0.000000E+00 | 6.285111E-02 | -3.323776E-02 | -3.016137E-03 | -2.722989E-02 |
| 932 | -7.711596E+01 | 0.000000E+00 | 1.249378E-01 | -1.542818E-01 | 8.651890E-02 | -2.080738E-02 |
| 941 | -1.269068E+01 | 0.000000E+00 | -3.264557E-03 | -8.939817E-02 | 3.578388E-03 | 5.592762E-02 |
| 942 | -2.046212E+01 | 0.000000E+00 | -3.873738E-02 | -5.219448E-03 | -4.063730E-02 | 4.696767E-02 |
| 951 | -2.437509E-01 | 0.000000E+00 | 4.077204E-02 | -1.283735E-02 | 5.350156E-03 | -8.902714E-03 |
| 952 | -2.027812E+00 | 0.000000E+00 | 1.554915E-02 | -3.633203E-02 | 3.356316E-02 | -2.000743E-02 |
| 961 | -6.976664E+00 | 0.000000E+00 | -2.179745E-02 | -9.801273E-03 | 6.534789E-03 | -3.411032E-03 |
| 962 | -6.339849E+00 | 0.000000E+00 | -2.984140E-02 | 5.045652E-03 | -2.576782E-03 | 7.333795E-04 |
| 971 | -6.000670E+01 | 0.000000E+00 | -3.013236E-02 | -2.958693E-03 | 7.780965E-03 | -3.435817E-03 |
| 972 | -1.045453E+01 | 0.000000E+00 | -2.660858E-02 | 2.525632E-03 | 5.405274E-04 | -2.585154E-04 |
| Surface # | $a_{12}$ | $a_{14}$ | $a_{16}$ | $a_{18}$ | $a_{20}$ | $R_N$ |
| 911 | -6.593458E-03 | 1.961206E-03 | -2.510945E-04 | | | |
| 912 | -2.990207E-03 | 2.150340E-03 | -4.298566E-04 | | | |
| 921 | -3.631385E-02 | 1.510096E-02 | -2.342177E-03 | | | |
| 922 | -1.694758E-02 | 6.716621E-03 | -7.991222E-04 | | | |
| 931 | 4.029488E-02 | -2.286914E-02 | 4.666493E-03 | | | |
| 932 | -1.174833E-02 | 8.040360E-03 | -1.349357E-03 | | | |
| 941 | -5.130242E-02 | 2.026295E-02 | -2.976664E-03 | | | |
| 942 | -2.590486E-02 | 7.393275E-03 | -4.423923E-04 | -2.356117E-04 | 3.922714E-05 | 1.000000E+00 |
| 951 | 5.620831E-03 | -1.303589E-03 | 9.974740E-05 | -1.847299E-06 | 4.019561E-07 | 1.000000E+00 |
| 952 | 6.864627E-03 | -6.435245E-04 | -2.042469E-04 | 4.880093E-05 | -2.615408E-06 | 1.000000E+00 |
| 961 | 1.102567E-03 | -1.784237E-04 | 6.439739E-06 | 1.566637E-06 | -1.354933E-07 | 1.000000E+00 |
| 962 | -1.081033E-04 | 3.695859E-06 | 9.413969E-07 | -1.112286E-07 | 4.062938E-09 | 1.000000E+00 |
| 971 | 7.700413E-04 | -9.932472E-05 | 7.459424E-06 | -3.018066E-07 | 5.016976E-09 | 1.000000E+00 |
| 972 | 4.476010E-05 | -4.496564E-06 | 2.719858E-07 | -8.550490E-09 | 9.986062E-11 | 1.000000E+00 |

FIG.41

| \multicolumn{7}{|c|}{Effective focal length (EFL) = 4.349 mm, HFOV (Half field of view) = 39.500deg., TTL = 5.926 mm, Image height= 3.585 mm, Fno = 1.7} |||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 1011 | 1st lens element | 2.324 | 0.739 | 1.545 | 55.987 | 6.073 | Plastic |
| 1012 | | 6.887 | 0.131 | | | | |
| 1000 | Aperture stop | INFINITY | 0.005 | | | | |
| 1021 | 2nd lens element | 3.570 | 0.291 | 1.661 | 20.373 | -27.864 | Plastic |
| 1022 | | 2.952 | 0.406 | | | | |
| 1031 | 3rd lens element | -47.394 | 0.514 | 1.545 | 55.987 | 7.845 | Plastic |
| 1032 | | -4.034 | 0.117 | | | | |
| 1041 | 4th lens element | 8.838 | 0.277 | 1.661 | 20.373 | -13.251 | Plastic |
| 1042 | | 3.794 | 0.430 | | | | |
| 1051 | 5th lens element | -3.539 | 0.655 | 1.545 | 55.987 | 4.996 | Plastic |
| 1052 | | -1.682 | 0.148 | | | | |
| 1061 | 6th lens element | 2.355 | 0.365 | 1.545 | 55.987 | -20.037 | Plastic |
| 1062 | | 1.832 | 0.638 | | | | |
| 1071 | 7th lens element | -10.456 | 0.227 | 1.545 | 55.987 | -5.162 | Plastic |
| 1072 | | 3.891 | 0.400 | | | | |
| 1081 | IR cut filter | INFINITY | 0.510 | | | | |
| 1082 | | INFINITY | 0.073 | | | | |
| 1090 | Image plane | INFINITY | | | | | |

FIG.44

| Aspherical parameters | | | | | | |
|---|---|---|---|---|---|---|
| Surface # | K | $a_2$ | $a_4$ | $a_6$ | $a_8$ | $a_{10}$ |
| 1011 | -3.656096E-01 | 0.000000E+00 | -5.458454E-04 | 2.207436E-03 | -8.436947E-03 | 9.318275E-03 |
| 1012 | -9.729703E+00 | 0.000000E+00 | -5.798362E-02 | 1.442581E-02 | 2.889439E-03 | -1.788103E-03 |
| 1021 | 9.719912E-01 | 5.069048E-03 | -9.653169E-02 | 8.318564E-03 | 9.343872E-04 | 3.526767E-02 |
| 1022 | 1.022515E-01 | 8.698188E-03 | -3.310231E-02 | -3.230582E-02 | 2.528493E-02 | 9.284399E-03 |
| 1031 | 2.104803E-01 | -1.824153E-03 | 4.619448E-02 | -3.665079E-02 | -1.987393E-03 | -2.697487E-02 |
| 1032 | -1.904383E+00 | -4.534977E-03 | 1.349142E-01 | -1.600784E-01 | 8.490517E-02 | -2.076159E-02 |
| 1041 | 4.953816E-01 | 5.077333E-03 | 8.638660E-03 | -8.464427E-02 | 3.348158E-03 | 5.527630E-02 |
| 1042 | -1.653096E+01 | -1.196784E-02 | -2.434470E-02 | -2.113218E-03 | -4.054130E-02 | 4.676377E-02 |
| 1051 | -1.733603E-01 | 9.501598E-03 | 4.149744E-02 | -1.605241E-02 | 4.961794E-03 | -8.500090E-03 |
| 1052 | -2.512663E+00 | 0.000000E+00 | 1.085817E-02 | -3.467886E-02 | 3.398161E-02 | -2.002427E-02 |
| 1061 | -5.343374E+00 | 0.000000E+00 | -2.606964E-02 | -9.153824E-03 | 6.647246E-03 | -3.404130E-03 |
| 1062 | -4.539079E+00 | 0.000000E+00 | -2.935696E-02 | 4.922076E-03 | -2.571875E-03 | 7.363391E-04 |
| 1071 | 2.307981E-01 | 0.000000E+00 | -3.383518E-02 | -2.236806E-03 | 7.847506E-03 | -3.434669E-03 |
| 1072 | -8.056931E+00 | 0.000000E+00 | -2.515472E-02 | 2.658215E-03 | 5.894940E-04 | -2.554235E-04 |
| Surface # | $a_{12}$ | $a_{14}$ | $a_{16}$ | $a_{18}$ | $a_{20}$ | $R_N$ |
| 1011 | -6.542531E-03 | 2.055170E-03 | -2.809286E-04 | | | |
| 1012 | -3.139649E-03 | 2.119196E-03 | -4.004716E-04 | | | |
| 1021 | -3.682488E-02 | 1.488500E-02 | -2.168740E-03 | | | |
| 1022 | -1.711834E-02 | 6.504636E-03 | -1.157711E-03 | | | |
| 1031 | 3.974904E-02 | -2.365541E-02 | 4.035336E-03 | | | |
| 1032 | -1.175338E-02 | 8.072870E-03 | -1.261975E-03 | | | |
| 1041 | -5.144811E-02 | 2.027770E-02 | -2.956133E-03 | | | |
| 1042 | -2.601640E-02 | 7.357118E-03 | -4.506991E-04 | -2.355374E-04 | 3.932011E-05 | 1.001086E+00 |
| 1051 | 5.722812E-03 | -1.307339E-03 | 9.199947E-05 | -1.759439E-06 | -4.932479E-07 | 1.020520E+00 |
| 1052 | 6.844783E-03 | -6.479824E-04 | -2.047121E-04 | 4.872333E-05 | -2.619257E-06 | 1.018765E+00 |
| 1061 | 1.102102E-03 | -1.786947E-04 | 6.385196E-06 | 1.563949E-06 | -1.350895E-07 | 9.365599E-01 |
| 1062 | -1.076914E-04 | 3.710382E-06 | 9.373329E-07 | -1.107326E-07 | 3.677614E-09 | 9.285216E-01 |
| 1071 | 7.696660E-04 | -9.939489E-05 | 7.453407E-06 | -3.018099E-07 | 5.103466E-09 | 9.177017E-01 |
| 1072 | 4.468812E-05 | -4.527322E-06 | 2.688238E-07 | -8.556658E-09 | 1.108501E-10 | 8.711087E-01 |

FIG.45

| Effective focal length (EFL) = 4.484 mm, HFOV (Half field of view) = 39.500deg., TTL = 6.266 mm, Image height= 3.696 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 11'00 | Aperture stop | INFINITY | -0.335 | | | | |
| 11'11 | 1st lens element | 2.361 | 0.635 | 1.545 | 55.987 | 6.286 | Plastic |
| 11'12 | | 6.841 | 0.111 | | | | |
| 11'21 | 2nd lens element | 3.343 | 0.283 | 1.545 | 55.987 | -33.381 | Plastic |
| 11'22 | | 2.741 | 0.371 | | | | |
| 11'31 | 3rd lens element | -40.724 | 0.509 | 1.545 | 55.987 | 7.579 | Plastic |
| 11'32 | | -3.775 | 0.050 | | | | |
| 11'41 | 4th lens element | 40.526 | 0.339 | 1.661 | 20.373 | -8.027 | Plastic |
| 11'42 | | 4.714 | 0.318 | | | | |
| 11'51 | 5th lens element | -3.924 | 0.814 | 1.545 | 55.987 | 4.531 | Plastic |
| 11'52 | | -1.629 | 0.109 | | | | |
| 11'61 | 6th lens element | 2.505 | 0.409 | 1.545 | 55.987 | -21.606 | Plastic |
| 11'62 | | 1.947 | 0.588 | | | | |
| 11'71 | 7th lens element | 26.286 | 0.570 | 1.545 | 55.987 | -6.191 | Plastic |
| 11'72 | | 2.974 | 0.459 | | | | |
| 11'81 | IR cut filter | INFINITY | 0.510 | | | | |
| 11'82 | | INFINITY | 0.193 | | | | |
| 11'90 | Image plane | INFINITY | | | | | |

FIG.48

| Aspherical parameters | | | | | |
|---|---|---|---|---|---|
| Surface # | K | $a_2$ | $a_4$ | $a_6$ | $a_8$ | $a_{10}$ |
| 11'11 | -3.548051E-01 | 0.000000E+00 | 1.076796E-04 | 2.802617E-03 | -9.271264E-03 | 9.113425E-03 |
| 11'12 | -3.346265E+00 | 0.000000E+00 | -5.682780E-02 | 1.188714E-02 | 2.007677E-03 | -1.717227E-03 |
| 11'21 | 8.916995E-01 | 0.000000E+00 | -9.924805E-02 | 7.647294E-03 | 8.550284E-04 | 3.575377E-02 |
| 11'22 | 4.090242E-01 | 0.000000E+00 | -3.167652E-02 | -3.349229E-02 | 2.546135E-02 | 9.488525E-03 |
| 11'31 | 9.499679E+01 | 0.000000E+00 | 4.277289E-02 | -2.754013E-02 | -2.122556E-03 | -2.746677E-02 |
| 11'32 | -9.115079E+00 | 0.000000E+00 | 1.231735E-01 | -1.606660E-01 | 8.600512E-02 | -2.064598E-02 |
| 11'41 | -9.499973E+01 | 0.000000E+00 | -7.978458E-03 | -8.967025E-02 | 3.068571E-03 | 5.575982E-02 |
| 11'42 | -4.721621E+01 | 0.000000E+00 | -2.087290E-02 | -1.262944E-03 | -4.048574E-02 | 4.674372E-02 |
| 11'51 | -1.383583E+00 | 0.000000E+00 | 4.583496E-02 | -1.502886E-02 | 5.058377E-03 | -8.685010E-03 |
| 11'52 | -1.383571E+00 | 0.000000E+00 | 1.786026E-02 | -3.424634E-02 | 3.348659E-02 | -2.011914E-02 |
| 11'61 | -6.190425E+00 | 0.000000E+00 | -2.558327E-02 | -8.640328E-03 | 6.687428E-03 | -3.407401E-03 |
| 11'62 | -4.581331E+00 | 0.000000E+00 | -2.903082E-02 | 5.175977E-03 | -2.541997E-03 | 7.381512E-04 |
| 11'71 | -9.500839E+01 | 0.000000E+00 | -3.839820E-02 | -2.226688E-03 | 7.852066E-03 | -3.435332E-03 |
| 11'72 | -6.307081E+00 | 0.000000E+00 | -2.894074E-02 | 2.721255E-03 | 6.009368E-04 | -2.554461E-04 |
| Surface # | $a_{12}$ | $a_{14}$ | $a_{16}$ | $a_{18}$ | $a_{20}$ | $R_N$ |
| 11'11 | -6.536240E-03 | 2.024561E-03 | -3.135945E-04 | | | |
| 11'12 | -2.961992E-03 | 2.134697E-03 | -4.461745E-04 | | | |
| 11'21 | -3.625984E-02 | 1.515216E-02 | -2.334694E-03 | | | |
| 11'22 | -1.692079E-02 | 6.774576E-03 | -7.273872E-04 | | | |
| 11'31 | 4.011042E-02 | -2.296118E-02 | 4.615732E-03 | | | |
| 11'32 | -1.173394E-02 | 8.024580E-03 | -1.337252E-03 | | | |
| 11'41 | -5.127827E-02 | 2.029935E-02 | -2.968507E-03 | | | |
| 11'42 | -2.601788E-02 | 7.357670E-03 | -4.500409E-04 | -2.356117E-04 | 3.984603E-05 | 1.000000E+00 |
| 11'51 | 5.626134E-03 | -1.318987E-03 | 9.445917E-05 | -1.847299E-06 | 6.760335E-07 | 1.000000E+00 |
| 11'52 | 6.842978E-03 | -6.452643E-04 | -2.039964E-04 | 4.880093E-05 | -2.572100E-06 | 1.000000E+00 |
| 11'61 | 1.101616E-03 | -1.786096E-04 | 6.415032E-06 | 1.566637E-06 | -1.358227E-07 | 1.000000E+00 |
| 11'62 | -1.079187E-04 | 3.665383E-06 | 9.343266E-07 | -1.112286E-07 | 3.970354E-09 | 1.000000E+00 |
| 11'71 | 7.696725E-04 | -9.938771E-05 | 7.454444E-06 | -3.018066E-07 | 5.125121E-09 | 1.000000E+00 |
| 11'72 | 4.456999E-05 | -4.531870E-06 | 2.693324E-07 | -8.550490E-09 | 1.114944E-10 | 1.000000E+00 |

FIG.49

| Effective focal length (EFL) = 4.262 mm, HFOV (Half field of view) = 39.500deg., TTL = 5.978 mm, Image height= 3.514 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 12'00 | Aperture stop | INFINITY | -0.274 | | | | |
| 12'11 | 1st lens element | 2.514 | 0.831 | 1.545 | 55.987 | 5.685 | Plastic |
| 12'12 | | 11.642 | 0.155 | | | | |
| 12'21 | 2nd lens element | -156.605 | 0.240 | 1.661 | 20.373 | -26.688 | Plastic |
| 12'22 | | 20.100 | 0.416 | | | | |
| 12'31 | 3rd lens element | -70.755 | 0.522 | 1.545 | 55.987 | 6.182 | Plastic |
| 12'32 | | -3.232 | 0.050 | | | | |
| 12'41 | 4th lens element | 9.032 | 0.299 | 1.661 | 20.373 | -10.607 | Plastic |
| 12'42 | | 3.915 | 0.518 | | | | |
| 12'51 | 5th lens element | -2.512 | 0.647 | 1.545 | 55.987 | 5.063 | Plastic |
| 12'52 | | -1.436 | 0.050 | | | | |
| 12'61 | 6th lens element | 2.090 | 0.364 | 1.545 | 55.987 | -15.368 | Plastic |
| 12'62 | | 1.571 | 0.752 | | | | |
| 12'71 | 7th lens element | -9.992 | 0.240 | 1.545 | 55.987 | -5.091 | Plastic |
| 12'72 | | 3.886 | 0.192 | | | | |
| 12'81 | IR cut filter | INFINITY | 0.510 | | | | |
| 12'82 | | INFINITY | 0.193 | | | | |
| 12'90 | Image plane | INFINITY | | | | | |

FIG.52

| Aspherical parameters | | | | | |
|---|---|---|---|---|---|
| Surface # | K | $a_2$ | $a_4$ | $a_6$ | $a_8$ | $a_{10}$ |
| 12'11 | -6.425953E-01 | 0.000000E+00 | -3.585271E-03 | 2.522402E-03 | -8.597602E-03 | 9.132164E-03 |
| 12'12 | 8.168207E+00 | 0.000000E+00 | -6.151328E-02 | 6.245285E-03 | 1.371451E-03 | -1.381157E-03 |
| 12'21 | 1.000000E+02 | 0.000000E+00 | -8.467137E-02 | 8.193258E-03 | -7.775374E-04 | 3.453804E-02 |
| 12'22 | -1.607691E+01 | 0.000000E+00 | -2.998441E-02 | -3.114874E-02 | 2.450797E-02 | 8.851312E-03 |
| 12'31 | 2.577370E+03 | 0.000000E+00 | 6.227231E-02 | -4.099875E-02 | -2.785368E-03 | -2.677483E-02 |
| 12'32 | -1.689657E+01 | 0.000000E+00 | 1.396433E-01 | -1.616868E-01 | 8.473166E-02 | -2.043722E-02 |
| 12'41 | -2.805652E+01 | 0.000000E+00 | 6.438098E-03 | -8.281265E-02 | 3.852685E-03 | 5.520153E-02 |
| 12'42 | -4.935879E+01 | 0.000000E+00 | -2.109054E-02 | -1.717707E-03 | -4.033917E-02 | 4.686514E-02 |
| 12'51 | -1.264318E+00 | 0.000000E+00 | 4.954014E-02 | -1.452990E-02 | 4.971640E-03 | -8.722010E-03 |
| 12'52 | -2.278745E+00 | 0.000000E+00 | 1.281026E-02 | -3.439991E-02 | 3.370037E-02 | -2.012817E-02 |
| 12'61 | -7.414932E+00 | 0.000000E+00 | -2.663374E-02 | -9.075796E-03 | 6.651854E-03 | -3.402940E-03 |
| 12'62 | -5.745304E+00 | 0.000000E+00 | -2.810428E-02 | 4.812801E-03 | -2.604733E-03 | 7.342048E-04 |
| 12'71 | -3.810121E+00 | 0.000000E+00 | -3.442747E-02 | -2.205507E-03 | 7.853061E-03 | -3.434157E-03 |
| 12'72 | -1.194815E+01 | 0.000000E+00 | -2.495788E-02 | 2.797164E-03 | 6.085290E-04 | -2.565797E-04 |
| Surface # | $a_{12}$ | $a_{14}$ | $a_{16}$ | $a_{18}$ | $a_{20}$ | $R_N$ |
| 12'11 | -6.579322E-03 | 2.065504E-03 | -3.075236E-04 | | | |
| 12'12 | -2.751750E-03 | 2.239032E-03 | -3.908516E-04 | | | |
| 12'21 | -3.679300E-02 | 1.511506E-02 | -2.059274E-03 | | | |
| 12'22 | -1.709526E-02 | 6.754577E-03 | -7.281164E-04 | | | |
| 12'31 | 4.034543E-02 | -2.295021E-02 | 4.656018E-03 | | | |
| 12'32 | -1.157339E-02 | 8.077891E-03 | -1.337407E-03 | | | |
| 12'41 | -5.154602E-02 | 2.025035E-02 | -2.945739E-03 | | | |
| 12'42 | -2.598326E-02 | 7.363419E-03 | -4.507903E-04 | -2.361362E-04 | 3.904258E-05 | 1.000000E+00 |
| 12'51 | 5.647910E-03 | -1.319725E-03 | 9.224816E-05 | -6.688970E-07 | 4.697193E-08 | 1.000000E+00 |
| 12'52 | 6.823814E-03 | -6.506924E-04 | -2.046561E-04 | 4.894440E-05 | -2.501624E-06 | 1.000000E+00 |
| 12'61 | 1.102184E-03 | -1.786738E-04 | 6.394579E-06 | 1.565436E-06 | -1.347754E-07 | 1.000000E+00 |
| 12'62 | -1.077714E-04 | 3.720962E-06 | 9.411139E-07 | -1.099899E-07 | 3.819520E-09 | 1.000000E+00 |
| 12'71 | 7.697069E-04 | -9.939220E-05 | 7.453499E-06 | -3.018267E-07 | 5.097882E-09 | 1.000000E+00 |
| 12'72 | 4.448552E-05 | -4.540557E-06 | 2.685192E-07 | -8.512882E-09 | 1.197167E-10 | 1.000000E+00 |

FIG.53

| \multicolumn{7}{|c|}{Effective focal length (EFL) = 4.412 mm, HFOV (Half field of view) = 39.500deg., TTL = 6.120 mm, Image height= 3.637 mm, Fno = 1.7} |||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 13'00 | Aperture stop | INFINITY | -0.362 | | | | |
| 13'11 | 1st lens element | 2.317 | 0.631 | 1.545 | 55.987 | 5.733 | Plastic |
| 13'12 | | 8.043 | 0.108 | | | | |
| 13'21 | 2nd lens element | 3.468 | 0.213 | 1.661 | 20.373 | -49.530 | Plastic |
| 13'22 | | 2.881 | 0.400 | | | | |
| 13'31 | 3rd lens element | -16.406 | 0.555 | 1.545 | 55.987 | 8.616 | Plastic |
| 13'32 | | -3.976 | 0.079 | | | | |
| 13'41 | 4th lens element | -11.300 | 0.644 | 1.661 | 20.373 | -9.720 | Plastic |
| 13'42 | | 11.443 | 0.323 | | | | |
| 13'51 | 5th lens element | -3.054 | 0.792 | 1.545 | 55.987 | 3.899 | Plastic |
| 13'52 | | -1.445 | 0.066 | | | | |
| 13'61 | 6th lens element | 1.676 | 0.274 | 1.545 | 55.987 | -15.639 | Plastic |
| 13'62 | | 1.320 | 0.768 | | | | |
| 13'71 | 7th lens element | -8.004 | 0.142 | 1.545 | 55.987 | -4.397 | Plastic |
| 13'72 | | 3.453 | 0.400 | | | | |
| 13'81 | IR cut filter | INFINITY | 0.510 | | | | |
| 13'82 | | INFINITY | 0.214 | | | | |
| 13'90 | Image plane | INFINITY | | | | | |

FIG.56

| Aspherical parameters | | | | | |
|---|---|---|---|---|---|
| Surface # | K | $a_2$ | $a_4$ | $a_6$ | $a_8$ | $a_{10}$ |
| 13'11 | -1.509774E-01 | 0.000000E+00 | 3.405884E-03 | 2.445752E-03 | -8.494590E-03 | 9.598836E-03 |
| 13'12 | 1.303178E+01 | 0.000000E+00 | -4.963347E-02 | 1.333777E-02 | 1.241028E-03 | -2.005170E-03 |
| 13'21 | 2.503312E-01 | 2.258332E-02 | -9.754329E-02 | 4.379929E-03 | 4.415097E-04 | 3.561472E-02 |
| 13'22 | -2.030169E+00 | 1.365235E-02 | -4.302954E-02 | -3.156814E-02 | 2.623453E-02 | 9.621746E-03 |
| 13'31 | 1.620517E+02 | -1.249482E-02 | 2.033763E-02 | -2.570629E-02 | 3.300304E-03 | -2.730838E-02 |
| 13'32 | 3.084768E+00 | -2.096733E-02 | 9.975934E-02 | -1.585602E-01 | 8.805361E-02 | -1.865774E-02 |
| 13'41 | -2.535219E+02 | -2.351708E-02 | 1.069119E-03 | -8.896128E-02 | 3.570092E-03 | 5.612421E-02 |
| 13'42 | -1.035566E+02 | -3.942337E-02 | -1.634979E-02 | -1.539565E-03 | -4.089968E-02 | 4.672781E-02 |
| 13'51 | 7.070481E-02 | 2.714866E-02 | 3.631450E-02 | -1.605301E-02 | 5.647145E-03 | -8.393400E-03 |
| 13'52 | -2.103251E+00 | 0.000000E+00 | 1.036470E-02 | -3.504955E-02 | 3.378739E-02 | -2.004001E-02 |
| 13'61 | -5.563571E+00 | 0.000000E+00 | -2.188756E-02 | -1.007342E-02 | 6.532378E-03 | -3.412365E-03 |
| 13'62 | -4.091378E+00 | 0.000000E+00 | -2.940256E-02 | 4.893289E-03 | -2.574503E-03 | 7.366635E-04 |
| 13'71 | -2.307796E+01 | 0.000000E+00 | -3.266983E-02 | -2.384031E-03 | 7.829607E-03 | -3.434855E-03 |
| 13'72 | -1.448864E+01 | 0.000000E+00 | -2.030052E-02 | 2.326563E-03 | 5.827242E-04 | -2.552333E-04 |
| Surface # | $a_{12}$ | $a_{14}$ | $a_{16}$ | $a_{18}$ | $a_{20}$ | $R_N$ |
| 13'11 | -6.485561E-03 | 1.977361E-03 | -3.257412E-04 | | | |
| 13'12 | -2.909834E-03 | 2.236574E-03 | -4.608547E-04 | | | |
| 13'21 | -3.624874E-02 | 1.528335E-02 | -2.250852E-03 | | | |
| 13'22 | -1.694008E-02 | 6.723035E-03 | -6.185434E-04 | | | |
| 13'31 | 3.911102E-02 | -2.320616E-02 | 4.924847E-03 | | | |
| 13'32 | -1.094188E-02 | 8.042196E-03 | -1.620664E-03 | | | |
| 13'41 | -5.105935E-02 | 2.031440E-02 | -3.068480E-03 | | | |
| 13'42 | -2.596190E-02 | 7.388683E-03 | -4.409913E-04 | -2.340543E-04 | 3.903347E-05 | 1.066350E+00 |
| 13'51 | 5.691114E-03 | -1.327506E-03 | 8.779698E-05 | -9.459681E-07 | 5.664915E-07 | 1.025016E+00 |
| 13'52 | 6.856010E-03 | -6.434722E-04 | -2.040431E-04 | 4.865875E-05 | -2.645347E-06 | 1.043421E+00 |
| 13'61 | 1.102350E-03 | -1.784903E-04 | 6.420807E-06 | 1.567334E-06 | -1.351154E-07 | 9.436197E-01 |
| 13'62 | -1.076839E-04 | 3.708994E-06 | 9.369769E-07 | -1.108214E-07 | 3.664985E-09 | 9.028621E-01 |
| 13'71 | 7.697893E-04 | -9.937724E-05 | 7.454774E-06 | -3.018073E-07 | 5.081315E-09 | 9.461708E-01 |
| 13'72 | 4.471542E-05 | -4.525252E-06 | 2.689112E-07 | -8.555761E-09 | 1.103674E-10 | 8.649149E-01 |

FIG.57

| Effective focal length (EFL) = 4.601 mm, HFOV (Half field of view) = 39.500deg., TTL = 6.037 mm, Image height= 3.793 mm, Fno = 1.7 ||||||||
|---|---|---|---|---|---|---|---|
| Surface # | | Radius (mm) | Thickness / air gap (mm) | Refractive index | Abbe number | Focal length (mm) | Material |
| - | Object | INFINITY | INFINITY | | | | |
| 14'00 | Aperture stop | INFINITY | -0.458 | | | | |
| 14'11 | 1st lens element | 2.250 | 0.723 | 1.545 | 55.987 | 5.871 | Plastic |
| 14'12 | | 6.678 | 0.037 | | | | |
| 14'21 | 2nd lens element | 3.437 | 0.154 | 1.661 | 20.373 | -26.215 | Plastic |
| 14'22 | | 2.823 | 0.529 | | | | |
| 14'31 | 3rd lens element | -18.070 | 0.440 | 1.545 | 55.987 | 10.589 | Plastic |
| 14'32 | | -4.195 | 0.065 | | | | |
| 14'41 | 4th lens element | 35.402 | 0.242 | 1.661 | 20.373 | -18.095 | Plastic |
| 14'42 | | 4.124 | 0.620 | | | | |
| 14'51 | 5th lens element | -2.830 | 0.598 | 1.545 | 55.987 | 5.019 | Plastic |
| 14'52 | | -1.520 | 0.123 | | | | |
| 14'61 | 6th lens element | 1.167 | 0.179 | 1.545 | 55.987 | -22.697 | Plastic |
| 14'62 | | 1.009 | 1.068 | | | | |
| 14'71 | 7th lens element | -3.603 | 0.131 | 1.545 | 55.987 | -5.091 | Plastic |
| 14'72 | | 12.351 | 0.400 | | | | |
| 14'81 | IR cut filter | INFINITY | 0.510 | | | | |
| 14'82 | | INFINITY | 0.218 | | | | |
| 14'90 | Image plane | INFINITY | | | | | |

FIG.60

| Aspherical parameters | | | | | | |
|---|---|---|---|---|---|---|
| Surface # | K | $a_2$ | $a_4$ | $a_6$ | $a_8$ | $a_{10}$ |
| 14'11 | 1.337216E-03 | 0.000000E+00 | 3.736734E-03 | 5.621217E-03 | -8.665058E-03 | 9.866741E-03 |
| 14'12 | 1.504300E+01 | 0.000000E+00 | -4.577664E-02 | 1.321455E-02 | 1.560207E-03 | -1.696634E-03 |
| 14'21 | 3.635356E-01 | 2.138703E-02 | -9.603387E-02 | 3.164523E-03 | -4.359331E-04 | 3.514394E-02 |
| 14'22 | -1.824885E+00 | 2.240918E-02 | -4.069268E-02 | -2.849434E-02 | 2.639675E-02 | 9.159697E-03 |
| 14'31 | -9.705721E-03 | -2.956963E-02 | 1.275946E-02 | -2.552543E-02 | 1.574470E-03 | -2.810055E-02 |
| 14'32 | 2.378129E+00 | -2.198244E-02 | 1.009563E-01 | -1.557622E-01 | 8.827978E-02 | -1.900613E-02 |
| 14'41 | -1.686371E-02 | -9.846885E-03 | -1.885822E-03 | -9.228948E-02 | 3.515515E-02 | 5.676504E-02 |
| 14'42 | -1.290808E+01 | -7.507929E-02 | -3.521233E-02 | -7.270249E-04 | -4.024182E-02 | 4.668418E-02 |
| 14'51 | -2.973150E-01 | 7.018301E-03 | 3.473058E-02 | -1.237176E-02 | 6.414765E-03 | -8.380171E-03 |
| 14'52 | -1.899297E+00 | 0.000000E+00 | 1.772099E-02 | -3.371219E-02 | 3.379314E-02 | -2.008856E-02 |
| 14'61 | -4.122871E+00 | 0.000000E+00 | -2.638590E-02 | -1.035668E-02 | 6.565031E-03 | -3.410305E-03 |
| 14'62 | -3.453699E+00 | 0.000000E+00 | -3.017266E-02 | 4.928266E-03 | -2.553608E-03 | 7.393178E-04 |
| 14'71 | -7.972812E+00 | 0.000000E+00 | -3.051263E-02 | -2.372170E-03 | 7.820064E-03 | -3.435465E-03 |
| 14'72 | -1.299561E-02 | 0.000000E+00 | -2.131778E-02 | 2.239963E-03 | 5.837726E-04 | -2.552717E-04 |
| Surface # | $a_{12}$ | $a_{14}$ | $a_{16}$ | $a_{18}$ | $a_{20}$ | $R_N$ |
| 14'11 | -6.130914E-03 | 2.140539E-03 | -3.451108E-04 | | | |
| 14'12 | -2.807681E-03 | 2.221329E-03 | -4.615934E-04 | | | |
| 14'21 | -3.636368E-02 | 1.528544E-02 | -2.284026E-03 | | | |
| 14'22 | -1.719847E-02 | 6.702077E-03 | -4.936774E-04 | | | |
| 14'31 | 3.923026E-02 | -2.295240E-02 | 4.849397E-03 | | | |
| 14'32 | -1.103553E-02 | 8.104594E-03 | -1.560750E-03 | | | |
| 14'41 | -5.078295E-02 | 2.034078E-02 | -3.096372E-03 | | | |
| 14'42 | -2.603587E-02 | 7.374039E-03 | -4.362252E-04 | -2.304793E-04 | 3.864393E-05 | 9.972139E-01 |
| 14'51 | 5.651323E-03 | -1.343119E-03 | 8.363443E-05 | -1.389088E-06 | 7.888279E-07 | 1.039953E+00 |
| 14'52 | 6.842516E-03 | -6.458525E-04 | -2.042448E-04 | 4.873304E-05 | -2.587230E-06 | 1.018972E+00 |
| 14'61 | 1.102099E-03 | -1.785441E-04 | 6.417784E-06 | 1.568277E-06 | -1.347168E-07 | 1.001501E+00 |
| 14'62 | -1.075059E-04 | 3.711652E-06 | 9.354960E-07 | -1.111706E-07 | 3.605049E-09 | 9.179875E-01 |
| 14'71 | 7.697789E-04 | -9.937526E-05 | 7.455048E-06 | -3.017893E-07 | 5.081128E-09 | 9.638199E-01 |
| 14'72 | 4.470785E-05 | -4.525503E-06 | 2.689147E-07 | -8.554668E-09 | 1.104443E-10 | 8.745575E-01 |

FIG.61

| Embodiment | 1st | 2nd | 3rd | 4th | 5th | 6th | 7th |
|---|---|---|---|---|---|---|---|
| T1 | 0.660 | 0.678 | 0.669 | 0.705 | 0.619 | 0.672 | 0.656 |
| G12 | 0.210 | 0.087 | 0.158 | 0.123 | 0.099 | 0.113 | 0.074 |
| T2 | 0.211 | 0.287 | 0.298 | 0.382 | 0.250 | 0.319 | 0.266 |
| G23 | 0.343 | 0.339 | 0.348 | 0.385 | 0.441 | 0.344 | 0.342 |
| T3 | 0.646 | 0.461 | 0.539 | 0.472 | 0.494 | 0.481 | 0.461 |
| G34 | 0.072 | 0.050 | 0.081 | 0.050 | 0.050 | 0.040 | 0.050 |
| T4 | 0.325 | 0.292 | 0.538 | 0.316 | 0.426 | 0.500 | 0.400 |
| G45 | 0.403 | 0.498 | 0.428 | 0.356 | 0.374 | 0.465 | 0.486 |
| T5 | 0.763 | 0.598 | 0.688 | 0.722 | 0.668 | 0.628 | 0.586 |
| G56 | 0.003 | 0.050 | 0.150 | 0.050 | 0.050 | 0.040 | 0.050 |
| T6 | 0.424 | 0.409 | 0.427 | 0.411 | 0.617 | 0.532 | 0.555 |
| G67 | 0.483 | 0.614 | 0.679 | 0.727 | 0.483 | 0.635 | 0.651 |
| T7 | 0.350 | 0.639 | 0.246 | 0.240 | 0.250 | 0.240 | 0.486 |
| G7F | 0.280 | 0.179 | 0.400 | 0.272 | 0.306 | 0.212 | 0.197 |
| TF | 0.509 | 0.510 | 0.510 | 0.510 | 0.510 | 0.510 | 0.510 |
| GFP | 0.226 | 0.193 | 0.147 | 0.193 | 0.193 | 0.193 | 0.193 |
| EFL | 4.288 | 4.278 | 4.664 | 4.283 | 4.249 | 4.229 | 4.278 |
| TL | 4.892 | 5.003 | 5.250 | 4.938 | 4.821 | 5.008 | 5.064 |
| BFL | 1.016 | 0.882 | 1.057 | 0.975 | 1.009 | 0.915 | 0.900 |
| ALT | 3.379 | 3.365 | 3.405 | 3.248 | 3.325 | 3.371 | 3.410 |
| Gaa | 1.513 | 1.638 | 1.845 | 1.690 | 1.497 | 1.637 | 1.654 |
| TTL | 5.908 | 5.885 | 6.307 | 5.913 | 5.831 | 5.922 | 5.964 |
| T1/G45 | 1.639 | 1.361 | 1.563 | 1.980 | 1.656 | 1.444 | 1.348 |
| T1/G23 | 1.925 | 2.000 | 1.919 | 1.832 | 1.405 | 1.953 | 1.916 |
| T3/G23 | 1.886 | 1.360 | 1.548 | 1.227 | 1.121 | 1.397 | 1.347 |
| T4/G45 | 0.807 | 0.586 | 1.257 | 0.889 | 1.138 | 1.074 | 0.822 |
| T5/G67 | 1.581 | 0.974 | 1.013 | 0.994 | 1.385 | 0.989 | 0.900 |
| (TL+ALT)/(BFL+Gaa) | 3.270 | 3.320 | 2.982 | 3.072 | 3.250 | 3.284 | 3.317 |
| (G12+T3)/G23 | 2.499 | 1.616 | 2.001 | 1.546 | 1.346 | 1.725 | 1.564 |
| (G12+T4)/G23 | 1.561 | 1.117 | 1.997 | 1.142 | 1.191 | 1.780 | 1.386 |
| (G12+T2+G23)/G45 | 1.898 | 1.432 | 1.881 | 2.500 | 2.111 | 1.668 | 1.403 |
| TTL/(BFL+G45) | 4.165 | 4.263 | 4.247 | 4.444 | 4.215 | 4.293 | 4.301 |
| TL/(BFL+G45) | 3.449 | 3.623 | 3.535 | 3.711 | 3.485 | 3.630 | 3.652 |
| (T5+T6)/(G45+G67) | 1.341 | 0.906 | 1.007 | 1.047 | 1.500 | 1.055 | 1.003 |
| (T4+T5+T6)/(G45+G67) | 1.708 | 1.169 | 1.493 | 1.339 | 1.997 | 1.509 | 1.354 |
| (T1+T4+T5)/(G45+G67) | 1.974 | 1.410 | 1.711 | 1.610 | 2.000 | 1.636 | 1.443 |
| (T1+T2)/G23 | 2.541 | 2.848 | 2.774 | 2.825 | 1.972 | 2.881 | 2.693 |
| (T4+T6)/G23 | 2.185 | 2.069 | 2.768 | 1.892 | 2.366 | 3.000 | 2.791 |
| T7/(G12+G23) | 0.633 | 1.500 | 0.486 | 0.473 | 0.463 | 0.526 | 1.168 |
| (T6+T7)/(G12+G23) | 1.400 | 2.461 | 1.329 | 1.283 | 1.606 | 1.691 | 2.500 |

FIG.62A

| Embodiment | 8th | 9th | 10th | 11th | 12th | 13rd | 14th |
|---|---|---|---|---|---|---|---|
| T1 | 0.745 | 0.616 | 0.739 | 0.635 | 0.831 | 0.631 | 0.723 |
| G12 | 0.112 | 0.099 | 0.136 | 0.111 | 0.155 | 0.108 | 0.037 |
| T2 | 0.372 | 0.240 | 0.291 | 0.283 | 0.240 | 0.213 | 0.154 |
| G23 | 0.372 | 0.403 | 0.406 | 0.371 | 0.416 | 0.400 | 0.529 |
| T3 | 0.461 | 0.401 | 0.514 | 0.509 | 0.522 | 0.555 | 0.440 |
| G34 | 0.040 | 0.050 | 0.117 | 0.050 | 0.050 | 0.079 | 0.065 |
| T4 | 0.302 | 0.240 | 0.277 | 0.339 | 0.299 | 0.644 | 0.242 |
| G45 | 0.404 | 0.585 | 0.430 | 0.318 | 0.518 | 0.323 | 0.620 |
| T5 | 0.700 | 0.652 | 0.655 | 0.814 | 0.647 | 0.792 | 0.598 |
| G56 | 0.041 | 0.050 | 0.148 | 0.109 | 0.050 | 0.066 | 0.123 |
| T6 | 0.420 | 0.240 | 0.365 | 0.409 | 0.364 | 0.274 | 0.179 |
| G67 | 0.781 | 0.326 | 0.638 | 0.588 | 0.752 | 0.768 | 1.068 |
| T7 | 0.240 | 0.240 | 0.227 | 0.570 | 0.240 | 0.142 | 0.131 |
| G7F | 0.223 | 1.531 | 0.400 | 0.459 | 0.192 | 0.400 | 0.400 |
| TF | 0.510 | 0.510 | 0.510 | 0.510 | 0.510 | 0.510 | 0.510 |
| GFP | 0.193 | 0.193 | 0.073 | 0.193 | 0.193 | 0.214 | 0.218 |
| EFL | 4.307 | 4.622 | 4.349 | 4.484 | 4.262 | 4.412 | 4.601 |
| TL | 4.991 | 4.140 | 4.942 | 5.105 | 5.083 | 4.996 | 4.909 |
| BFL | 0.926 | 2.234 | 0.983 | 1.162 | 0.895 | 1.124 | 1.128 |
| ALT | 3.241 | 2.628 | 3.067 | 3.559 | 3.143 | 3.252 | 2.468 |
| Gaa | 1.750 | 1.512 | 1.875 | 1.546 | 1.940 | 1.744 | 2.441 |
| TTL | 5.918 | 6.374 | 5.926 | 6.266 | 5.978 | 6.120 | 6.037 |
| T1/G45 | 1.842 | 1.053 | 1.719 | 1.999 | 1.605 | 1.951 | 1.167 |
| T1/G23 | 2.000 | 1.529 | 1.821 | 1.712 | 1.999 | 1.577 | 1.367 |
| T3/G23 | 1.239 | 0.995 | 1.266 | 1.373 | 1.257 | 1.386 | 0.832 |
| T4/G45 | 0.748 | 0.410 | 0.643 | 1.069 | 0.578 | 1.991 | 0.391 |
| T5/G67 | 0.897 | 1.999 | 1.026 | 1.386 | 0.861 | 1.032 | 0.560 |
| (TL+ALT)/(BFL+Gaa) | 3.076 | 1.807 | 2.802 | 3.200 | 2.902 | 2.875 | 2.067 |
| (G12+T3)/G23 | 1.540 | 1.240 | 1.602 | 1.672 | 1.628 | 1.656 | 0.902 |
| (G12+T4)/G23 | 1.113 | 0.841 | 1.017 | 1.214 | 1.092 | 1.879 | 0.528 |
| (G12+T2+G23)/G45 | 2.119 | 1.268 | 1.938 | 2.408 | 1.565 | 2.231 | 1.161 |
| TTL/(BFL+G45) | 4.448 | 2.261 | 4.194 | 4.236 | 4.231 | 4.228 | 3.454 |
| TL/(BFL+G45) | 3.751 | 1.469 | 3.498 | 3.451 | 3.597 | 3.452 | 2.809 |
| (T5+T6)/(G45+G67) | 0.946 | 0.979 | 0.955 | 1.352 | 0.796 | 0.977 | 0.460 |
| (T4+T5+T6)/(G45+G67) | 1.201 | 1.242 | 1.214 | 1.727 | 1.032 | 1.567 | 0.604 |
| (T1+T4+T5)/(G45+G67) | 1.474 | 1.655 | 1.564 | 1.976 | 1.400 | 1.895 | 0.926 |
| (T1+T2)/G23 | 3.000 | 2.125 | 2.539 | 2.475 | 2.576 | 2.110 | 1.658 |
| (T4+T6)/G23 | 1.942 | 1.191 | 1.581 | 2.019 | 1.595 | 2.293 | 0.796 |
| T7/(G12+G23) | 0.496 | 0.478 | 0.420 | 1.183 | 0.421 | 0.280 | 0.232 |
| (T6+T7)/(G12+G23) | 1.364 | 0.956 | 1.093 | 2.033 | 1.059 | 0.819 | 0.548 |

FIG.62B

OPTICAL IMAGING LENS

CROSS REFERENCE TO RELATED APPLICATION

This application claims priority to P.R.C. Patent Application No. 201711144495.5, filed Nov. 17, 2017 with the State Intellectual Property Office of the People's Republic of China (SIPO), which is incorporated herein by reference in its entirety.

TECHNICAL FIELD

The present disclosure relates to an optical imaging lens, and particularly, relates to an optical imaging lens having, in some embodiments, seven lens elements.

BACKGROUND

The ever-increasing demand for smaller sized electrical devices, such as cell phones, digital cameras, tablet computers, personal digital assistants (PDAs), vehicle electronics, etc. has lead to a corresponding need for smaller sized photography modules contained within such devices. Such modules may include optical imaging lenses, module housing units, image sensors, etc. Size reductions may be achieved from various aspects of the electrical devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenge. Furthermore, achieving a high view angle and a great aperture size are important in certain applications, such as situations where a photography module is used in vehicles.

In light of the above issues, designing an optical imaging lens with a shorter length is not easily achieved by merely decreasing the size of each element proportionally. This is especially true for an optical imaging lens mounted with, for example, seven lens elements, in which the distance between an object-side surface of the first lens element and an imaging plane along an optical axis may be great. Size reductions of an optical imaging lens cannot be achieved simply by proportionally shrinking the size of each element therein. Various aspects of the optical imaging lens, such as production difficulty, yield, material property, etc. should be taken into consideration.

Therefore, production of a smaller sized optical imaging lens presents higher technical barriers and challenges than that of a conventional lens. Accordingly, achieving good optical characteristics in view of the various relevant considerations and technical barriers is a challenge in the industry.

SUMMARY

The present disclosure provides for optical imaging lenses. By controlling the convex or concave shape of the surfaces of the lens elements, the length of the optical imaging lens may be shortened, the HFOV and aperture of the optical imaging lens may be broadened, and meanwhile good imaging quality and system functionality may be maintained.

In an example embodiment, an optical imaging lens may comprise seven lens elements, here called first, second, third, fourth, fifth, sixth and seventh lens elements and positioned sequentially from an object side to an image side along an optical axis. Each of the first, second, third, fourth, fifth, sixth and seventh lens elements may have refracting power. Each of the first, second, third, fourth, fifth, sixth and seventh lens elements may also have an object-side surface facing toward the object side and allowing light to pass. Each of the first, second, third, fourth, fifth, sixth and seventh lens elements may also have an image-side surface facing toward the image side and allowing light to pass.

In the specification, parameters used here are: a thickness of the first lens element along the optical axis, represented by T1, a distance from the image-side surface of the first lens element to the object-side surface of the second lens element along the optical axis, represented by G12, a thickness of the second lens element along the optical axis, represented by T2, a distance from the image-side surface of the second lens element to the object-side surface of the third lens element along the optical axis, represented by G23, a thickness of the third lens element along the optical axis, represented by T3, a distance from the image-side surface of the third lens element to the object-side surface of the fourth lens element along the optical axis, represented by G34, a thickness of the fourth lens element along the optical axis, represented by T4, a distance from the image-side surface of the fourth lens element to the object-side surface of the fifth lens element along the optical axis, represented by G45, a thickness of the fifth lens element along the optical axis, represented by T5, a distance from the image-side surface of the fifth lens element to the object-side surface of the sixth lens element along the optical axis, represented by G56, a thickness of the sixth lens element along the optical axis, represented by T6, a distance from the image-side surface of the sixth lens element to the object-side surface of the seventh lens element along the optical axis, represented by G67, a thickness of the seventh lens element along the optical axis, represented by T7, a distance from the image-side surface of the seventh lens element to the object-side surface of a filtering unit along the optical axis, represented by G7F, a thickness of the filtering unit along the optical axis, represented by TF, a distance from the image-side surface of the filtering unit to an image plane along the optical axis, represented by GFP, a focal length of the first lens element, represented by f1, a focal length of the second lens element, represented by f2, a focal length of the third lens element, represented by f3, a focal length of the fourth lens element, represented by f4, a focal length of the fifth lens element, represented by f5, a focal length of the sixth lens element, represented by f6, a focal length of the seventh lens element, represented by f7, the refractive index of the first lens element, represented by n1, the refractive index of the second lens element, represented by n2, the refractive index of the third lens element, represented by n3, the refractive index of the fourth lens element, represented by n4, the refractive index of the fifth lens element, represented by n5, the refractive index of the sixth lens element, represented by n6, the refractive index of the seventh lens element, represented by n7, an abbe number of the first lens element, represented by V1, an abbe number of the second lens element, represented by V2, an abbe number of the third lens element, represented by V3, an abbe number of the fourth lens element, represented by V4, an abbe number of the fifth lens element, represented by V5, an abbe number of the sixth lens element, represented by V6, an abbe number of the seventh lens element, represented by V7, an effective focal length of the optical imaging lens, represented by EFL or f, a distance between the object-side surface of the first lens element and the image-side surface of the seventh lens element along the optical axis, represented by TL, a distance from the object-side surface of the first lens element to the image plane along the optical axis, represented by TTL, a sum of the thicknesses of all seven lens elements along the optical axis, i.e. a sum of T1, T2, T3, T4, T5, T6 and T7, represented by ALT, a sum of all distances from the image-side surface of one of the seven lens elements to the object-side surface of the next lens element along the optical axis, i.e. a sum of G12, G23, G34, G45, G56, and G67, represented by Gaa, and a back focal length of the optical imaging lens, which is defined as the distance from the image-side surface of the seventh lens element to the image plane along the optical axis, i.e. a sum of G7F, TF and GFP, and represented by BFL.

In an aspect of the present disclosure, in the optical imaging lens, the first lens element may have positive refracting power, and the image-side surface of the first lens element may comprise a concave portion in a vicinity of the optical axis, the image-side surface of the third lens element may comprise a convex portion in a vicinity of the optical axis, the fifth lens element may have positive refracting power, the object-side surface of the fifth lens element may comprise a concave portion in a vicinity of a periphery of the fifth lens element, and the image-side surface of the fifth lens element may comprise a convex portion in a vicinity of the periphery of the fifth lens element, the image-side surface of the sixth lens element may comprise a concave portion in a vicinity of the optical axis, the image-side surface of the seventh lens element may comprise a concave portion in a vicinity of the optical axis, the optical imaging lens may comprise no other lenses having refracting power beyond the seven lens elements, and V1, V2, V3, V4, V5, V6 and V7 satisfy the inequality:

$$310.000 \leq V1+V2+V3+V4+V5+V6+V7 \quad \text{Inequality (1)}.$$

In an aspect of the present disclosure, in the optical imaging lens, the image-side surface of the first lens element may comprise a concave portion in a vicinity of the optical axis, the image-side surface of the third lens element may comprise a convex portion in a vicinity of the optical axis, the fifth lens element may have positive refracting power, the object-side surface of the fifth lens element may comprise a concave portion in a vicinity of a periphery of the fifth lens element, and the image-side surface of the fifth lens element may comprise a convex portion in a vicinity of the periphery of the fifth lens element, the image-side surface of the sixth lens element may comprise a concave portion in a vicinity of the optical axis and a convex portion in a vicinity of a periphery of the sixth lens element, the object-side surface of the seventh lens element may comprise a concave portion in a vicinity of a periphery of the seventh lens element, and the image-side surface of the seventh lens element may comprise a concave portion in a vicinity of the optical axis, the optical imaging lens may comprise no other lenses having refracting power beyond the seven lens elements, and V1, V2, V3, V4, V5, V6 and V7 satisfy the inequality (1).

In another example embodiment, other inequality(s), such as those relating to the ratio among parameters could be taken into consideration. For example:

$T1/G45 \leq 2.000$      Inequality (2);

$T1/G23 \leq 2.000$      Inequality (3);

$T3/G23 \leq 2.000$      Inequality (4);

$T4/G45 \leq 2.000$      Inequality (5);

$T5/G67 \leq 2.000$      Inequality (6);

$(TL+ALT)/(BFL+Gaa) \leq 3.500$      Inequality (7);

$(G12+T3)/G23 \leq 2.500$      Inequality (8);

$(G12+T4)/G23 \leq 2.000$      Inequality (9);

$(G12+T2+G23)/G45 \leq 2.500$      Inequality (10);

$TTL/(BFL+G45) \leq 5.000$      Inequality (11);

$TL/(BFL+G45) \leq 4.000$      Inequality (12);

$(T5+T6)/(G45+G67) \leq 1.500$      Inequality (13);

$(T4+T5+T6)/(G45+G67) \leq 2.000$      Inequality (14);

$(T1+T4+T5)/(G45+G67) \leq 2.000$      Inequality (15);

$(T1+T2)/G23 \leq 3.000$      Inequality (16);

$(T4+T6)/G23 \leq 3.000$      Inequality (17);

$T7/(G12+G23) \leq 1.500$      Inequality (18); and/or $(T6+T7)/(G12+G23) \leq 2.500$      Inequality (19).

In some example embodiments, more details about the convex or concave surface structure, refracting power or chosen material etc. could be incorporated for one specific lens element or broadly for plural lens elements to enhance the control for the system performance and/or resolution. It is noted that the details listed here could be incorporated in example embodiments if no inconsistency occurs.

The above example embodiments are not limited and could be selectively incorporated in other embodiments described herein.

Through controlling the convex or concave shape of the surfaces and at lease one inequality, the optical imaging lens in example embodiments achieve good imaging quality, effectively shorten the length of the optical imaging lens and broaden the HFOV and aperture of the optical imaging lens.

BRIEF DESCRIPTION OF THE DRAWINGS

Example embodiments will be more readily understood from the following detailed description when read in conjunction with the appended drawing, in which:

FIG. 1 depicts a cross-sectional view of one single lens element according to the present disclosure;

FIG. 2 depicts a cross-sectional view showing the relation between the shape of a portion and the position where a collimated ray meets the optical axis;

FIG. 3 depicts a cross-sectional view showing the relation between the shape of a portion and the effective radius of a first example;

FIG. 4 depicts a cross-sectional view showing the relation between the shape of a portion and the effective radius of a second example;

FIG. 5 depicts a cross-sectional view showing the relation between the shape of a portion and the effective radius of a third example;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 48 depicts a table of optical data for each lens element of the optical imaging lens of an eleventh embodiment of the present disclosure;

FIG. 49 depicts a table of aspherical data of an eleventh embodiment of the optical imaging lens according to the present disclosure;

FIG. 52 depicts a table of optical data for each lens element of the optical imaging lens of a twelfth embodiment of the present disclosure;

FIG. 53 depicts a table of aspherical data of a twelfth embodiment of the optical imaging lens according to the present disclosure;

FIG. 56 depicts a table of optical data for each lens element of the optical imaging lens of a thirteenth embodiment of the present disclosure;

FIG. 57 depicts a table of aspherical data of a thirteenth embodiment of the optical imaging lens according to the present disclosure;

FIG. 60 depicts a table of optical data for each lens element of the optical imaging lens of a fourteenth embodiment of the present disclosure;

FIG. 61 depicts a table of aspherical data of a fourteenth embodiment of the optical imaging lens according to the present disclosure;

FIGS. 62A and 62B depicts a table for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of all fourteen example embodiments.

DETAILED DESCRIPTION

Figure 6:
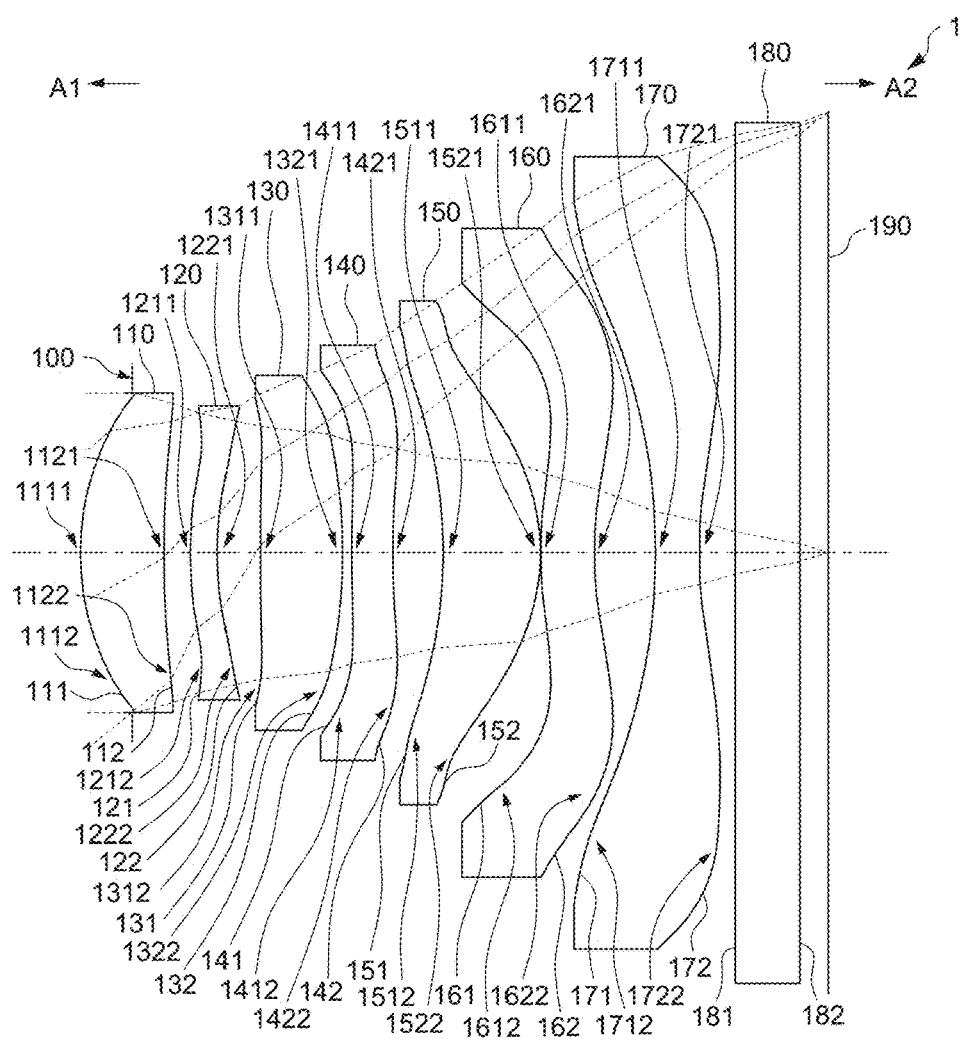
FIG. 6 depicts a cross-sectional view of a first embodiment of an optical imaging lens having seven lens elements according to the present disclosure.

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0-50% of the effective radius (radius of the clear aperture) of the surface, whereas the portion in a vicinity of a periphery of the lens element is defined as the portion between 50-100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0-50% of the effective radius (radius of the clear aperture) is determined as the portion in a vicinity of the optical axis, and the portion between 50-100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

In the present disclosure, examples of an optical imaging lens which is a prime lens are provided. Example embodiments of an optical imaging lens may comprise a first lens element, a second lens element, a third lens element, a fourth lens element, a fifth lens element, a sixth lens element and a seventh lens element. Each of the lens elements may comprise refracting power, an object-side surface facing toward an object side and an image-side surface facing toward an image side allowing light to pass. These lens elements may be arranged sequentially from the object side to the image side along an optical axis, and example embodiments of the lens may comprise no other lenses having refracting power beyond the seven lens elements. Through controlling the convex or concave shape of the surfaces and at lease one inequality, the optical imaging lens in example embodiments achieve good imaging quality, effectively shorten the length of the optical imaging lens and broaden the HFOV and aperture of the optical imaging lens.

Preferably, the lens elements are designed in light of the optical characteristics and the length of the optical imaging lens. For example, the positive refracting power of the first lens element and the concave portion in a vicinity of the optical axis formed on the image-side surface of the first lens element may assist in collecting light; the convex portion in a vicinity of the optical axis formed on the image-side surface of the third lens element may also assist in focusing light from the first lens element. Together with the positive refracting power of the fifth lens element, the concave portion in a vicinity of the periphery portion of the fifth lens element formed on the object-side surface thereof, the convex portion in a vicinity of the periphery portion of the fifth lens element formed on the image-side surface thereof, the concave portion in a vicinity of the optocal axis and the convex portion in a vicinity of the periphery portion of the sixth lens element formed on the image-side surface thereof, the concave portion in a vicinity of the periphery portion of the seventh lens element formed on the object-side surface thereof, and the concave portion in a vicinity of the optical axis formed on the image-side surface of the seventh lens element, the aberration generated at the first, second, third and fourth lens elements may be adjusted.

Further, with either one feature as follows: (1) the positive refracting power of the first lens element; (2) the convex portion in a vicinity of the periphery portion of the sixth lens element formed on the image-side surface thereof and the concave portion in a vicinity of the periphery portion of the seventh lens element formed on the object-side surface thereof, the length of the optical imaging lens may be effectively shortened and meanwhile good optical characteristics may be sustained. Further, some embodiments of the present disclosure may achieve both features (1) and (2) as mentioned above, which may allow for further improved optical performance. When the optical imaging lens satisfies Inequality (1), the material composition of the lens elements may be properly configured, the imaging light may be quickly focused within a limited distance, and good imaging quality may be provided. Preferably, the value of V1+V2+V3+V4+V5+V6+V7 may preferably be within about 310.000-450.000 for a better imaging quality.

Additionally, to keep values of system focal length and other parameters of the optical imaging lens in a proper range, to avoid from any excessive value of the parameters which is unfavorable to adjust aberration of the whole system of the optical imaging lens, to sustain the relation between the thickness of the lens elements and/or the air gaps between the lens elements a proper value, thereby to avoid from any excessive value of the parameters which is unfavorable to thicken the length of the whole system of the optical imaging lens and to avoid from any insufficient value of the parameters which increase the production difficulty of the optical imaging lens, here are provided with Inequality (2) to Inequality (19). For a better imaging quality, the value of T1/G45 may preferably be within about 1.000-2.000; the value of T1/G23 may preferably be within about 1.000-2.000; the value of T3/G23 may preferably be within about 0.500-2.000; the value of T5/G67 may preferably be within about 0.500-2.000; the value of (TL+ALT)/(BFL+Gaa) may preferably be within about 1.500-3.500; the value of (G12+T3)/G23 may preferably be within about 0.500-2.500, and more preferably to show high manufacturability, 1.000-2.500; the value of (G12+T4)/G23 may preferably be within about 0.500-2.000; the value of (G12+T2+G23)/G45 may preferably be within about 1.000-2.500; the value of TTL/(BFL+G45) may preferably be within about 2.000-4.500; the value of TL/(BFL+G45) may preferably be within about 1.000-4.000; the value of (T5+T6)/(G45+G67) may preferably be within about 0.500-1.500 to show high manufacturability; the value of (T4+T5+T6)/(G45+G67) may preferably be within about 0.500-2.000, and more preferably to show high manufacturability, 1.000-2.000; the value of (T1+T4+T5)/(G45+G67) may preferably be within about 0.500-2.000, and more preferably to show high manufacturability, 1.000-2.000; the value of (T1+T2)/G23 may preferably be within about 1.500-3.000; the value of (T4+T6)/G23 may preferably be within about 0.500-3.000, and more preferably to show high manufacturability, 1.000-3.000; and the value of (T6+T7)/(G12+G23) may preferably be within about 0.500-2.500.

In light of the unpredictability in an optical system, in the present disclosure, satisfying these inequalities listed above may result in shortening the length of the optical imaging lens, lowering the f-number, enlarging the shot angle, promoting the imaging quality and/or increasing the yield in the assembly process.

When implementing example embodiments, more details about the convex or concave surface or refracting power could be incorporated for one specific lens element or broadly for plural lens elements to enhance the control for the system performance and/or resolution, or promote the yield. For example, in an example embodiment, each lens element may be made from all kinds of transparent material, such as glass, resin, etc. It is noted that the details listed here could be incorporated in example embodiments if no inconsistency occurs.

Figure 7:
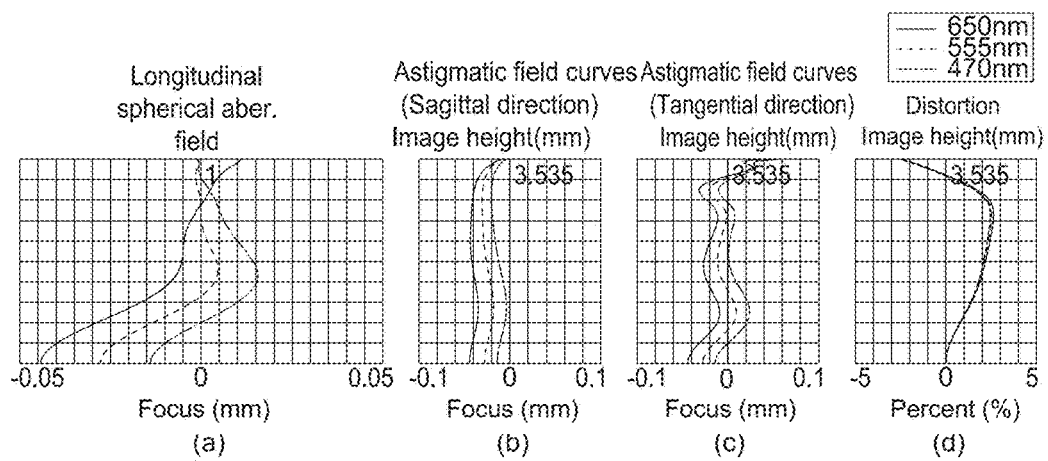
FIG. 7 depicts a chart of longitudinal spherical aberration and other kinds of optical aberrations of a first embodiment of the optical imaging lens according to the present disclosure.

Several example embodiments and associated optical data will now be provided for illustrating example embodiments of an optical imaging lens with short length, good optical characteristics, a wide view angle and/or a low f-number. Reference is now made to FIGS. 6-9. FIG. 6 illustrates an example cross-sectional view of an optical imaging lens 1 having seven lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150, a sixth lens element 160 and a seventh lens element 170. A filtering unit 180 and an image plane 190 of an image sensor are positioned at the image side A2 of the optical lens 1. Each of the first, second, third, fourth, fifth, sixth and seventh lens elements 110, 120, 130, 140, 150, 160, 170 and the filtering unit 180 may comprise an object-side surface 111/121/131/141/151/161/171/181 facing toward the object side A1 and an image-side surface 112/122/132/142/152/162/172/182 facing toward the image side A2. The filtering unit 180, positioned between the seventh lens element 170 and the image plane 190, selectively absorbs light with specific wavelength from the light passing optical imaging lens 1. The example embodiment of the filtering unit 180 which may selectively absorb light with specific wavelength from the light passing optical imaging lens 1 is a NIR cut filter (near infrared cut filter). Then, NIR light may be absorbed, and this may prohibit the NIR light, which is not seen by human eyes, from producing an image on the image plane 190.

Please note that during the normal operation of the optical imaging lens 1, the distance between any two adjacent lens elements of the first, second, third, fourth, fifth, sixth and seventh lens elements 110, 120, 130, 140, 150, 160, 170 is a unchanged value, i.e. the optical imaging lens 1 is a prime lens.

Example embodiments of each lens element of the optical imaging lens 1, which may be constructed by glass, plastic material or other transparent material, will now be described with reference to the drawings.

An example embodiment of the first lens element 110, which may be constructed by plastic material, may have positive refracting power. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110.

An example embodiment of the second lens element 120, which may be constructed by plastic material, may have negative refracting power. The object-side surface 121 may comprise a convex portion 1211 in a vicinity of the optical axis and a concave portion 1212 in a vicinity of a periphery of the second lens element 120. The image-side surface 122 may be a concave surface comprising a concave portion 1221 in a vicinity of the optical axis and a concave portion 1222 in a vicinity of the periphery of the second lens element 120.

An example embodiment of the third lens element 130, which may be constructed by plastic material, may have positive refracting power. The object-side surface 131 may be a concave surface comprising a concave portion 1311 in a vicinity of the optical axis and a concave portion 1312 in a vicinity of a periphery of the third lens element 130. The image-side surface 132 may be a convex surface comprising a convex portion 1321 in a vicinity of the optical axis and a convex portion 1322 in a vicinity of the periphery of the third lens element 130.

An example embodiment of the fourth lens element 140, which may be constructed by plastic material, may have negative refracting power. The object-side surface 141 may comprise a convex portion 1411 in a vicinity of the optical axis and a concave portion 1412 in a vicinity of a periphery of the fourth lens element 140. The image-side surface 142 may comprise a concave portion 1421 in a vicinity of the optical axis and a convex portion 1422 in a vicinity of the periphery of the fourth lens element 140.

An example embodiment of the fifth lens element 150, which may be constructed by plastic material, may have positive refracting power. The object-side surface 151 may be a concave surface comprising a concave portion 1511 in a vicinity of the optical axis and a concave portion 1512 in a vicinity of a periphery of the fifth lens element 150. The image-side surface 152 may be a convex surface comprising a convex portion 1521 in a vicinity of the optical axis and a convex portion 1522 in a vicinity of the periphery of the fifth lens element 150.

An example embodiment of the sixth lens element 160, which may be constructed by plastic material, may have negative refracting power. The object-side surface 161 may comprise a convex portion 1611 in a vicinity of the optical axis and a concave portion 1612 in a vicinity of a periphery of the sixth lens element 160. The image-side surface 162 may comprise a concave portion 1621 in a vicinity of the optical axis and a convex portion 1622 in a vicinity of the periphery of the sixth lens element 160.

An example embodiment of the seventh lens element 170, which may be constructed by plastic material, may have negative refracting power. The object-side surface 171 may be a concave surface comprising a concave portion 1711 in a vicinity of the optical axis and a concave portion 1712 in a vicinity of a periphery of the seventh lens element 170. The image-side surface 172 may comprise a concave portion 1721 in a vicinity of the optical axis and a convex portion 1722 in a vicinity of the periphery of the seventh lens element 170.

In example embodiments, air gaps may exist between each pair of adjacent lens elements, as well as between the seventh lens element 170 and the filtering unit 180, and the filtering unit 180 and the image plane 190 of the image sensor. Please note, in other embodiments, any of the aforementioned air gaps may or may not exist. For example, the profiles of opposite surfaces of any two adjacent lens elements may correspond to each other, and in such situations, the air gap may not exist.

FIG. 8 depicts the optical characteristics of each lens elements in the optical imaging lens 1 of the present embodiment. Please also refer to FIG. 62A for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) corresponding to the present embodiment.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160 and the object-side surface 171 and the image-side surface 172 of the seventh lens element 170 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times \left(\frac{Y}{R_N}\right)^{2i}$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; $a_{2i}$ represents an aspherical coefficient of $2i^{th}$ level; and $R_N$ represents normalization radius. When $R_N=1$, the surface shape defined by the aspherical formula is an even aspheric, and when $R_N \neq 1$, the surface shape defined by the aspherical formula is an extended aspheric. The values of each aspherical parameter are shown in FIG. 9.

Please refer to FIG. 7(a), longitudinal spherical aberration of the optical imaging lens in the present embodiment is shown in coordinates in which the horizontal axis represents focus and the vertical axis represents field of view, and FIG. 7(b), astigmatism aberration of the optical imaging lens in the present embodiment in the sagittal direction is shown in coordinates in which the horizontal axis represents focus and the vertical axis represents image height, and FIG. 7(c), astigmatism aberration in the tangential direction of the optical imaging lens in the present embodiment is shown in coordinates in which the horizontal axis represents focus and the vertical axis represents image height, and FIG. 7(d), distortion aberration of the optical imaging lens in the present embodiment is shown in coordinates in which the horizontal axis represents percentage and the vertical axis represents image height.

The curves of different wavelengths (470 nm, 555 nm, 650 nm) are closed to each other. This represents that off-axis light with respect to these wavelengths is focused around an image point. From the vertical deviation of each curve shown therein, the offset of the off-axis light relative to the image point may be within about ±0.05 mm. Therefore, the present embodiment improves the longitudinal spherical aberration with respect to different wavelengths. For astigmatism aberration in the sagittal direction, the focus variation with respect to the three wavelengths in the whole field may fall within about ±0.05 mm, for astigmatism aberration in the tangential direction, the focus variation with respect to the three wavelengths in the whole field may fall within about ±0.06 mm, and the variation of the distortion aberration may be within about ±3%.

According to the value of the aberrations, it is shown that the optical imaging lens 1 of the present embodiment, with the length as short as about 5.908 mm, HFOV as great as about 39.5 degrees and the Fno as small as about 1.7, may be capable of providing good imaging quality as well as good optical characteristics.

Figure 10:
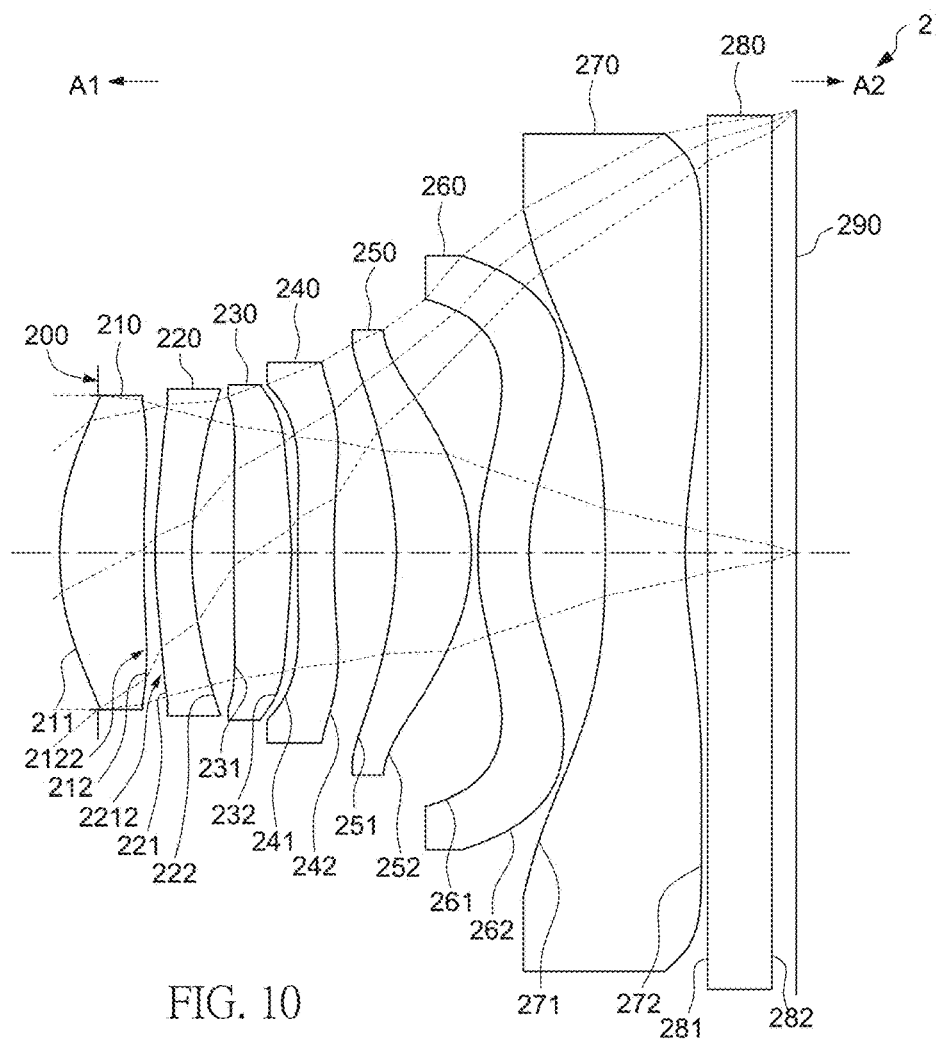
FIG. 10 depicts a cross-sectional view of a second embodiment of an optical imaging lens having seven lens elements according to the present disclosure.
Figure 11:
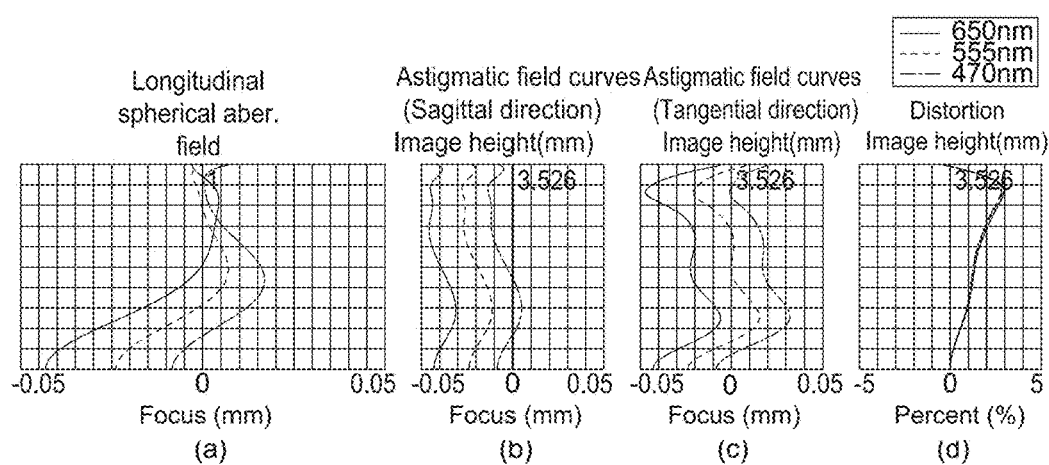
FIG. 11 depicts a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having seven lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250, a sixth lens element 260 and a seventh lens element 270.

The differences between the second embodiment and the first embodiment may include the radius of curvature, thickness of each lens element, the value of each air gap, aspherical data, related optical parameters, such as back focal length, and the configuration of the concave/convex shape of the object-side surface 221 and the image-side surface 212; but the configuration of the concave/convex shape of surfaces, comprising the object-side surfaces 211, 231, 241, 251, 261, 271 facing to the object side A1 and the image-side surfaces 222, 232, 242, 252, 262, 272 facing to the image side A2, and positive or negative configuration of the refracting power of each lens element are similar to those in the first embodiment. Here and in the embodiments hereinafter, for clearly showing the drawings of the present embodiment, only the surface shapes which are different from that in the first embodiment may be labeled. Specifically, the differences of configuration of surface shape include: the image-side surface 212 of the first lens element 210 may comprise a convex portion 2122 in a vicinity of a periphery of the first lens element 210, and the object-side surface 221 of the second lens element 220 may comprise a convex portion 2212 in a vicinity of a periphery of the second lens element 220. Please refer to FIG. 12 for the optical characteristics of each lens elements in the optical imaging lens 2 the present embodiment, and please refer to FIG. 62A for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 11(a), the offset of the off-axis light relative to the image point may be within about ±0.05 mm. As the astigmatism aberration in the sagittal direction shown in FIG. 11(b), the focus variation with regard to the three wavelengths in the whole field may fall within about ±0.05 mm. As the astigmatism aberration in the tangential direction shown in FIG. 11(c), the focus variation with regard to the three wavelengths in the whole field may fall within about ±0.05 mm. As shown in FIG. 11(d), the variation of the distortion aberration may be within about ±3%. Compared with the first embodiment, the astigmatism aberration in the tangential direction of the optical imaging lens 2 is less.

According to the value of the aberrations, it is shown that the optical imaging lens 2 of the present embodiment, with the length as short as about 5.885, the HFOV as large as about 39.5 degrees and the Fno as small as about 1.7, may be capable of providing good imaging quality. Compared with the optical imaging lens 1 of the first embodiment, the length of the optical imaging lens 2 of the present embodiment is shorter.

Figure 14:
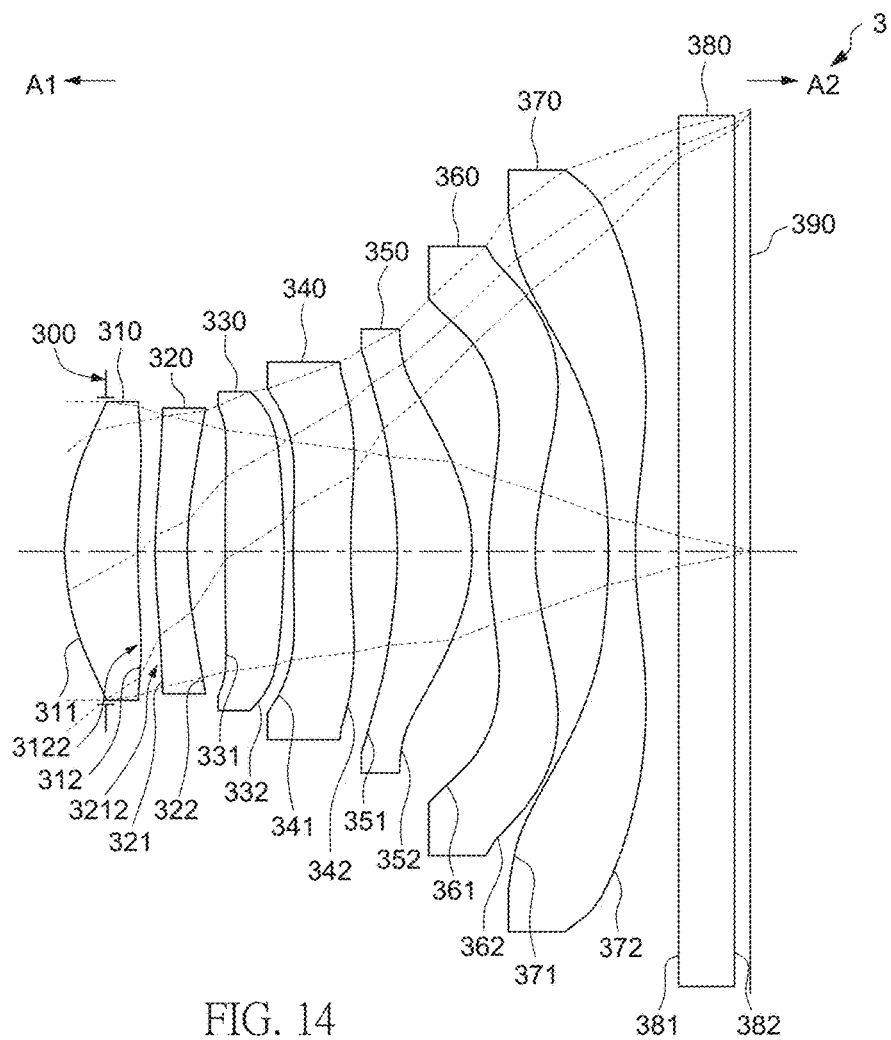
FIG. 14 depicts a cross-sectional view of a third embodiment of an optical imaging lens having seven lens elements according to the present disclosure.
Figure 15:
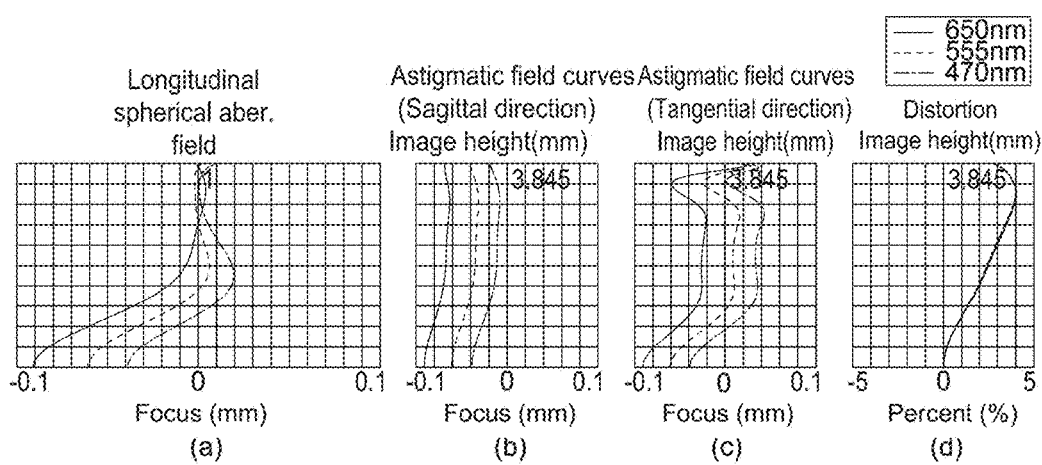
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having seven lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330, a fourth lens element 340, a fifth lens element 350, a sixth lens element 360 and a seventh lens element 370.

The differences between the third embodiment and the first embodiment may include the radius of curvature and thickness of each lens element, the value of each air gap, aspherical data, related optical parameters, such as back focal length, and the configuration of the concave/convex shape of the object-side surface 321 and the image-side surface 312; but the configuration of the concave/convex shape of surfaces, comprising the object-side surfaces 311, 331, 341, 351, 361, 371 facing to the object side A1 and the image-side surfaces 322, 332, 342, 352, 362, 372 facing to the image side A2, and positive or negative configuration of the refracting power of each lens element are similar to those in the first embodiment. Specifically, the differences of configuration of surface shape include: the image-side surface 312 of the first lens element 310 may comprise a convex portion 3122 in a vicinity of a periphery of the first lens element 310, and the object-side surface 321 of the second lens element 320 may comprise a convex portion 3212 in a vicinity of a periphery of the second lens element 320. Please refer to FIG. 16 for the optical characteristics of each lens elements in the optical imaging lens 3 of the present embodiment, and please refer to FIG. 62A for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 15(a), the offset of the off-axis light relative to the image point may be within about ±0.1 mm. As the astigmatism aberration in the sagittal direction shown in FIG. 15(b), the focus variation with regard to the three wavelengths in the whole field may fall within about ±0.1 mm. As the astigmatism aberration in the tangential direction shown in FIG. 15(c), the focus variation with regard to the three wavelengths in the whole field may fall within about ±0.1 mm. As shown in FIG. 15(d), the variation of the distortion aberration may be within about ±4%.

According to the value of the aberrations, it is shown that the optical imaging lens 3 of the present embodiment, with the length as short as about 6.307 mm, the HFOV as large as about 39.5 degrees and the Fno as small as about 1.7, may be capable of providing good imaging quality. Compared with the optical imaging lens 1 of the first embodiment, the optical imaging lens 3 of the present embodiment may be easier to make and may provide for better yield.

Figure 18:
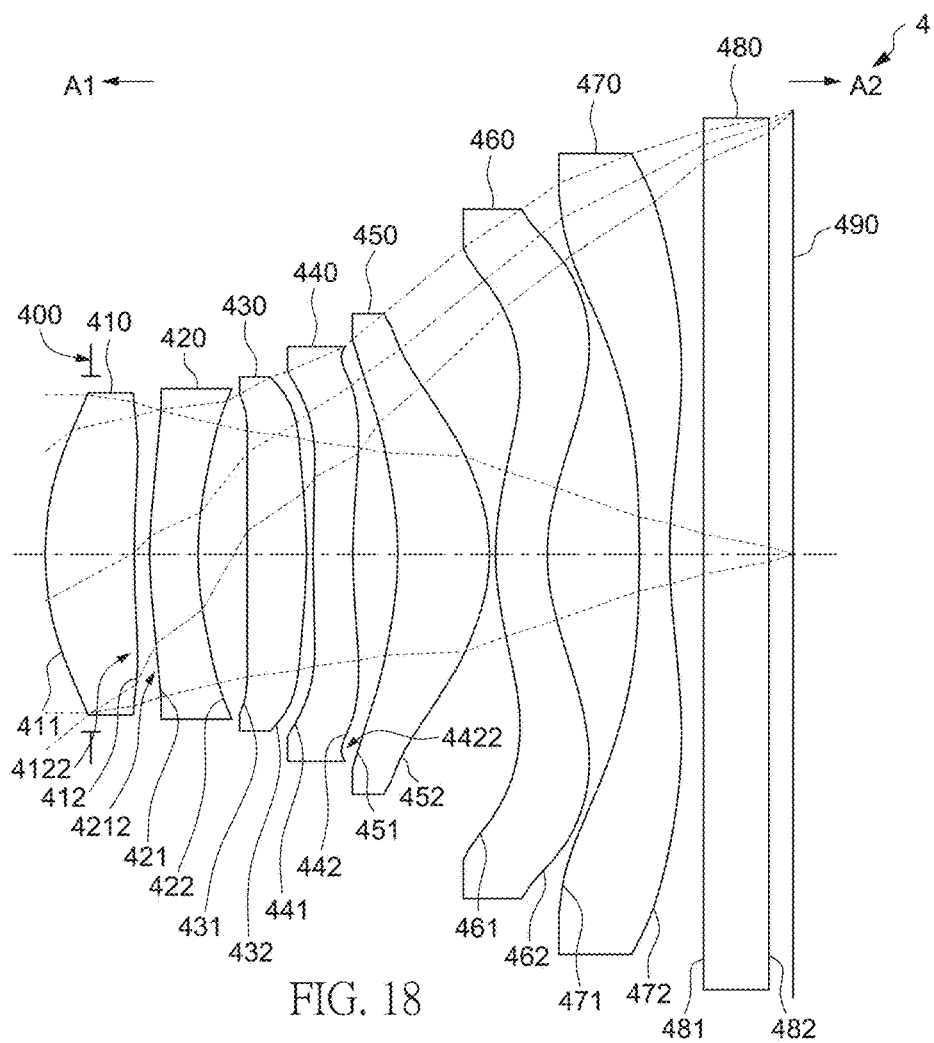
FIG. 18 depicts a cross-sectional view of a fourth embodiment of an optical imaging lens having seven lens elements according to the present disclosure.
Figure 19:
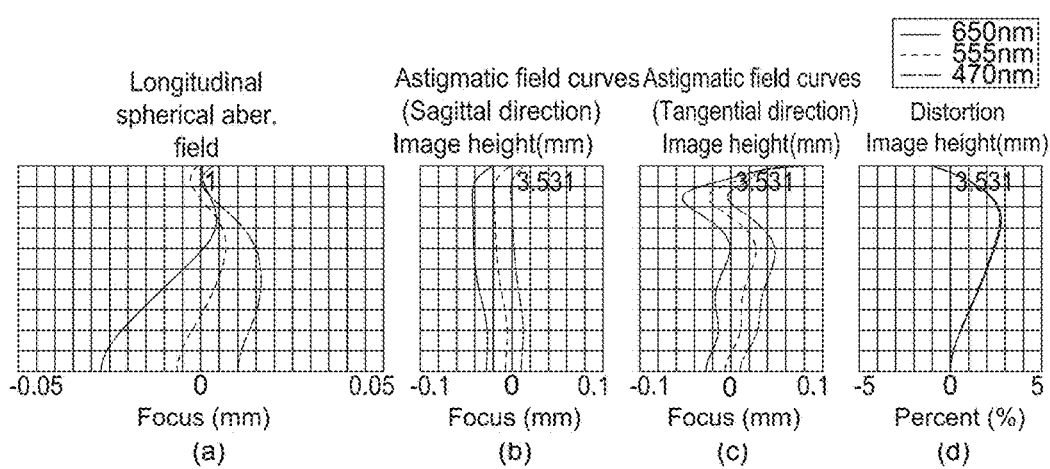
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having seven lens elements of the optical imaging lens 4 according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, a fifth lens element 450, a sixth lens element 460 and a seventh lens element 470.

The differences between the fourth embodiment and the first embodiment may include the radius of curvature and thickness of each lens element, the value of each air gap, aspherical data, related optical parameters, such as back focal length, and the configuration of the concave/convex shape of the object-side surface 421 and the image-side surfaces 412, 442; but the configuration of the concave/convex shape of surfaces, comprising the object-side surfaces 411, 431, 441, 451, 461, 471 facing to the object side A1 and the image-side surfaces 422, 432, 452, 462, 472 facing to the image side A2, and positive or negative configuration of the refracting power of each lens element are similar to those in the first embodiment. Specifically, the differences of configuration of surface shape include: the image-side surface 412 of the first lens element 410 may comprise a convex portion 4122 in a vicinity of a periphery of the first lens element 410, the object-side surface 421 of the second lens element 420 may comprise a convex portion 4212 in a vicinity of a periphery of the second lens element 420, and the image-side surface 442 of the fourth lens element 440 may comprise a concave portion 4422 in a vicinity of a periphery of the fourth lens element 440. Please refer to FIG. 20 for the optical characteristics of each lens elements in the optical imaging lens 4 of the present embodiment, please refer to FIG. 62A for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 19(a), the offset of the off-axis light relative to the image point may be within about ±0.03 mm. As the astigmatism aberration in the sagittal direction shown in FIG. 19(b), the focus variation with regard to the three wavelengths in the whole field may fall within about ±0.05 mm. As the astigmatism aberration in the tangential direction shown in FIG. 19(c), the focus variation with regard to the three wavelengths in the whole field may fall within about ±0.1 mm. As shown in FIG. 19(d), the variation of the distortion aberration may be within about ±3%. Compared with the first embodiment, the longitudinal spherical aberration of the optical imaging lens 4 is less.

According to the value of the aberrations, it is shown that the optical imaging lens 4 of the present embodiment, with the length as short as about 5.913 mm, the HFOV as large as about 39.5 degrees and the Fno as small as about 1.7, may be capable of providing good imaging quality. Compared with the optical imaging lens 1 of the first embodiment, the optical imaging lens 4 of the present embodiment may be easier to make and may provide for better yield.

Figure 22:
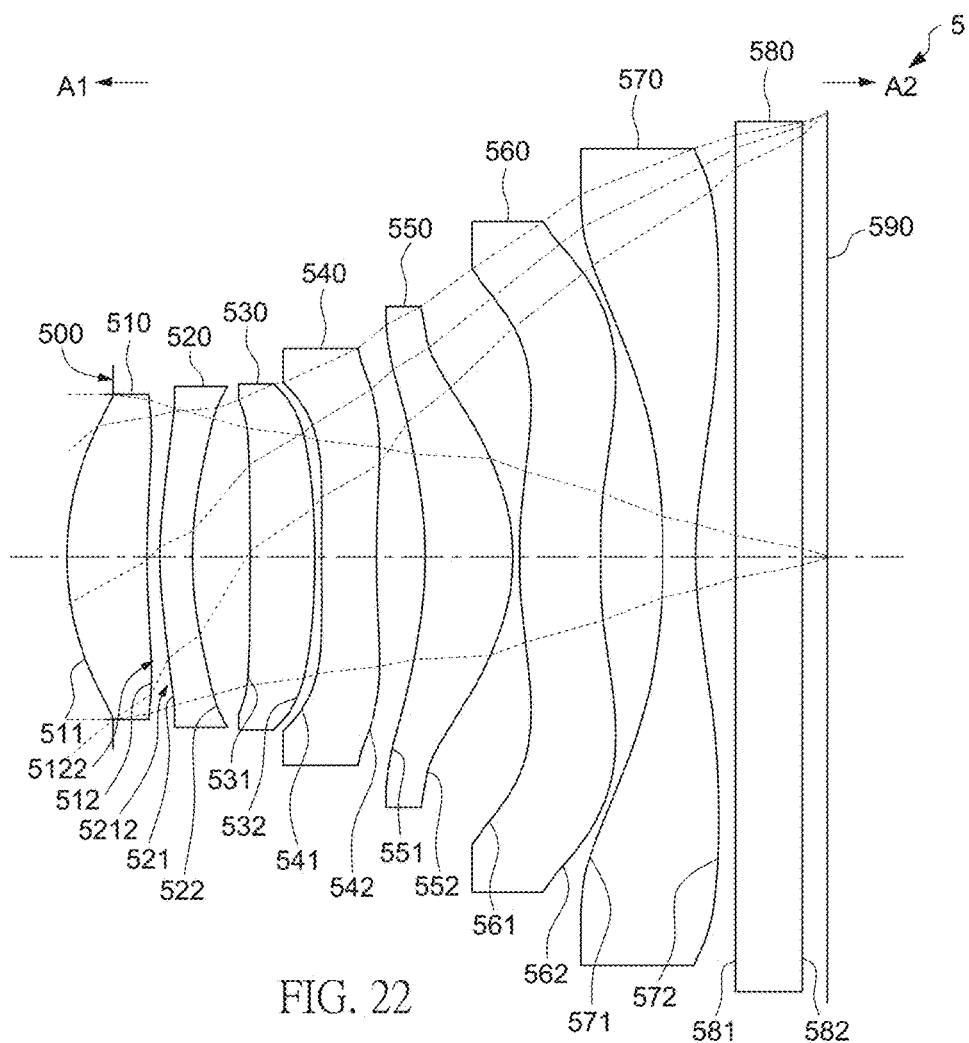
FIG. 22 depicts a cross-sectional view of a fifth embodiment of an optical imaging lens having seven lens elements according to the present disclosure.
Figure 23:
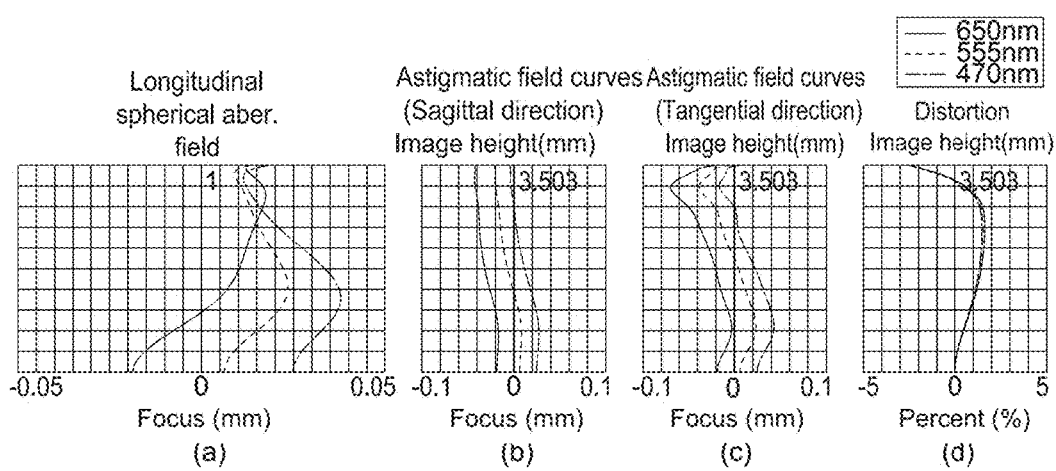
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having seven lens elements of the optical imaging lens 5 according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550, a sixth lens element 560 and a seventh lens element 570.

The differences between the fifth embodiment and the first embodiment may include the radius of curvature and thickness of each lens element, the value of each air gap, aspherical data, related optical parameters, such as back focal length, the configuration of the concave/convex shape of the object-side surface 521 and the image-side surface 512 and the positive configuration of the refracting power of the sixth lens element 560; but the configuration of the concave/convex shape of surfaces, comprising the object-side surfaces 511, 531, 541, 551, 561, 571 facing to the object side A1 and the image-side surfaces 522, 532, 542, 552, 562, 572 facing to the image side A2, and positive or negative configuration of the refracting power of the first, second, third, fourth, fifth and seventh lens elements 510, 520, 530, 540, 550, 570 are similar to those in the first embodiment. Specifically, the differences of configuration of surface shape include: the image-side surface 512 of the first lens element 510 may comprise a convex portion 5122 in a vicinity of a periphery of the first lens element 510, and the object-side surface 521 of the second lens element 520 may comprise a convex portion 5212 in a vicinity of a periphery of the second lens element 520. Please refer to FIG. 24 for the optical characteristics of each lens elements in the optical imaging lens 5 of the present embodiment, please refer to FIG. 62A for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 23(a), the offset of the off-axis light relative to the image point may be within about ±0.04 mm. As the astigmatism aberration in the sagittal direction shown in FIG. 23(b), the focus variation with regard to the three wavelengths in the whole field may fall within about ±0.05 mm. As the astigmatism aberration in the tangential direction shown in FIG. 23(c), the focus variation with regard to the three wavelengths in the whole field may fall within about ±0.08 mm. As shown in FIG. 23(d), the variation of the distortion aberration may be within about ±3%. Compared with the first embodiment, the longitudinal spherical aberration of the optical imaging lens 5 is less.

According to the value of the aberrations, it is shown that the optical imaging lens 5 of the present embodiment, with the length as short as about 5.831 mm, the HFOV as large as about 39.5 degrees and the Fno as small as about 1.7, may be capable of providing good imaging quality. Compared with the optical imaging lens 1 of the first embodiment, the length of the optical imaging lens 5 of the present embodiment is shorter.

Figure 26:
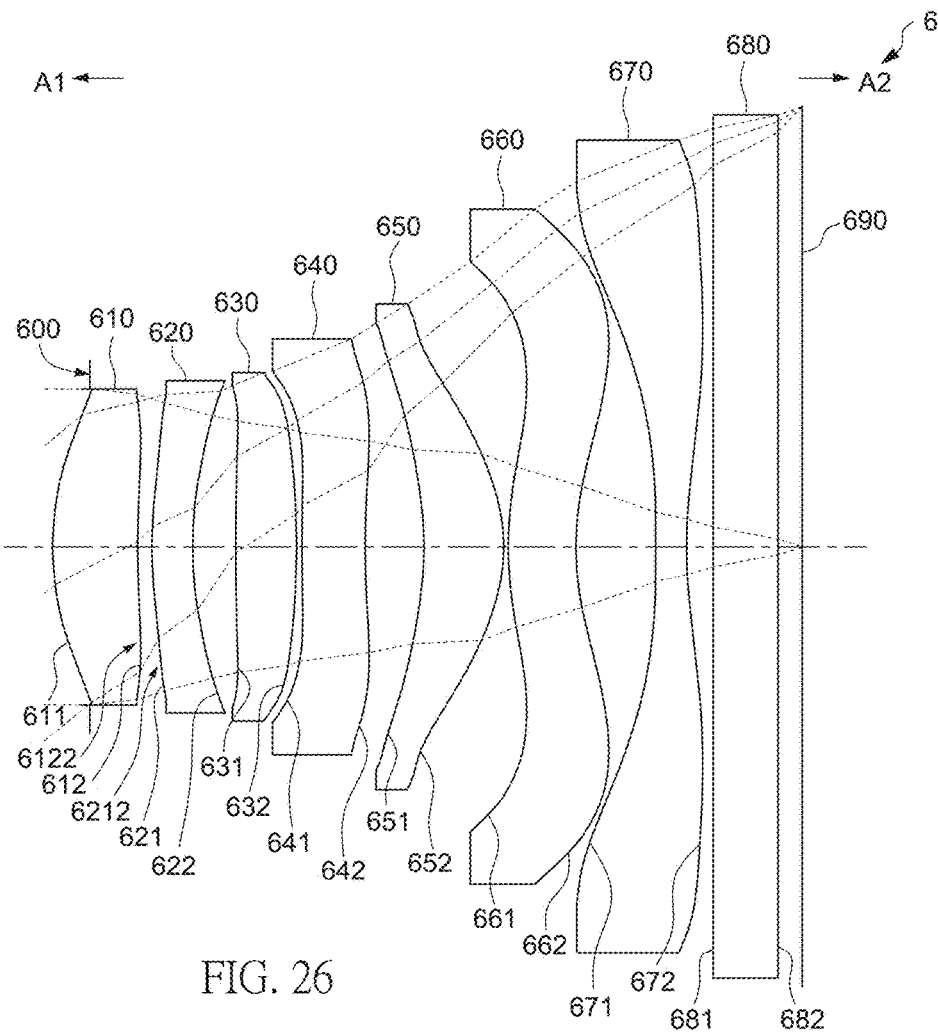
FIG. 26 depicts a cross-sectional view of a sixth embodiment of an optical imaging lens having seven lens elements according to the present disclosure.
Figure 27:
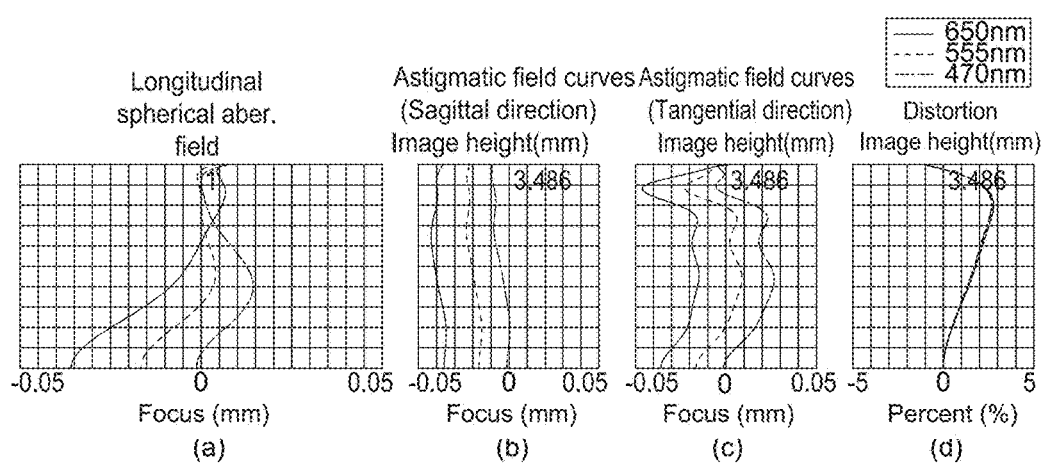
FIG. 27 depicts a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having seven lens elements of the optical imaging lens 6 according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650, a sixth lens element 660 and a seventh lens element 670.

The differences between the sixth embodiment and the first embodiment may include the radius of curvature and thickness of each lens element, the value of each air gap, aspherical data, related optical parameters, such as back focal length, and the configuration of the concave/convex shape of the object-side surface 621 and the image-side surface 612; but the configuration of the concave/convex shape of surfaces, comprising the object-side surfaces 611, 631, 641, 651, 661, 671 facing to the object side A1 and the image-side surfaces 622, 632, 642, 652, 662, 672 facing to the image side A2, and positive or negative configuration of the refracting power of each lens element are similar to those in the first embodiment. Specifically, the difference of configuration of surface shape include: the image-side surface 612 of the first lens element 610 may comprise a convex portion 6122 in a vicinity of a periphery of the first lens element 610, and the object-side surface 621 of the second lens element 620 may comprise a convex portion 6212 in a vicinity of a periphery of the second lens element 620. Please refer to FIG. 28 for the optical characteristics of each lens elements in the optical imaging lens 6 of the present embodiment, please refer to FIG. 62A for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 27(a), the offset of the off-axis light relative to the image point may be within about ±0.04 mm. As the astigmatism aberration in the sagittal direction shown in FIG. 27(b), the focus variation with regard to the three wavelengths in the whole field may fall within about ±0.05 mm. As the astigmatism aberration in the tangential direction shown in FIG. 27(c), the focus variation with regard to the three wavelengths in the whole field may fall within about ±0.05 mm. As shown in FIG. 27(d), the variation of the distortion aberration may be within about ±3%. Compared with the first embodiment, the longitudinal spherical aberration and the astigmatism aberration in the tangential direction shown in the present embodiment are less.

According to the value of the aberrations, it is shown that the optical imaging lens 6 of the present embodiment, with the length as short as about 5.922 mm, the HFOV as large as about 39.5 degrees and the Fno as small as about 1.7, may be capable of providing better imaging quality.

Figure 30:
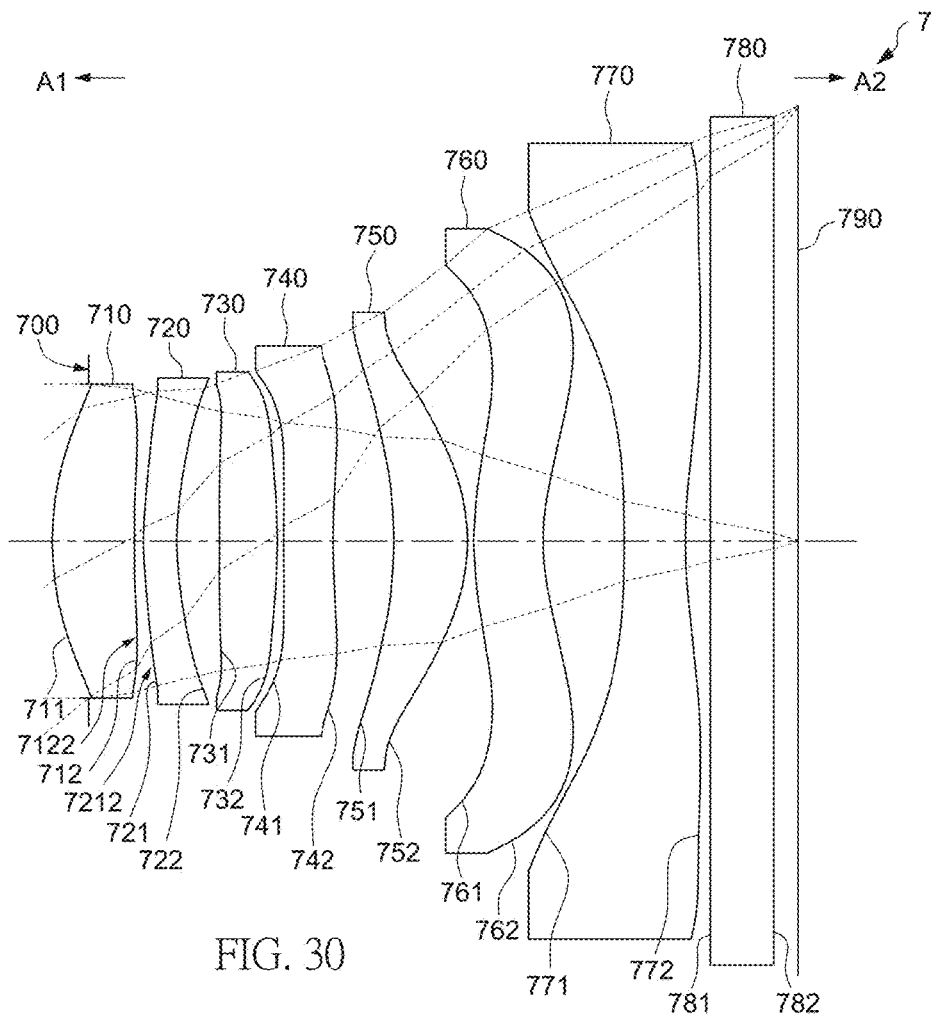
FIG. 30 depicts a cross-sectional view of a seventh embodiment of an optical imaging lens having seven lens elements according to the present disclosure.
Figure 31:
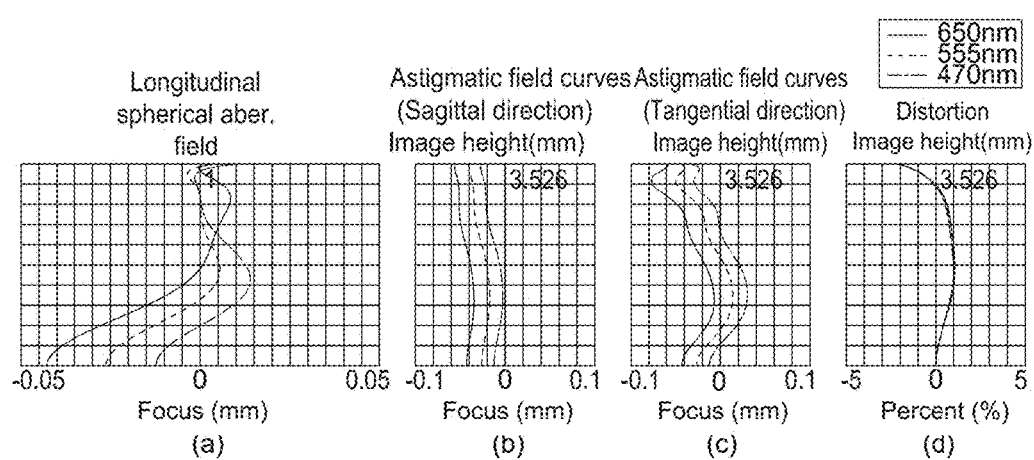
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having seven lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, a fifth lens element 750, a sixth lens element 760 and a seventh lens element 770.

The differences between the seventh embodiment and the first embodiment may include the radius of curvature and thickness of each lens element, the value of each air gap, aspherical data, related optical parameters, such as back focal length, and the configuration of the concave/convex shape of the object-side surface 721 and the image-side surfaces 712; but the configuration of the concave/convex shape of surfaces, comprising the object-side surfaces 711, 731, 741, 751, 761, 771 facing to the object side A1 and the image-side surfaces 722, 732, 742, 752, 762, 772 facing to the image side A2, and positive or negative configuration of the refracting power of each lens element are similar to those in the first embodiment. Specifically, the difference of configuration of surface shape include: the image-side surface 712 of the first lens element 710 may comprise a convex portion 7122 in a vicinity of a periphery of the first lens element 710, and the object-side surface 721 of the second lens element 720 may comprise a convex portion 7212 in a vicinity of a periphery of the second lens element 720. Please refer to FIG. 32 for the optical characteristics of each lens elements in the optical imaging lens 7 of the present embodiment, please refer to FIG. 62A for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 31(a), the offset of the off-axis light relative to the image point may be within about ±0.05 mm. As the astigmatism aberration in the sagittal direction shown in FIG. 31(b), the focus variation with regard to the three wavelengths in the whole field may fall within about ±0.06 mm. As the astigmatism aberration in the tangential direction shown in FIG. 31(c), the focus variation with regard to the three wavelengths in the whole field may fall within about ±0.08 mm. As shown in FIG. 31(d), the variation of the distortion aberration may be within about ±3%.

According to the value of the aberrations, it is shown that the optical imaging lens 7 of the present embodiment, with the length as short as about 5.964 mm, the HFOV as large as about 39.5 degrees and the Fno as small as about 1.7, may be capable of providing good imaging quality. Compared with the optical imaging lens 1 of the first embodiment, the optical imaging lens 7 of the present embodiment may be easier to make and may provide for better yield.

Figure 34:
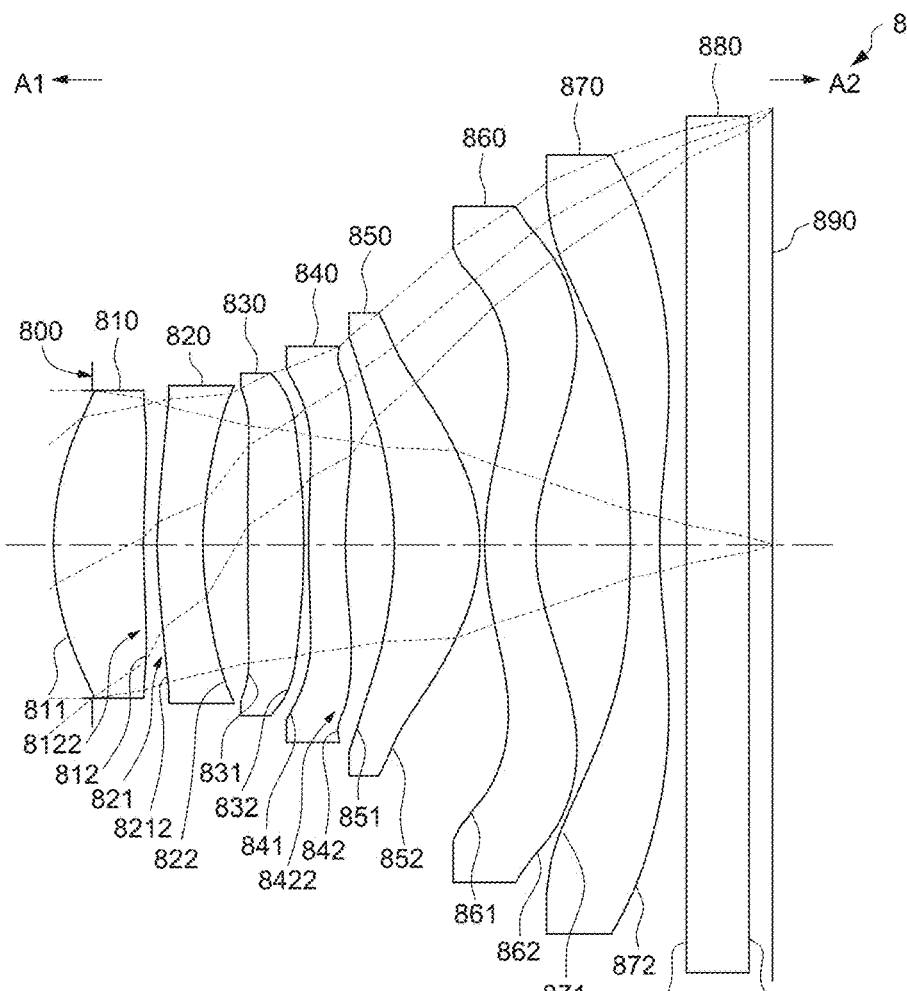
FIG. 34 depicts a cross-sectional view of an eighth embodiment of an optical imaging lens having seven lens elements according to the present disclosure.
Figure 35:
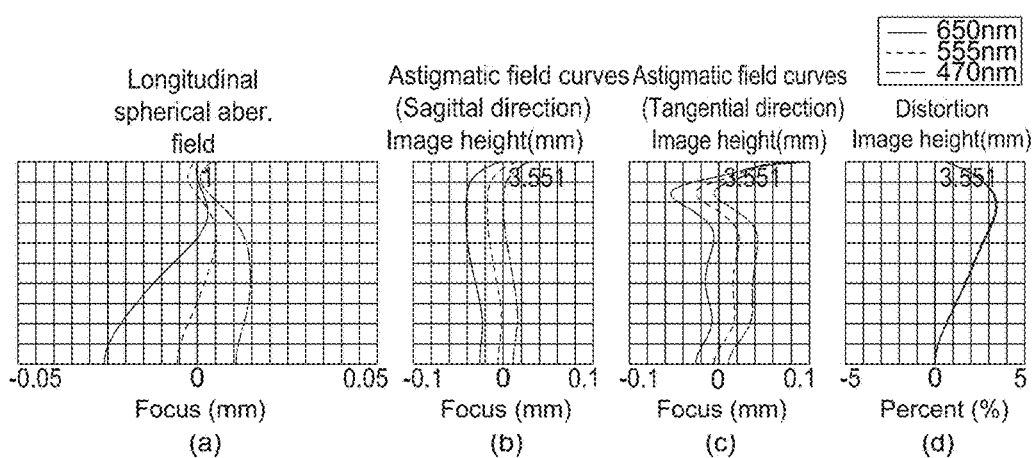
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having seven lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850, a sixth lens element 860 and a seventh lens element 870.

The differences between the eighth embodiment and the first embodiment may include the radius of curvature and thickness of each lens element, the value of each air gap, aspherical data, related optical parameters, such as back focal length, and the configuration of the concave/convex shape of the object-side surface 821 and the image-side surfaces 812, 842; but the configuration of the concave/convex shape of surfaces, comprising the object-side surfaces 811, 831, 841, 851, 861, 871 facing to the object side A1 and the image-side surfaces 822, 832, 852, 862, 872 facing to the image side A2, and positive or negative configuration of the refracting power of each lens element are similar to those in the first embodiment. Specifically, the differences of configuration of surface shape include: the image-side surface 812 of the first lens element 810 may comprise a convex portion 8122 in a vicinity of a periphery of the first lens element 810, the object-side surface 821 of the second lens element 820 may comprise a convex portion 8212 in a vicinity of a periphery of the second lens element 820, and the image-side surface 842 of the fourth lens element 840 may comprise a concave portion 8422 in a vicinity of a periphery of the fourth lens element 840. Please refer to FIG. 36 for the optical characteristics of each lens elements in the optical imaging lens 8 of the present embodiment, please refer to FIG. 62B for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 35(a), the offset of the off-axis light relative to the image point may be within about ±0.03 mm. As the astigmatism aberration in the sagittal direction shown in FIG. 35(b), the focus variation with regard to the three wavelengths in the whole field may fall within about ±0.05 mm. As the astigmatism aberration in the tangential direction shown in FIG. 35(c), the focus variation with regard to the three wavelengths in the whole field may fall within about ±0.1 mm. As shown in FIG. 35(d), the variation of the distortion aberration may be within about ±4%. Compared with the first embodiment, the longitudinal spherical aberration shown in the present embodiment is less.

According to the value of the aberrations, it is shown that the optical imaging lens 8 of the present embodiment, with the length as short as about 5.918 mm, the HFOV as large as about 39.5 degrees and the Fno as small as about 1.7, may be capable of providing better imaging quality. Compared with the optical imaging lens 1 of the first embodiment, the optical imaging lens 8 of the present embodiment may be easier to make and may provide for better yield.

Figure 38:
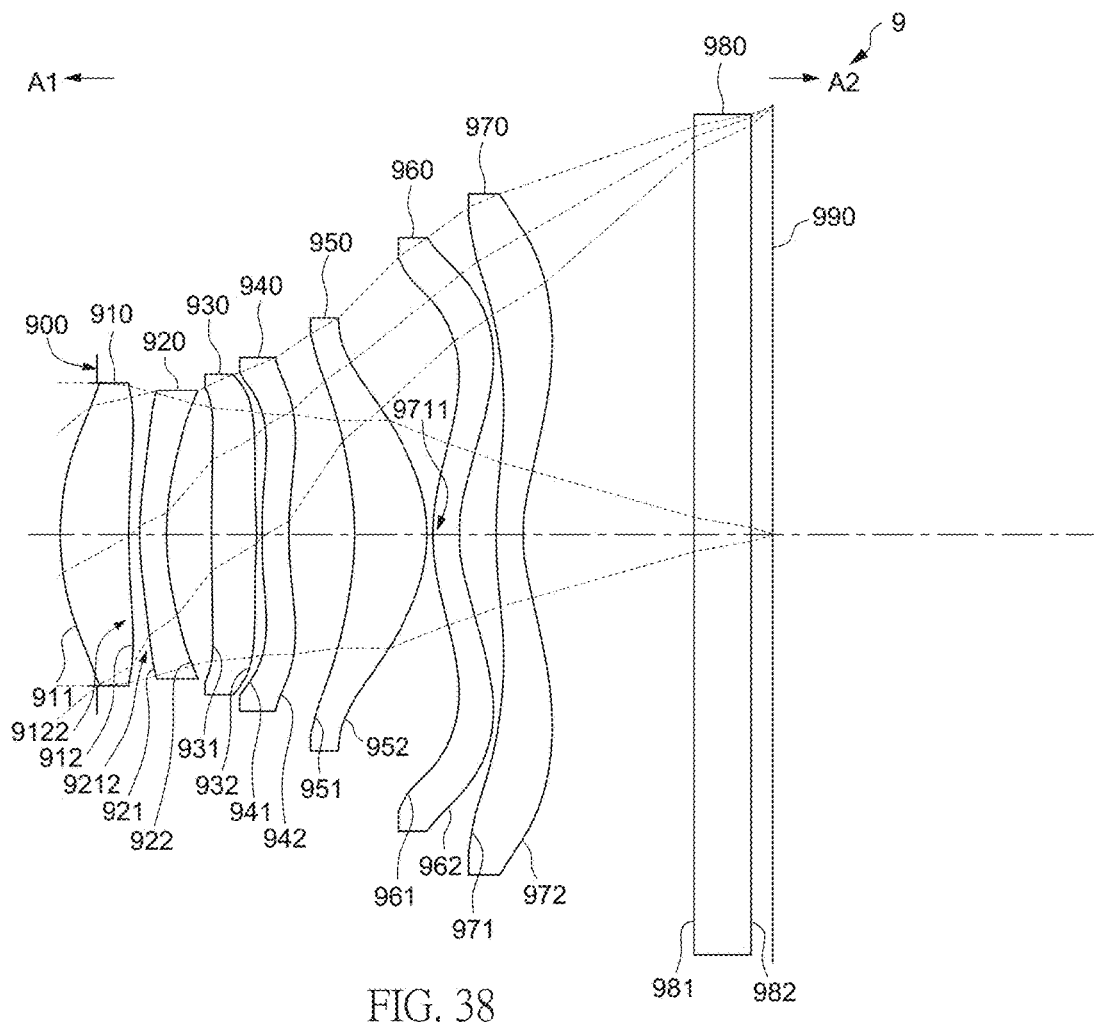
FIG. 38 depicts a cross-sectional view of a ninth embodiment of an optical imaging lens having seven lens elements according to the present disclosure.
Figure 39:
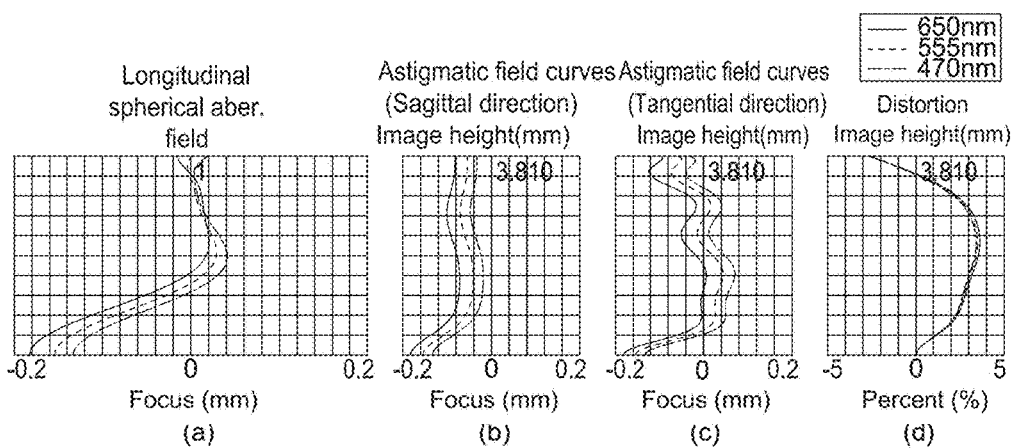
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having seven lens elements of the optical imaging lens according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950, a sixth lens element 960 and a seventh lens element 970.

The differences between the ninth embodiment and the first embodiment may include the radius of curvature and thickness of each lens element, the value of each air gap, aspherical data and related optical parameters, such as back focal length, and the configuration of the concave/convex shape of the object-side surfaces 921, 971 and the image-side surface 912; but the configuration of the concave/convex shape of surfaces, comprising the object-side surfaces 911, 931, 941, 951, 961 facing to the object side A1 and the image-side surfaces 922, 932, 942, 952, 962, 972 facing to the image side A2, and positive or negative configuration of the refracting power of each lens element are similar to those in the first embodiment. Specifically, the differences of configuration of surface shape include: the image-side surface 912 of the first lens element 910 may comprise a convex portion 9122 in a vicinity of a periphery of the first lens element 910, the object-side surface 921 of the second lens element 920 may comprise a convex portion 9212 in a vicinity of a periphery of the second lens element 920, and the object-side surface 971 of the seventh lens element 970 may comprise a convex portion 9711 in a vicinity of the optical axis. Please refer to FIG. 40 for the optical characteristics of each lens elements in the optical imaging lens 9 of the present embodiment, please refer to FIG. 62B for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 39(a), the offset of the off-axis light relative to the image point may be within about ±0.2 mm. As the astigmatism aberration in the sagittal direction shown in FIG. 39(b), the focus variation with regard to the three wavelengths in the whole field may fall within about ±0.2 mm. As the astigmatism aberration in the tangential direction shown in FIG. 39(c), the focus variation with regard to the three wavelengths in the whole field may fall within about ±0.2 mm. As shown in FIG. 39(d), the variation of the distortion aberration may be within about ±4%.

According to the value of the aberrations, it is shown that the optical imaging lens 9 of the present embodiment, with the length as short as about 6.374 mm, the HFOV as large as about 39.5 degrees and the Fno as small as about 1.7, may be capable of providing good imaging quality. Compared with the optical imaging lens 1 of the first embodiment, the optical imaging lens 9 of the present embodiment may be easier to make and may provide for better yield.

Figure 42:
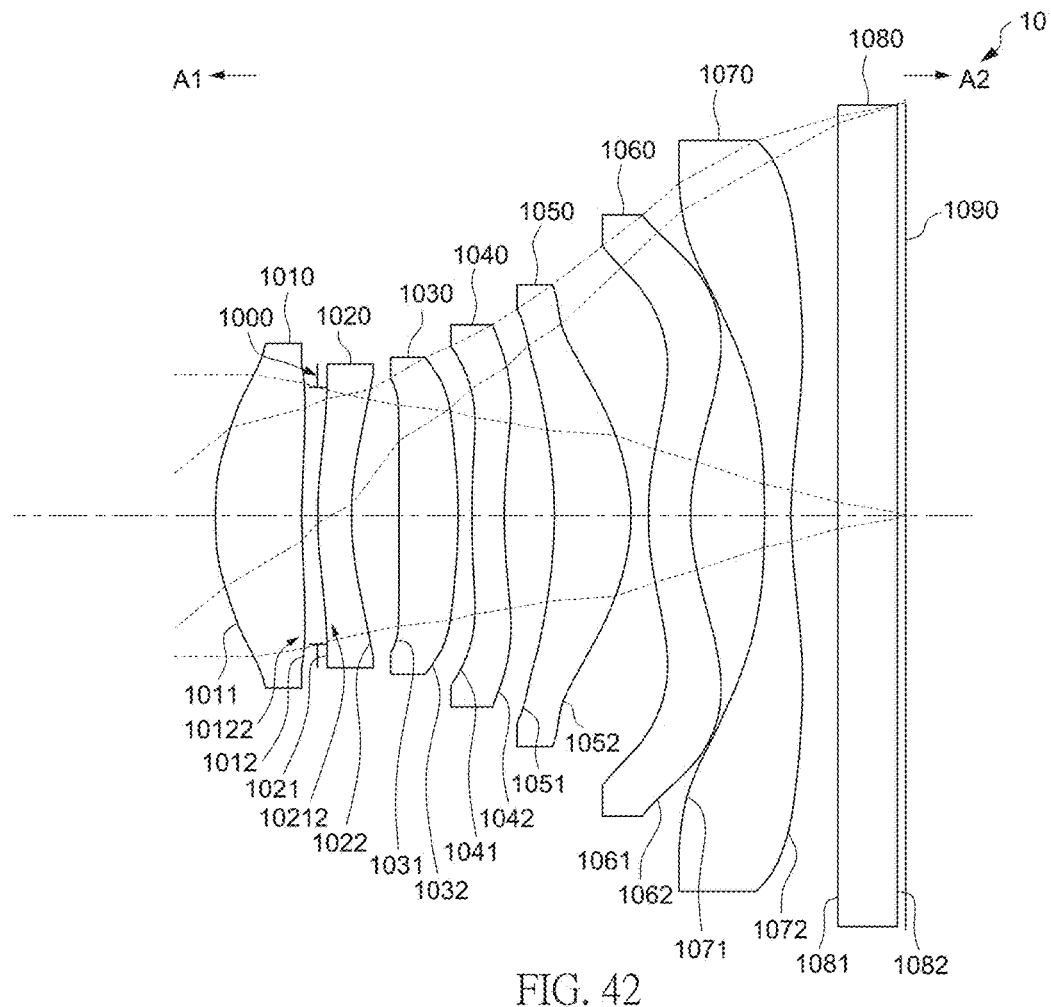
FIG. 42 depicts a cross-sectional view of a tenth embodiment of an optical imaging lens having seven lens elements according to the present disclosure.
Figure 43:
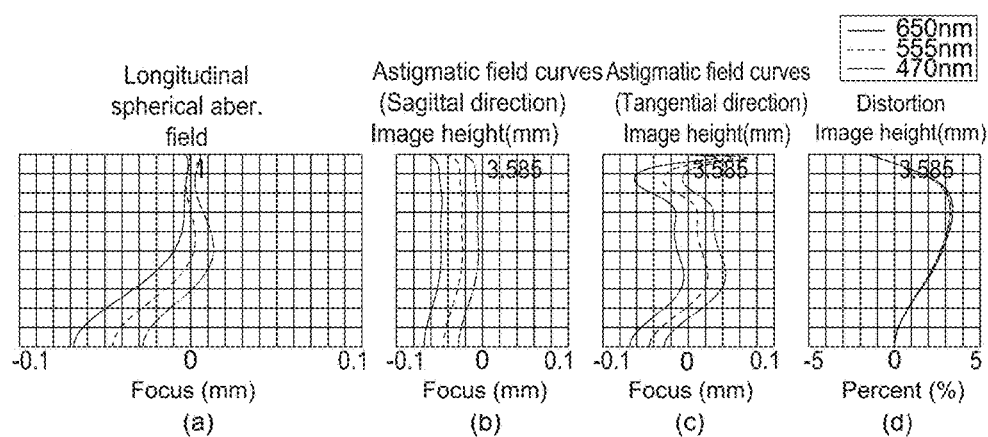
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having seven lens elements of the optical imaging lens according to a tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise a first lens element 1010, an aperture stop 1000, a second lens element 1020, a third lens element 1030, a fourth lens element 1040, a fifth lens element 1050, a sixth lens element 1060 and a seventh lens element 1070.

The differences between the tenth embodiment and the first embodiment may include the radius of curvature and thickness of each lens element, the value of each air gap, aspherical data, related optical parameters, such as back focal length, and the configuration of the concave/convex shape of the object-side surface 1021 and the image-side surface 1012; but the configuration of the concave/convex shape of surfaces, comprising the object-side surfaces 1011, 1031, 1041, 1051, 1061, 1071 facing to the object side A1 and the image-side surfaces 1022, 1032, 1042, 1052, 1062, 1072 facing to the image side A2, and positive or negative configuration of the refracting power of each lens element are similar to those in the first embodiment. Specifically, the difference of configuration of surface shape may include: the image-side surface 1012 of the first lens element 1010 may comprise a convex portion 10122 in a vicinity of a periphery of the first lens element 1010, and the object-side surface 1021 of the second lens element 1020 may comprise a convex portion 10212 in a vicinity of a periphery of the second lens element 1020. Please refer to FIG. 44 for the optical characteristics of each lens elements in the optical imaging lens 10 of the present embodiment, please refer to FIG. 62B for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 43(*a*), the offset of the off-axis light relative to the image point may be within about ±0.07 mm. As the astigmatism aberration in the sagittal direction shown in FIG. 43(*b*), the focus variation with regard to the three wavelengths in the whole field may fall within about ±0.08 mm. As the astigmatism aberration in the tangential direction shown in FIG. 43(*c*), the focus variation with regard to the three wavelengths in the whole field may fall within about ±0.08 mm. As shown in FIG. 43(*d*), the variation of the distortion aberration may be within about ±4%.

According to the value of the aberrations, it is shown that the optical imaging lens 10 of the present embodiment, with the length as short as about 5.926 mm, the HFOV as large as about 39.5 degrees and the Fno as small as about 1.7, may be capable of providing good imaging quality. Compared with the optical imaging lens 1 of the first embodiment, the optical imaging lens 10 of the present embodiment may be easier to make and may provide for better yield.

Figure 46:
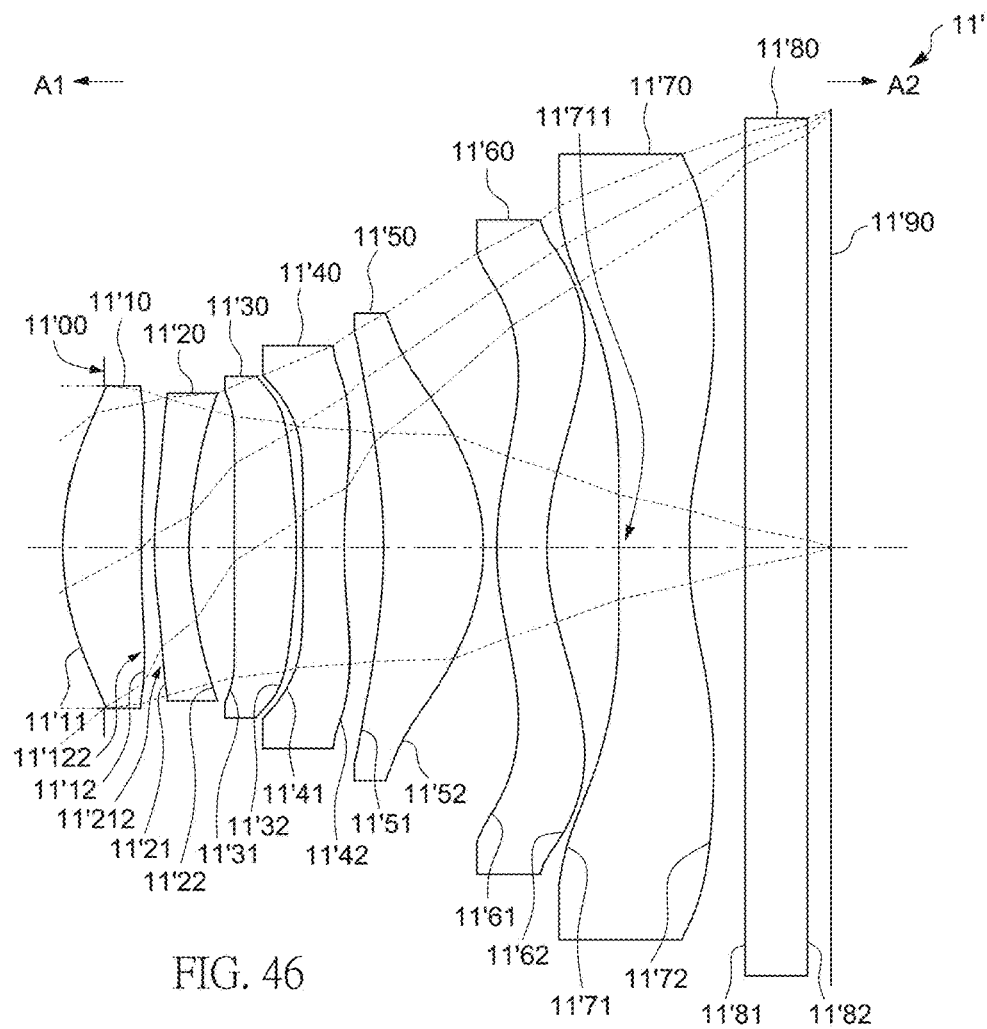
FIG. 46 depicts a cross-sectional view of an eleventh embodiment of an optical imaging lens having seven lens elements according to the present disclosure.
Figure 47:
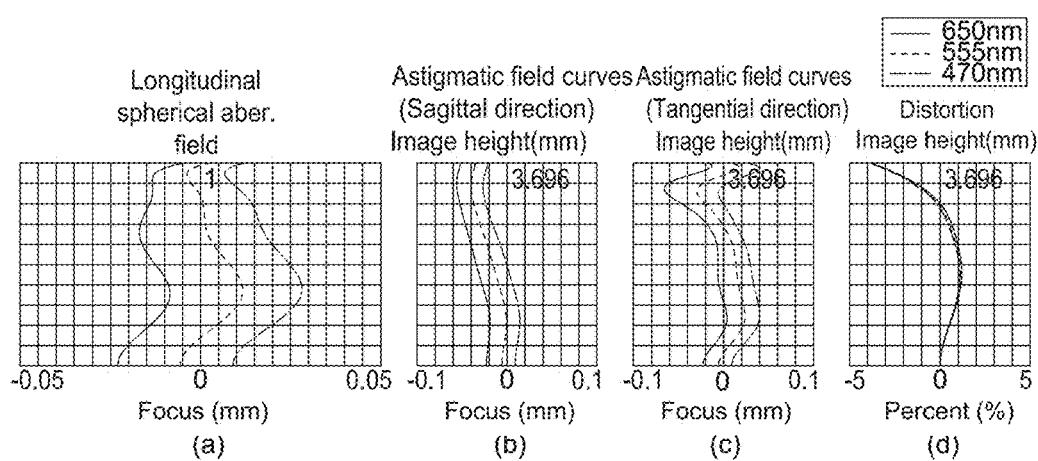
FIG. 47 depicts a chart of longitudinal spherical aberration and other kinds of optical aberrations of an eleventh embodiment of the optical imaging lens according to the present disclosure.

Reference is now made to FIGS. 46-49. FIG. 46 illustrates an example cross-sectional view of an optical imaging lens 11' having seven lens elements of the optical imaging lens according to an eleventh example embodiment. FIG. 47 shows example charts of longitudinal spherical aberration and other kinds of optical aberrations of the optical imaging lens 11' according to the eleventh embodiment. FIG. 48 shows an example table of optical data of each lens element of the optical imaging lens 11' according to the eleventh example embodiment. FIG. 49 shows an example table of aspherical data of the optical imaging lens 11' according to the eleventh example embodiment. The reference numbers labeled in the present embodiment are similar to those in the first embodiment for the similar elements, but here the reference numbers are initialed with 11', for example, reference number 11'31 for labeling the object-side surface of the third lens element 11'30, reference number 11'32 for labeling the image-side surface of the third lens element 11'30, etc.

As shown in FIG. 46, the optical imaging lens 11' of the present embodiment, in an order from an object side A1 to an image side A2 along an optical axis, may comprise an aperture stop 11'00, a first lens element 11'10, a second lens element 11'20, a third lens element 11'30, a fourth lens element 11'40, a fifth lens element 11'50, a sixth lens element 11'60 and a seventh lens element 11'70.

The differences between the eleventh embodiment and the first embodiment may include the radius of curvature and thickness of each lens element, the value of each air gap, aspherical data and related optical parameters, such as back focal length, and the configuration of the concave/convex shape of the object-side surfaces 11'21, 11'71 and the image-side surface 11'12; but the configuration of the concave/convex shape of surfaces, comprising the object-side surfaces 11'11, 11'31, 11'41, 11'51, 11'61 facing to the object side A1 and the image-side surfaces 11'22, 11'32, 11'42, 11'52, 11'62, 11'72 facing to the image side A2, and positive or negative configuration of the refracting power of each lens element are similar to those in the first embodiment. Specifically, the differences of configuration of surface shape include: the image-side surface 11'12 of the first lens element 11'10 may comprise a convex portion 11'122 in a vicinity of a periphery of the first lens element 11'10, the object-side surface 11'21 of the second lens element 11'20 may comprise a convex portion 11'212 in a vicinity of a periphery of the second lens element 11'20, and the object-side surface 11'71 of the seventh lens element 1170 may comprise a convex portion 11711 in a vicinity of the optical axis. Please refer to FIG. 48 for the optical characteristics of each lens elements in the optical imaging lens 11' of the present embodiment, please refer to FIG. 62B for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 47(*a*), the offset of the off-axis light relative to the image point may be within about ±0.03 mm. As the astigmatism aberration in the sagittal direction shown in FIG. 47(*b*), the focus variation with regard to the three wavelengths in the whole field may fall within about ±0.06 mm. As the astigmatism aberration in the tangential direction shown in FIG. 47(*c*), the focus variation with regard to the three wavelengths in the whole field may fall within about ±0.08 mm. As shown in FIG. 47(*d*), the variation of the distortion aberration may be within about ±4%. Compared with the optical imaging lens 1 of the first embodiment, the longitudinal spherical aberration of the optical imaging lens 11' of the present embodiment is less.

According to the value of the aberrations, it is shown that the optical imaging lens 11' of the present embodiment, with the length as short as about 6.266 mm, the HFOV as large as about 39.5 degrees and the Fno as small as about 1.7, may be capable of providing good imaging quality. Compared with the optical imaging lens 1 of the first embodiment, the optical imaging lens 11' of the present embodiment may be easier to make and may provide for better yield.

Figure 50:
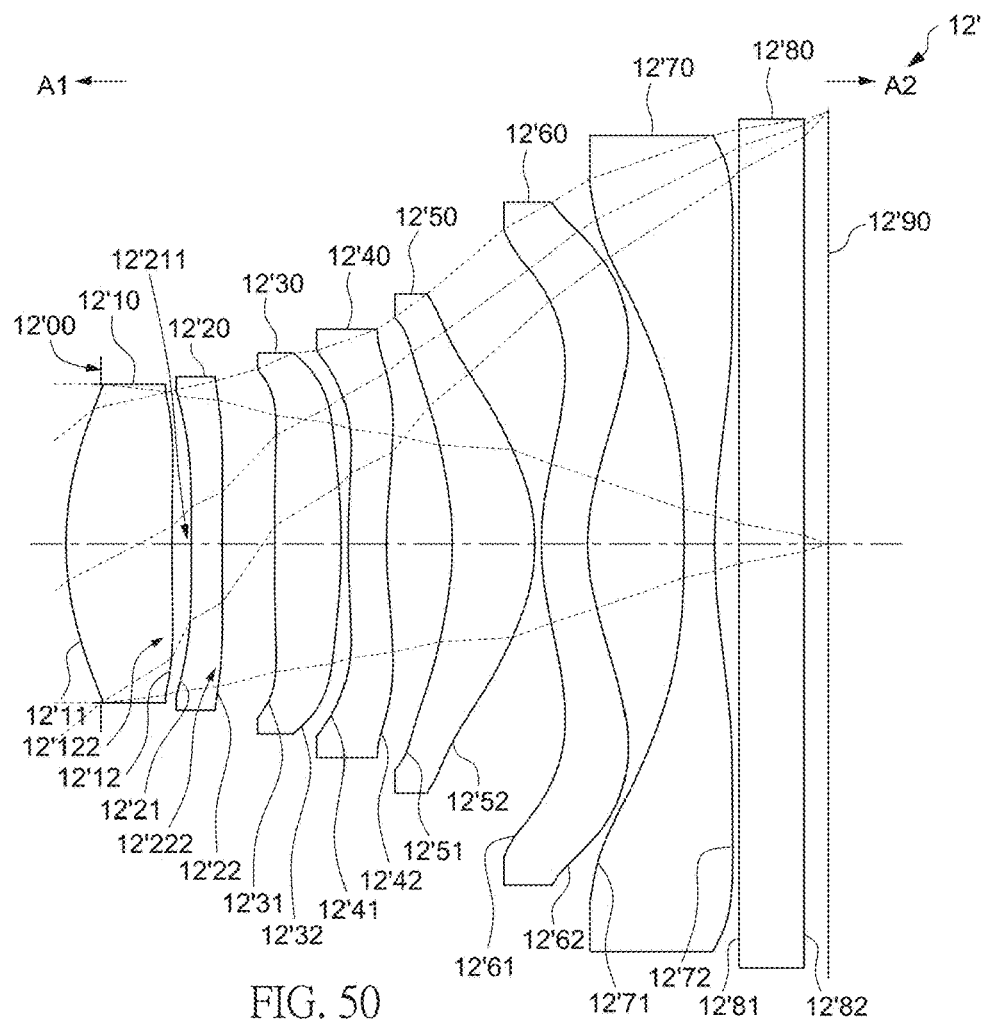
FIG. 50 depicts a cross-sectional view of a twelfth embodiment of an optical imaging lens having seven lens elements according to the present disclosure.
Figure 51:
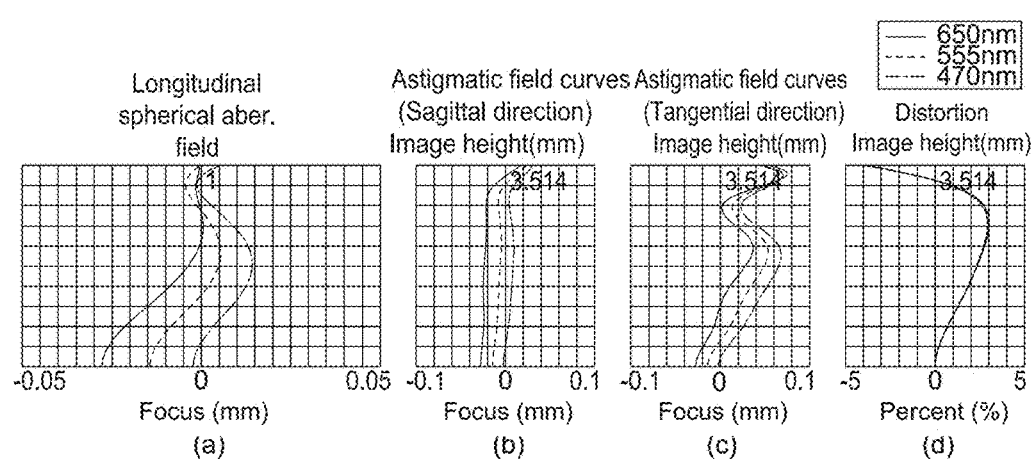
FIG. 51 depicts a chart of longitudinal spherical aberration and other kinds of optical aberrations of a twelfth embodiment of the optical imaging lens according to the present disclosure.

Reference is now made to FIGS. 50-53. FIG. 50 illustrates an example cross-sectional view of an optical imaging lens 12' having seven lens elements of the optical imaging lens according to a twelfth example embodiment. FIG. 51 shows example charts of longitudinal spherical aberration and other kinds of optical aberrations of the optical imaging lens 12' according to the twelfth embodiment. FIG. 52 shows an example table of optical data of each lens element of the optical imaging lens 12' according to the twelfth example embodiment. FIG. 53 shows an example table of aspherical data of the optical imaging lens 12' according to the twelfth example embodiment. The reference numbers labeled in the present embodiment are similar to those in the first embodiment for the similar elements, but here the reference numbers are initialed with 12', for example, reference number 12'31 for labeling the object-side surface of the third lens element 12'30, reference number 12'32 for labeling the image-side surface of the third lens element 12'30, etc.

As shown in FIG. 50, the optical imaging lens 12' of the present embodiment, in an order from an object side A1 to an image side A2 along an optical axis, may comprise an aperture stop 12'00, a first lens element 12'10, a second lens element 12'20, a third lens element 12'30, a fourth lens element 12'40, a fifth lens element 12'50, a sixth lens element 12'60 and a seventh lens element 12'70.

The differences between the twelfth embodiment and the first embodiment may include the radius of curvature and thickness of each lens element, the value of each air gap, aspherical data and related optical parameters, such as back focal length, and the configuration of the concave/convex shape of the object-side surface 12'21 and the image-side surfaces 12'12, 12'22; but the configuration of the concave/convex shape of surfaces, comprising the object-side surfaces 12'11, 12'31, 12'41, 12'51, 12'61, 12'71 facing to the object side A1 and the image-side surfaces 12'32, 12'42, 12'52, 12'62, 1272 facing to the image side A2, and positive or negative configuration of the refracting power of each lens element are similar to those in the first embodiment. Specifically, the differences of configuration of surface shape include: the image-side surface 12'12 of the first lens element 12'10 may comprise a convex portion 12'122 in a vicinity of a periphery of the first lens element 12'10, the object-side surface 12'21 of the second lens element 12'20 may comprise a concave portion 12'211 in a vicinity of the optical axis, and the image-side surface 12'22 of the second lens element 12'20 may comprise a convex portion 12'222 in a vicinity of a periphery of the second lens element 12'20. Please refer to FIG. 52 for the optical characteristics of each lens elements in the optical imaging lens 12' of the present embodiment, please refer to FIG. 62B for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 51(a), the offset of the off-axis light relative to the image point may be within about ±0.03 mm. As the astigmatism aberration in the sagittal direction shown in FIG. 51(b), the focus variation with regard to the three wavelengths in the whole field may fall within about ±0.04 mm. As the astigmatism aberration in the tangential direction shown in FIG. 51(c), the focus variation with regard to the three wavelengths in the whole field may fall within about ±0.08 mm. As shown in FIG. 51(d), the variation of the distortion aberration may be within about ±4%. Compared with the optical imaging lens 1 of the first embodiment, the longitudinal spherical aberration and the astigmatism aberration in the sagittal direction of the optical imaging lens 12' of the present embodiment are less.

According to the value of the aberrations, it is shown that the optical imaging lens 12' of the present embodiment, with the length as short as about 5.978 mm, the HFOV as large as about 39.5 degrees and the Fno as small as about 1.7, may be capable of providing good imaging quality. Compared with the optical imaging lens 1 of the first embodiment, the optical imaging lens 12' of the present embodiment may be easier to make and may provide for better yield.

Figure 54:
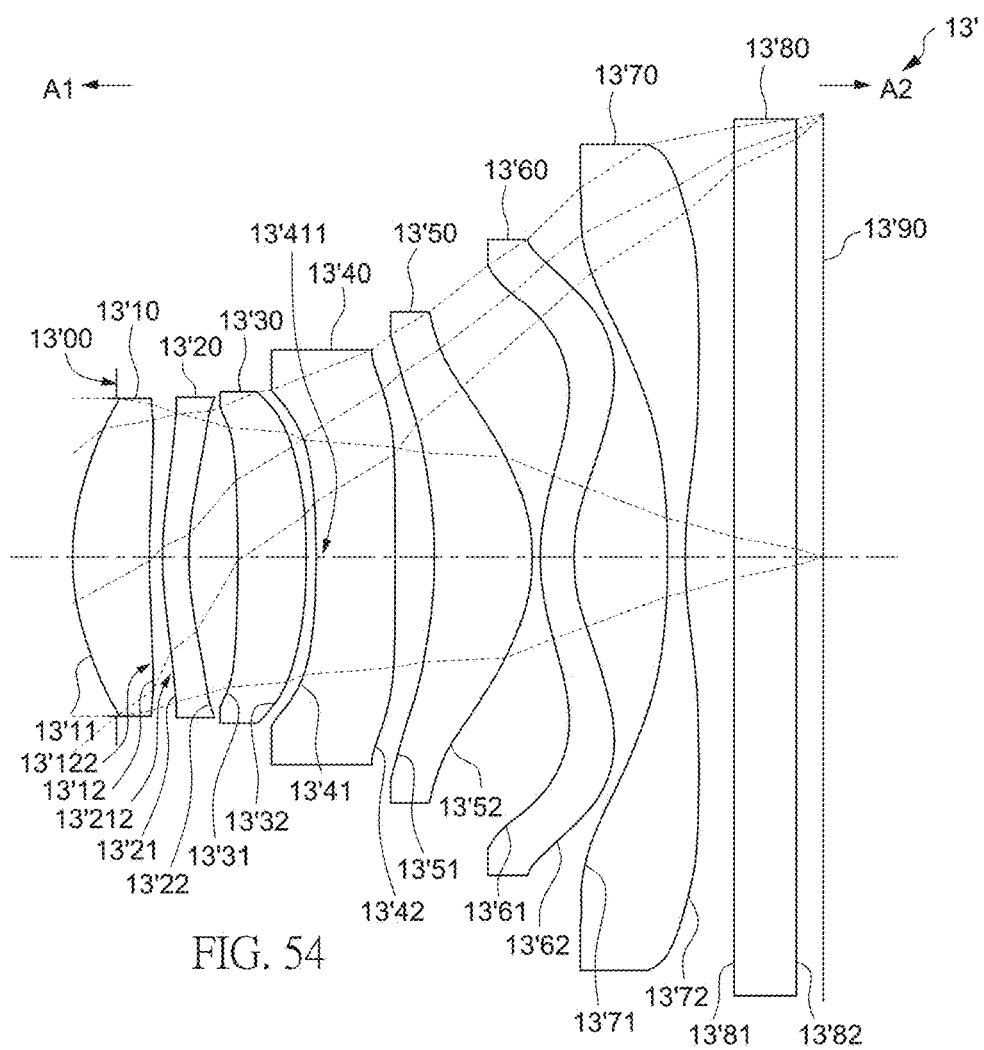
FIG. 54 depicts a cross-sectional view of a thirteenth embodiment of an optical imaging lens having seven lens elements according to the present disclosure.
Figure 55:
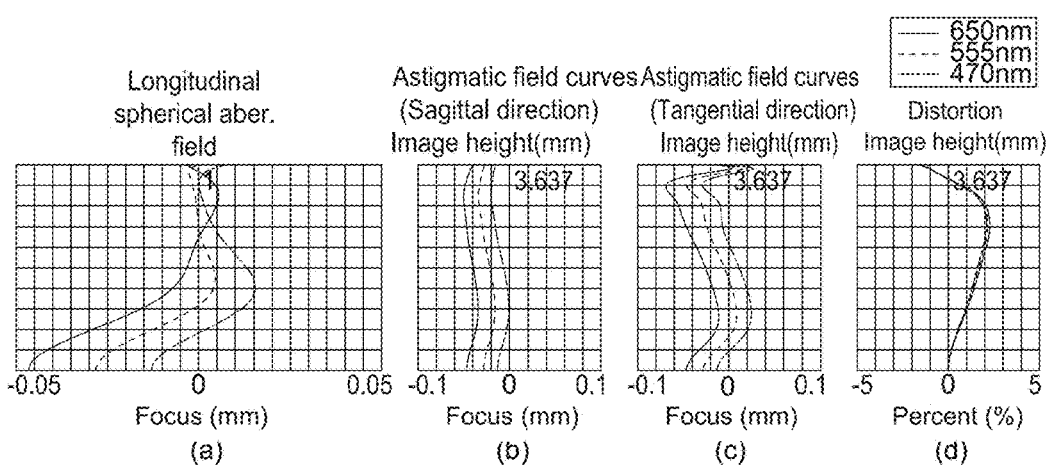
FIG. 55 depicts a chart of longitudinal spherical aberration and other kinds of optical aberrations of a thirteenth embodiment of the optical imaging lens according to the present disclosure.

Reference is now made to FIGS. 54-57. FIG. 54 illustrates an example cross-sectional view of an optical imaging lens 13' having seven lens elements of the optical imaging lens according to a thirteenth example embodiment. FIG. 55 shows example charts of longitudinal spherical aberration and other kinds of optical aberrations of the optical imaging lens 13' according to the thirteenth embodiment. FIG. 56 shows an example table of optical data of each lens element of the optical imaging lens 13' according to the thirteenth example embodiment. FIG. 57 shows an example table of aspherical data of the optical imaging lens 13' according to the thirteenth example embodiment. The reference numbers labeled in the present embodiment are similar to those in the first embodiment for the similar elements, but here the reference numbers are initialed with 13', for example, reference number 13'31 for labeling the object-side surface of the third lens element 13'30, reference number 13'32 for labeling the image-side surface of the third lens element 13'30, etc.

As shown in FIG. 54, the optical imaging lens 13' of the present embodiment, in an order from an object side A1 to an image side A2 along an optical axis, may comprise an aperture stop 13'00, a first lens element 13'10, a second lens element 13'20, a third lens element 13'30, a fourth lens element 13'40, a fifth lens element 13'50, a sixth lens element 13'60 and a seventh lens element 13'70.

The differences between the thirteenth embodiment and the first embodiment may include the radius of curvature and thickness of each lens element, the value of each air gap, aspherical data and related optical parameters, such as back focal length, and the configuration of the concave/convex shape of the object-side surfaces 13'21, 13'41 and the image-side surface 13'12; but the configuration of the concave/convex shape of surfaces, comprising the object-side surfaces 13'11, 13'31, 13'51, 13'61, 13'71 facing to the object side A1 and the image-side surfaces 13'22, 13'32, 1342, 13'52, 13'62, 13'72 facing to the image side A2, and positive or negative configuration of the refracting power of each lens element are similar to those in the first embodiment. Specifically, the differences of configuration of surface shape include: the image-side surface 13'12 of the first lens element 13'10 may comprise a convex portion 13'122 in a vicinity of a periphery of the first lens element 13'10, the object-side surface 13'21 of the second lens element 13'20 may comprise a convex portion 13'212 in a vicinity of a periphery of the second lens element 13'20, and the object-side surface 13'41 of the fourth lens element 13'40 may comprise a concave portion 13'411 in a vicinity of the optical axis. Please refer to FIG. 56 for the optical characteristics of each lens elements in the optical imaging lens 13' of the present embodiment, please refer to FIG. 62B for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 55(a), the offset of the off-axis light relative to the image point may be within about ±0.05 mm. As the astigmatism aberration in the sagittal direction shown in FIG. 55(b), the focus variation with regard to the three wavelengths in the whole field may fall within about ±0.06 mm. As the astigmatism aberration in the tangential direction shown in FIG. 55(c), the focus variation with regard to the three wavelengths in the whole field may fall within about ±0.08 mm. As shown in FIG. 55(d), the variation of the distortion aberration may be within about ±3%.

According to the value of the aberrations, it is shown that the optical imaging lens 13' of the present embodiment, with the length as short as about 6.120 mm, the HFOV as large as about 39.5 degrees and the Fno as small as about 1.7, may be capable of providing good imaging quality. Compared with the optical imaging lens 1 of the first embodiment, the optical imaging lens 13' of the present embodiment may be easier to make and may provide for better yield.

Figure 58:
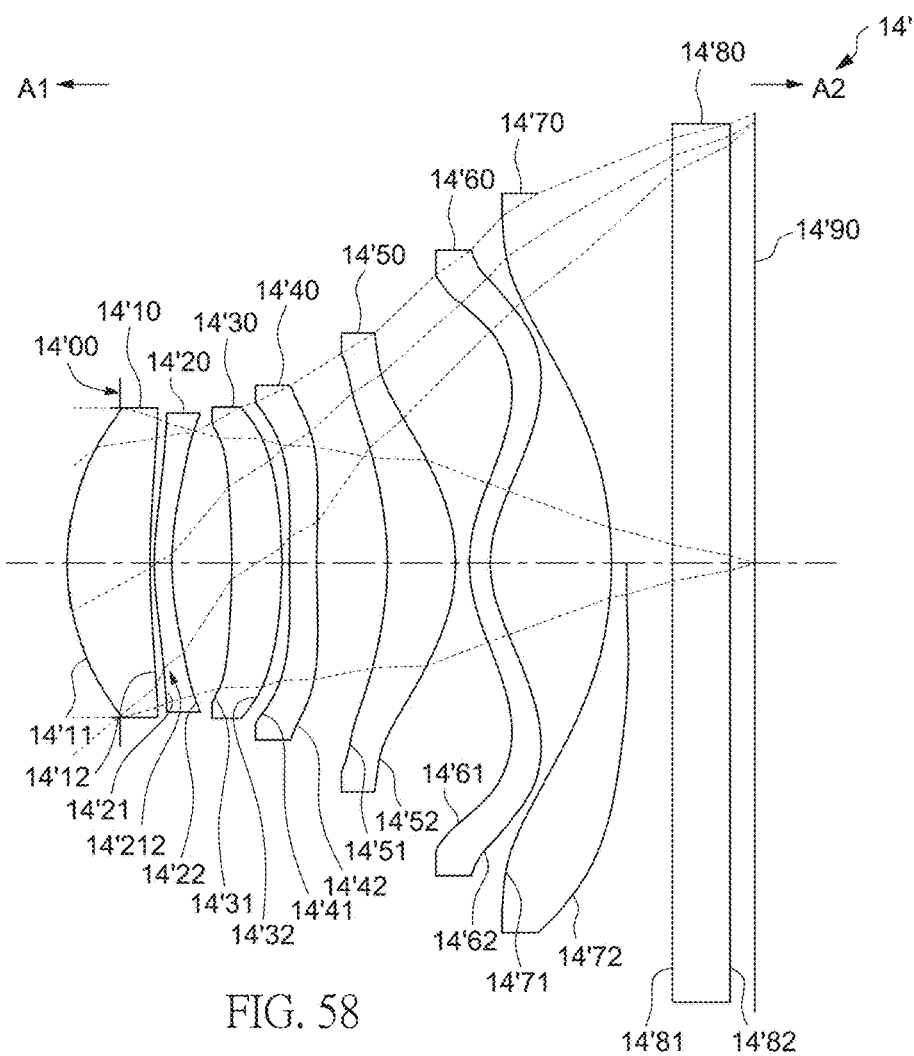
FIG. 58 depicts a cross-sectional view of a fourteenth embodiment of an optical imaging lens having seven lens elements according to the present disclosure.
Figure 59:
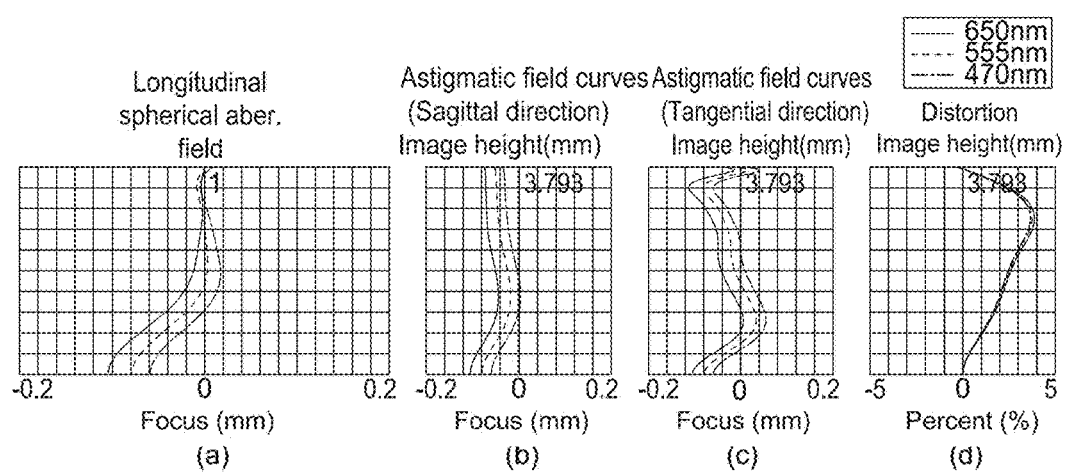
FIG. 59 depicts a chart of longitudinal spherical aberration and other kinds of optical aberrations of a fourteenth embodiment of the optical imaging lens according to the present disclosure.

Reference is now made to FIGS. 58-61. FIG. 58 illustrates an example cross-sectional view of an optical imaging lens 14' having seven lens elements of the optical imaging lens according to a fourteenth example embodiment. FIG. 59 shows example charts of longitudinal spherical aberration and other kinds of optical aberrations of the optical imaging lens 14' according to the fourteenth embodiment. FIG. 60 shows an example table of optical data of each lens element of the optical imaging lens 14' according to the fourteenth example embodiment. FIG. 61 shows an example table of aspherical data of the optical imaging lens 14' according to the fourteenth example embodiment. The reference numbers labeled in the present embodiment are similar to those in the first embodiment for the similar elements, but here the reference numbers are initialed with 14', for example, reference number 14'31 for labeling the object-side surface of the third lens element 14'30, reference number 14'32 for labeling the image-side surface of the third lens element 14'30, etc.

As shown in FIG. 58, the optical imaging lens 14' of the present embodiment, in an order from an object side A1 to an image side A2 along an optical axis, may comprise an aperture stop 14'00, a first lens element 14'10, a second lens element 14'20, a third lens element 14'30, a fourth lens element 14'40, a fifth lens element 14'50, a sixth lens element 14'60 and a seventh lens element 14'70.

The differences between the fourteenth embodiment and the first embodiment may include the radius of curvature and thickness of each lens element, the value of each air gap, aspherical data and related optical parameters, such as back focal length, and the configuration of the concave/convex shape of the object-side surface 14'21; but the configuration of the concave/convex shape of surfaces, comprising the object-side surfaces 14'11, 14'31, 14'41, 14'51, 14'61, 14'71 facing to the object side A1 and the image-side surfaces 14'12, 14'22, 14'32, 14'42, 14'52, 14'62, 14'72 facing to the image side A2, and positive or negative configuration of the refracting power of each lens element are similar to those in the first embodiment. Specifically, the differences of configuration of surface shape include: the object-side surface 14'21 of the second lens element 14'20 may comprise a convex portion 14'212 in a vicinity of a periphery of the second lens element 14'20. Please refer to FIG. 60 for the optical characteristics of each lens elements in the optical imaging lens 14' of the present embodiment, please refer to FIG. 62B for the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of the present embodiment.

As the longitudinal spherical aberration shown in FIG. 59(a), the offset of the off-axis light relative to the image point may be within about ±0.12 mm. As the astigmatism aberration in the sagittal direction shown in FIG. 59(b), the focus variation with regard to the three wavelengths in the whole field may fall within about ±0.12 mm. As the astigmatism aberration in the tangential direction shown in FIG. 59(c), the focus variation with regard to the three wavelengths in the whole field may fall within about ±0.12 mm. As shown in FIG. 59(d), the variation of the distortion aberration may be within about ±4%.

According to the value of the aberrations, it is shown that the optical imaging lens 14' of the present embodiment, with the length as short as about 6.037 mm, the HFOV as large as about 39.5 degrees and the Fno as small as about 1.7, may be capable of providing good imaging quality. Compared with the optical imaging lens 1 of the first embodiment, the optical imaging lens 14' of the present embodiment may be easier to make and may provide for better yield.

Please refer to FIG. 62A and FIG. 62B, which show the values of T1/G45, T1/G23, T3/G23, T4/G45, T5/G67, (TL+ALT)/(BFL+Gaa), (G12+T3)/G23, (G12+T4)/G23, (G12+T2+G23)/G45, TTL/(BFL+G45), TL/(BFL+G45), (T5+T6)/(G45+G67), (T4+T5+T6)/(G45+G67), (T1+T4+T5)/(G45+G67), (T1+T2)/G23, (T4+T6)/G23, T7/(G12+G23) and (T6+T7)/(G12+G23) of all fourteen embodiments, and it is clear that the optical imaging lens of the present disclosure may satisfy at least one of the inequalities (1)~(19). Further, any range which upper and lower limits defined by the values discloses in all of the embodiments shown here may be implemented in the present embodiments.

According to above illustration, the longitudinal spherical aberration, astigmatism aberration both in the sagittal direction and tangential direction and distortion aberration in all embodiments are meet user term of a related product in the market. The off-axis light with regard to three different wavelengths (470 nm, 555 nm, 650 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Further, all of the numerical ranges including the maximum and minimum values and the values therebetween which are obtained from the combining proportion relation of the optical parameters disclosed in each embodiment of the present disclosure are implementable.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first element, a second element, a third element, a fourth element, a fifth lens element, a sixth lens element and a seventh lens element sequentially from an object side to an image side along an optical axis, each of the first, second, third, fourth, fifth, sixth and seventh lens elements having refracting power, an object-side surface facing toward the object side and allowing an imaging ray to pass therethrough and an image-side surface facing toward the image side and allowing the imaging ray to pass therethrough, wherein:
- the first lens element has positive refracting power, and the image-side surface of the first lens element comprises a concave portion in a vicinity of the optical axis;
- the object-side surface of the third lens element comprises a concave portion in a vicinity of a periphery of the third lens element, and the image-side surface of the third lens element comprises a convex portion in a vicinity of the optical axis;
- the fifth lens element has positive refracting power, the object-side surface of the fifth lens element comprises a concave portion in a vicinity of a periphery of the fifth lens element, and the image-side surface of the fifth lens element comprises a convex portion in a vicinity of the periphery of the fifth lens element;
- the image-side surface of the sixth lens element comprises a concave portion in a vicinity of the optical axis;
- the image-side surface of the seventh lens element comprises a concave portion in a vicinity of the optical axis;
- the optical imaging lens comprises no other lenses having refracting power beyond the seven lens elements; and
- an abbe number of the first lens element is represented by $V1$, an abbe number of the second lens element is represented by $V2$, an abbe number of the third lens element is represented by $V3$, an abbe number of the fourth lens element is represented by $V4$, an abbe number of the fifth lens element is represented by $V5$, an abbe number of the sixth lens element is represented by $V6$, an abbe number of the seventh lens element is represented by $V7$, and $V1$, $V2$, $V3$, $V4$, $V5$, $V6$ and $V7$ satisfy the inequality:

$$310.000 \leq V1+V2+V3+V4+V5+V6+V7.$$

2. The optical imaging lens according to claim 1, wherein a thickness of the first lens element along the optical axis is represented by $T1$, a distance from the image-side surface of the fourth lens element to the object-side surface of the fifth lens element along the optical axis is represented by $G45$, and $T1$ and $G45$ satisfy the inequality:

$$T1/G45 \leq 2.000.$$

3. The optical imaging lens according to claim 1, wherein a thickness of the first lens element along the optical axis is represented by $T1$, a distance from the image-side surface of the second lens element to the object-side surface of the third lens element along the optical axis is represented by $G23$, and $T1$ and $G23$ satisfy the inequality:

$$T1/G23 \leq 2.000.$$

4. The optical imaging lens according to claim 1, wherein a thickness of the third lens element along the optical axis is represented by $T3$, a distance from the image-side surface of the second lens element to the object-side surface of the third lens element along the optical axis is represented by $G23$, and $T3$ and $G23$ satisfy the inequality:

$$T3/G23 \leq 2.000.$$

5. The optical imaging lens according to claim 1, wherein a thickness of the fourth lens element along the optical axis is represented by $T4$, a distance from the image-side surface of the fourth lens element to the object-side surface of the fifth lens element along the optical axis is represented by $G45$, and $T4$ and $G45$ satisfy the inequality:

$$T4/G45 \leq 2.000.$$

6. The optical imaging lens according to claim 1, wherein a thickness of the fifth lens element along the optical axis is represented by $T5$, a distance from the image-side surface of the sixth lens element to the object-side surface of the seventh lens element along the optical axis is represented by $G67$, and $T5$ and $G67$ satisfy the inequality:

$$T5/G67 \leq 2.000.$$

7. The optical imaging lens according to claim 1, wherein a distance between the object-side surface of the first lens element and the image-side surface of the seventh lens element along the optical axis is represented by $TL$, a sum of the thicknesses of all seven lens elements along the optical axis is represented by $ALT$, a back focal length of the optical imaging lens, which is defined as the distance from the image-side surface of the seventh lens element to an image plane along the optical axis, is represented by $BFL$, a sum of all distances from the image-side surface of one of the seven lens elements to the object-side surface of the next lens element along the optical axis is represented by $Gaa$, and $TL$, $ALT$, $BFL$ and $Gaa$ satisfy the inequality:

$$(TL+ALT)/(BFL+Gaa) \leq 3.500.$$

8. The optical imaging lens according to claim 1, wherein a distance from the image-side surface of the first lens element to the object-side surface of the second lens element along the optical axis is represented by $G12$, a thickness of the third lens element along the optical axis is represented by $T3$, a distance from the image-side surface of the second lens element to the object-side surface of the third lens element along the optical axis is represented by $G23$, and $G12$, $T3$ and $G23$ satisfy the inequality:

$$(G12+T3)/G23 \leq 2.500.$$

9. The optical imaging lens according to claim 1, wherein a distance from the image-side surface of the first lens element to the object-side surface of the second lens element along the optical axis is represented by $G12$, a thickness of the fourth lens element along the optical axis is represented by $T4$, a distance from the image-side surface of the second lens element to the object-side surface of the third lens element along the optical axis is represented by $G23$, and $G12$, $T4$ and $G23$ satisfy the inequality:

$$(G12+T4)/G23 \leq 2.000.$$

10. The optical imaging lens according to claim 1, wherein a distance from the image-side surface of the first lens element to the object-side surface of the second lens element along the optical axis is represented by $G12$, a thickness of the second lens element along the optical axis is represented by $T2$, a distance from the image-side surface of the second lens element to the object-side surface of the third lens element along the optical axis is represented by $G23$, a distance from the image-side surface of the fourth lens element to the object-side surface of the fifth lens element along the optical axis is represented by $G45$, and $G12$, $T2$, $G23$ and $G45$ satisfy the inequality:

$$(G12+T2+G23)/G45 \leq 2.500.$$

11. An optical imaging lens, comprising a first element, a second element, a third element, a fourth element, a fifth lens element, a sixth lens element and a seventh lens element sequentially from an object side to an image side along an optical axis, each of the first, second, third, fourth, fifth, sixth and seventh lens elements having refracting power, an object-side surface facing toward the object side and allowing an imaging ray to pass therethrough and an image-side surface facing toward the image side and allowing the imaging ray to pass therethrough, wherein:

the image-side surface of the first lens element comprises a concave portion in a vicinity of the optical axis;

the image-side surface of the third lens element comprises a convex portion in a vicinity of the optical axis;

the fifth lens element has positive refracting power, the object-side surface of the fifth lens element comprises a concave portion in a vicinity of a periphery of the fifth lens element, and the image-side surface of the fifth lens element comprises a convex portion in a vicinity of the periphery of the fifth lens element;

the image-side surface of the sixth lens element comprises a concave portion in a vicinity of the optical axis and a convex portion in a vicinity of a periphery of the sixth lens element;

the object-side surface of the seventh lens element comprises a concave portion in a vicinity of a periphery of the seventh lens element, and the image-side surface of the seventh lens element comprises a concave portion in a vicinity of the optical axis;

the optical imaging lens comprises no other lenses having refracting power beyond the seven lens elements;

an abbe number of the first lens element is represented by V1, an abbe number of the second lens element is represented by V2, an abbe number of the third lens element is represented by V3, an abbe number of the fourth lens element is represented by V4, an abbe number of the fifth lens element is represented by V5, an abbe number of the sixth lens element is represented by V6, an abbe number of the seventh lens element is represented by V7, and V1, V2, V3, V4, V5, V6 and V7 satisfy the inequality:

$310.000 \leq V1+V2+V3+V4+V5+V6+V7$; and a thickness of the sixth lens element along the optical axis is represented by T6, a distance from the image-side surface of the first lens element to the object-side surface of the second lens element along the optical axis is represented by G12, a distance from the image-side surface of the second lens element to the object-side surface of the third lens element along the optical axis is represented by G23, and T6, T7, G12, and G23 satisfy the inequality:

$(T6+T7)/(G12+G23) \leq 2.500$.

12. The optical imaging lens according to claim 11, wherein a distance from the object-side surface of the first lens element to an image plane along the optical axis is represented by TTL, a back focal length of the optical imaging lens, which is defined as the distance from the image-side surface of the seventh lens element to the image plane along the optical axis, is represented by BFL, a distance from the image-side surface of the fourth lens element to the object-side surface of the fifth lens element along the optical axis is represented by G45, and TTL, BFL and G45 satisfy the inequality:

$TTL/(BFL+G45) \leq 5.000$.

13. The optical imaging lens according to claim 11, wherein a distance between the object-side surface of the first lens element and the image-side surface of the seventh lens element along the optical axis is represented by TL, a back focal length of the optical imaging lens, which is defined as the distance from the image-side surface of the seventh lens element to an image plane along the optical axis, is represented by BFL, a distance from the image-side surface of the fourth lens element to the object-side surface of the fifth lens element along the optical axis is represented by G45, and TL, BFL and G45 satisfy the inequality:

$TL/(BFL+G45) \leq 4.000$.

14. The optical imaging lens according to claim 11, wherein a thickness of the fifth lens element along the optical axis is represented by T5, a distance from the image-side surface of the fourth lens element to the object-side surface of the fifth lens element along the optical axis is represented by G45, a distance from the image-side surface of the sixth lens element to the object-side surface of the seventh lens element along the optical axis is represented by G67, and T5, T6, G45 and G67 satisfy the inequality:

$(T5+T6)/(G45+G67) \leq 1.500$.

15. The optical imaging lens according to claim 11, wherein a thickness of the fourth lens element along the optical axis is represented by T4, a thickness of the fifth lens element along the optical axis is represented by T5, a distance from the image-side surface of the fourth lens element to the object-side surface of the fifth lens element along the optical axis is represented by G45, a distance from the image-side surface of the sixth lens element to the object-side surface of the seventh lens element along the optical axis is represented by G67, and T4, T5, T6, G45 and G67 satisfy the inequality:

$(T4+T5+T6)/(G45+G67) \leq 2.000$.

16. The optical imaging lens according to claim 11, wherein a thickness of the first lens element along the optical axis is represented by T1, a thickness of the fourth lens element along the optical axis is represented by T4, a thickness of the fifth lens element along the optical axis is represented by T5, a distance from the image-side surface of the fourth lens element to the object-side surface of the fifth lens element along the optical axis is represented by G45, a distance from the image-side surface of the sixth lens element to the object-side surface of the seventh lens element along the optical axis is represented by G67, and T1, T4, T5, G45 and G67 satisfy the inequality:

$(T1+T4+T5)/(G45+G67) \leq 2.000$.

17. The optical imaging lens according to claim 11, wherein a thickness of the first lens element along the optical axis is represented by T1, a thickness of the second lens element along the optical axis is represented by T2, and T1, T2 and G23 satisfy the inequality:

$(T1+T2)/G23 \leq 3.000$.

18. The optical imaging lens according to claim 11, wherein a thickness of the fourth lens element along the optical axis is represented by T4, a thickness of the sixth lens element along the optical axis is represented by T6, and T4, T6 and G23 satisfy the inequality:

$(T4+T6)/G23 \leq 3.000$.

19. The optical imaging lens according to claim 11, wherein T7, G12 and G23 satisfy the inequality:

$T7/(G12+G23) \leq 1.500$.

20. The optical imaging lens according to claim 11, wherein a thickness of the sixth lens element along the optical axis is represented by T6, a thickness of the seventh lens element along the optical axis is represented by T7, a distance from the image-side surface of the first lens element to the object-side surface of the second lens element along the optical axis is represented by G12, a distance from the image-side surface of the second lens element to the object-side surface of the third lens element along the optical axis is represented by G23, and T6, T7, G12 and G23 satisfy the inequality:

$(T6+T7)/(G12+G23) \leq 2.500$. (5)

* * * * *